Aug. 11, 1964   D. CLEJAN   3,143,978
FREIGHT TRANSPORTATION SYSTEMS AND METHODS
Filed Nov. 13, 1962   18 Sheets-Sheet 1
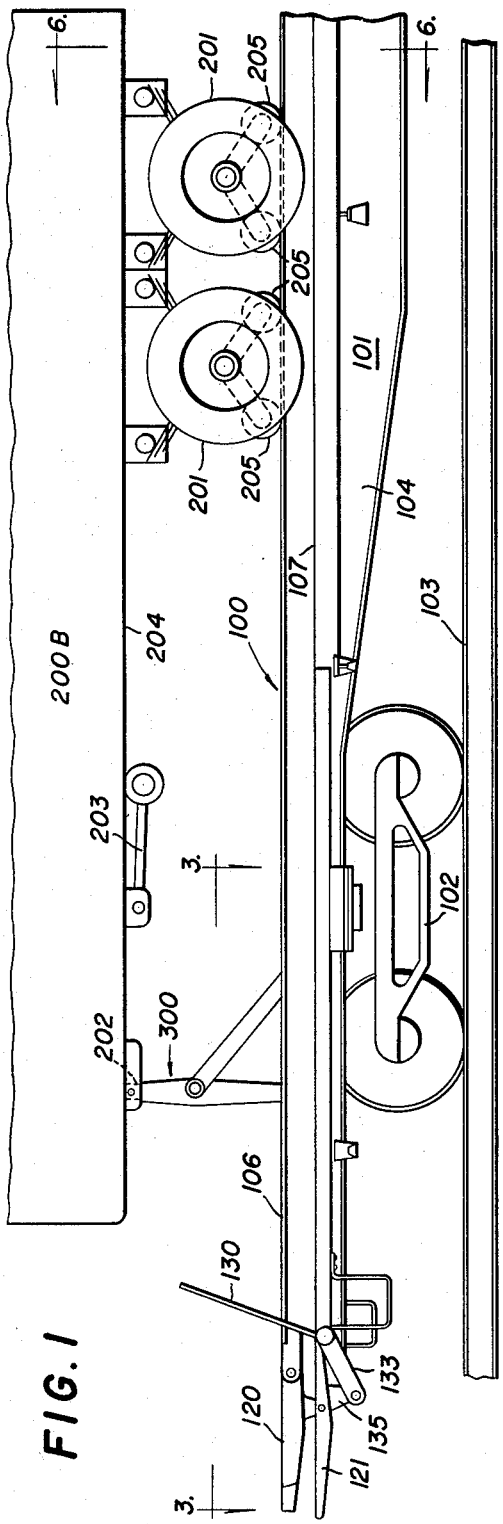
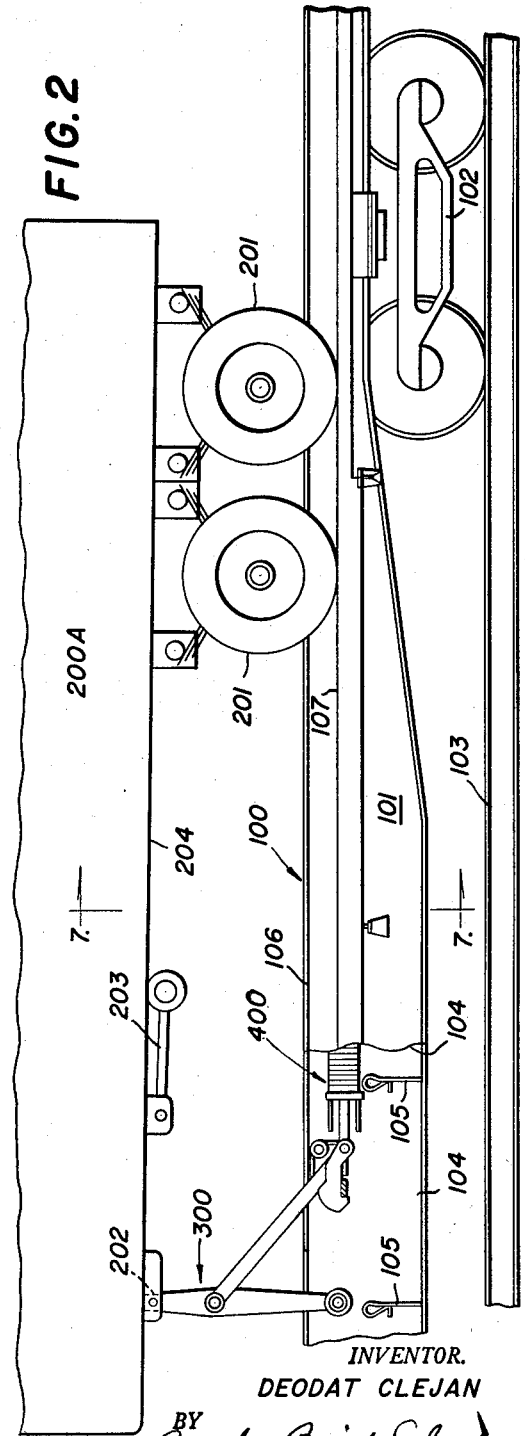
INVENTOR.
DEODAT CLEJAN
BY Brangley Baird Clayton
Miller & Vogel
ATTYS.

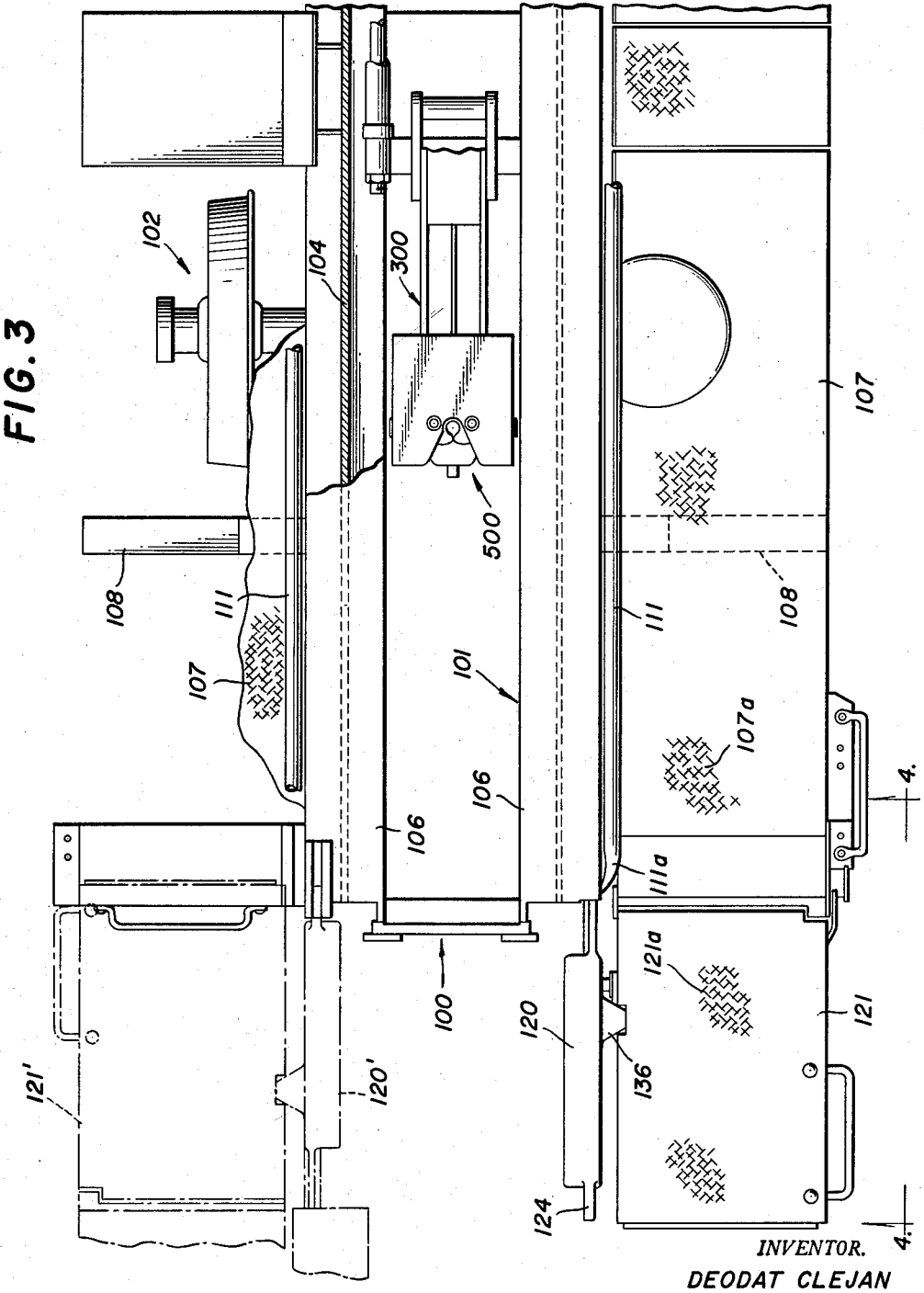

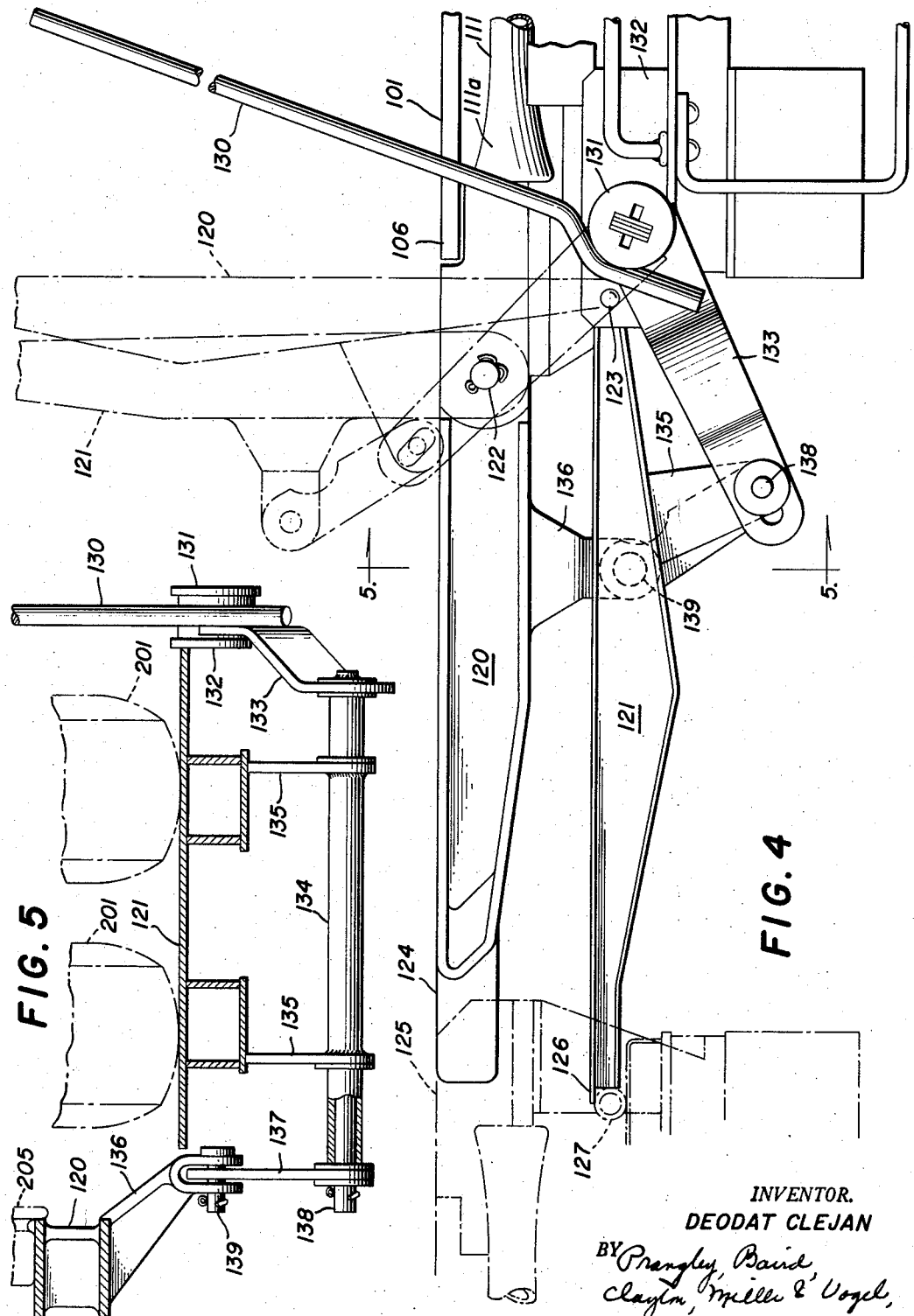

Aug. 11, 1964  D. CLEJAN  3,143,978
FREIGHT TRANSPORTATION SYSTEMS AND METHODS
Filed Nov. 13, 1962  18 Sheets-Sheet 4

INVENTOR.
DEODAT CLEJAN
BY Prangley, Baird,
Clayton, Miller & Vogel,
ATTYS.

Aug. 11, 1964     D. CLEJAN     3,143,978
FREIGHT TRANSPORTATION SYSTEMS AND METHODS
Filed Nov. 13, 1962     18 Sheets-Sheet 5

OUTSIDE GUIDE RAILS
TEND TO JACK-KNIFE TRAILER

INSIDE GUIDE RAILS
TEND TO RECENTER TRAILER

INVENTOR.
DEODAT CLEJAN
BY
Prangley, Baird, Clayton
Miller & Vogel, ATTYS.

Aug. 11, 1964     D. CLEJAN     3,143,978

FREIGHT TRANSPORTATION SYSTEMS AND METHODS

Filed Nov. 13, 1962     18 Sheets-Sheet 6

INVENTOR.
DEODAT CLEJAN
BY
Prangley, Dairsky Clayton,
Miller & Vogel,
ATTYS.

Aug. 11, 1964  D. CLEJAN  3,143,978
FREIGHT TRANSPORTATION SYSTEMS AND METHODS
Filed Nov. 13, 1962  18 Sheets-Sheet 7
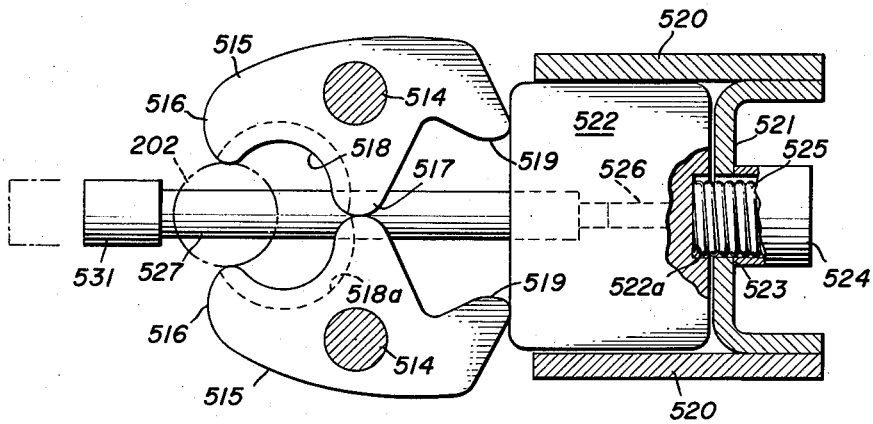
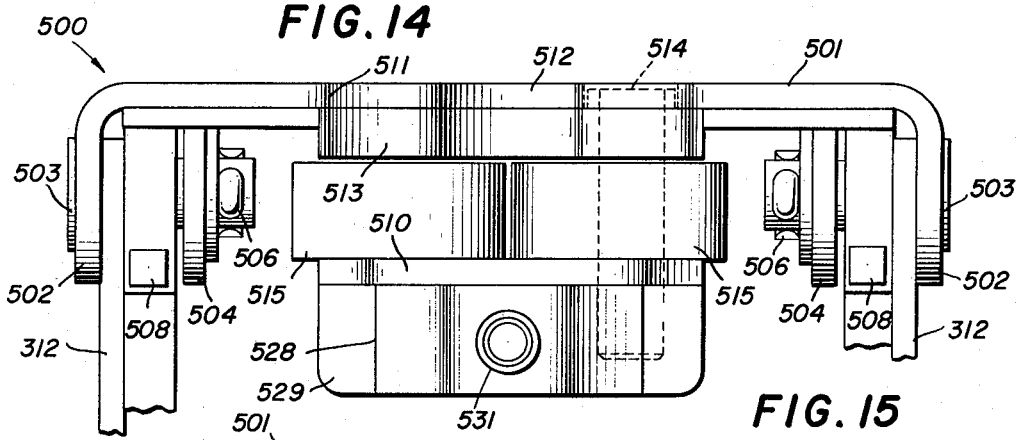
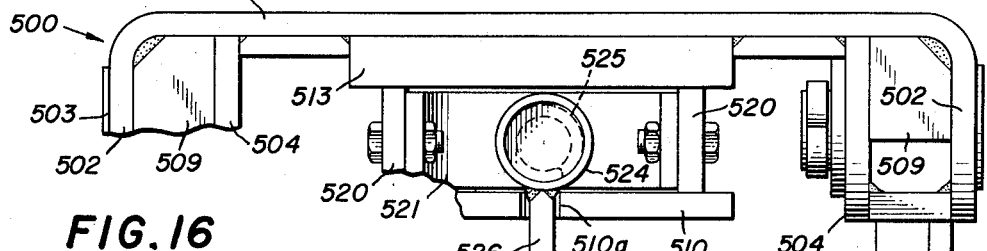
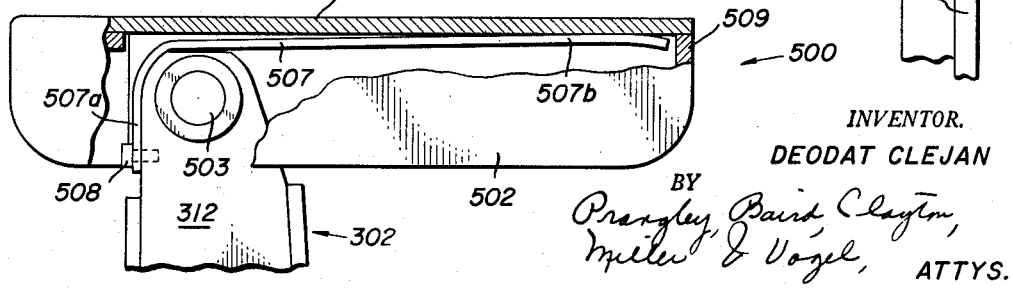
INVENTOR.
DEODAT CLEJAN
BY
ATTYS.

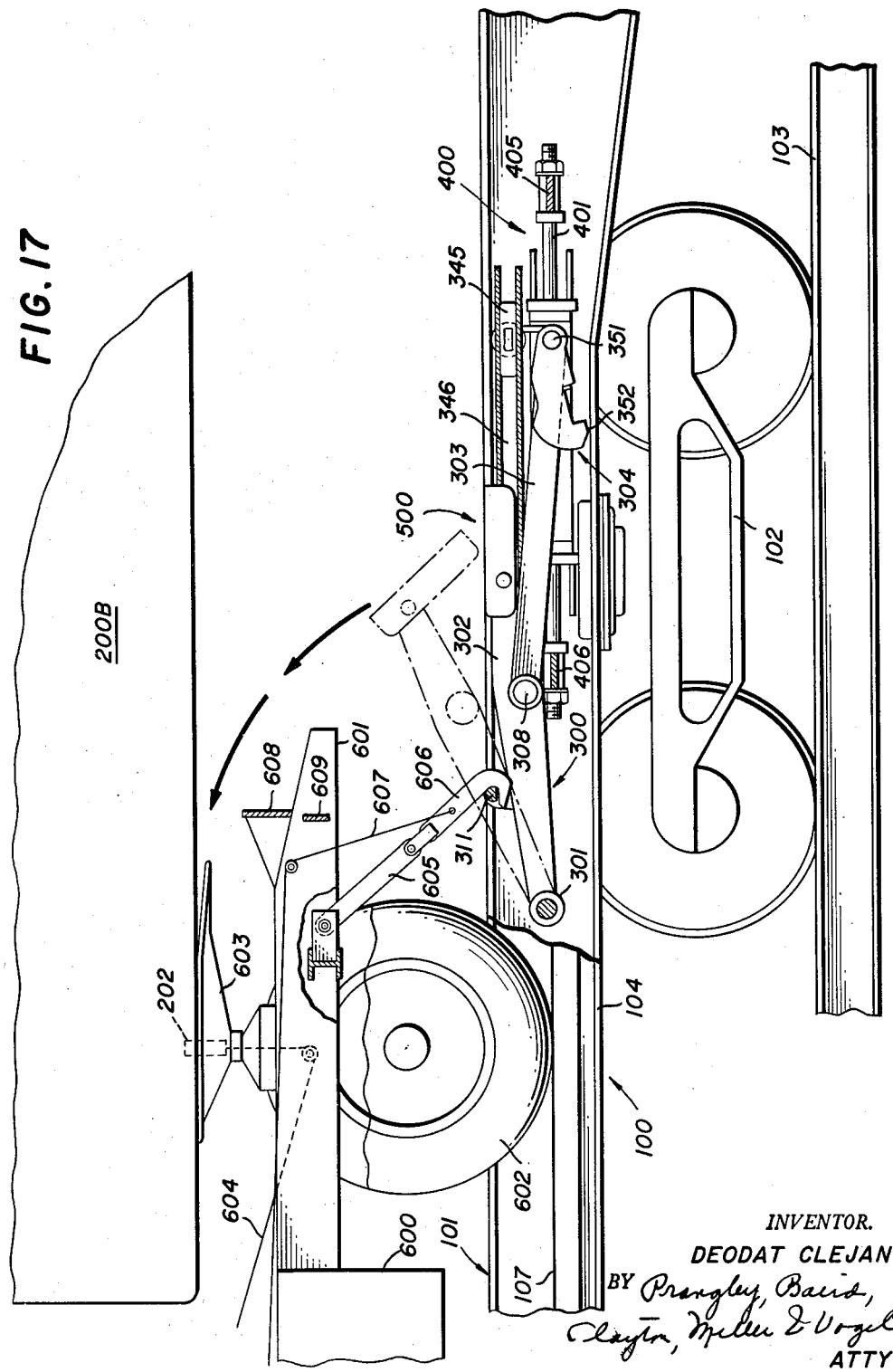

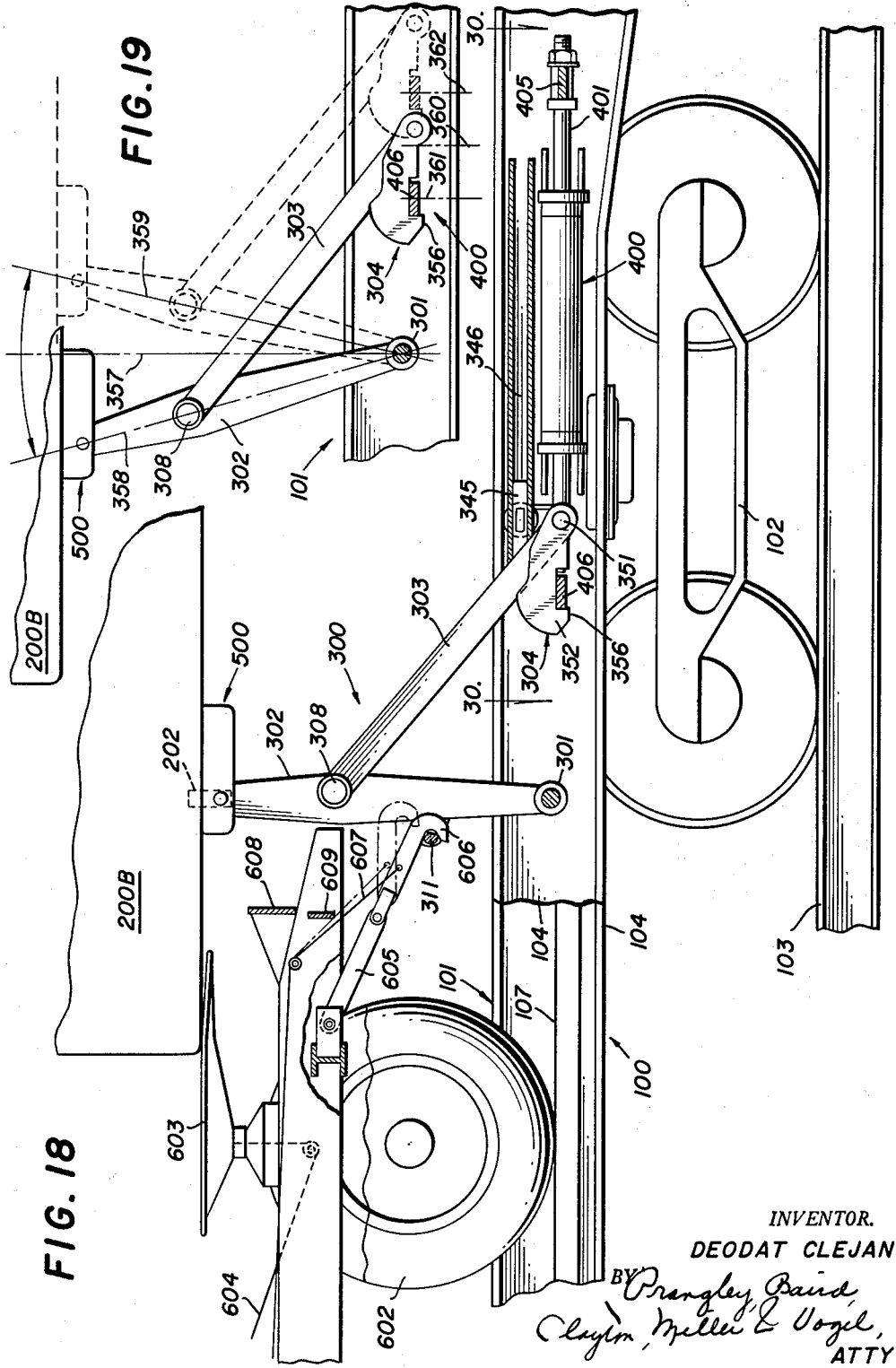

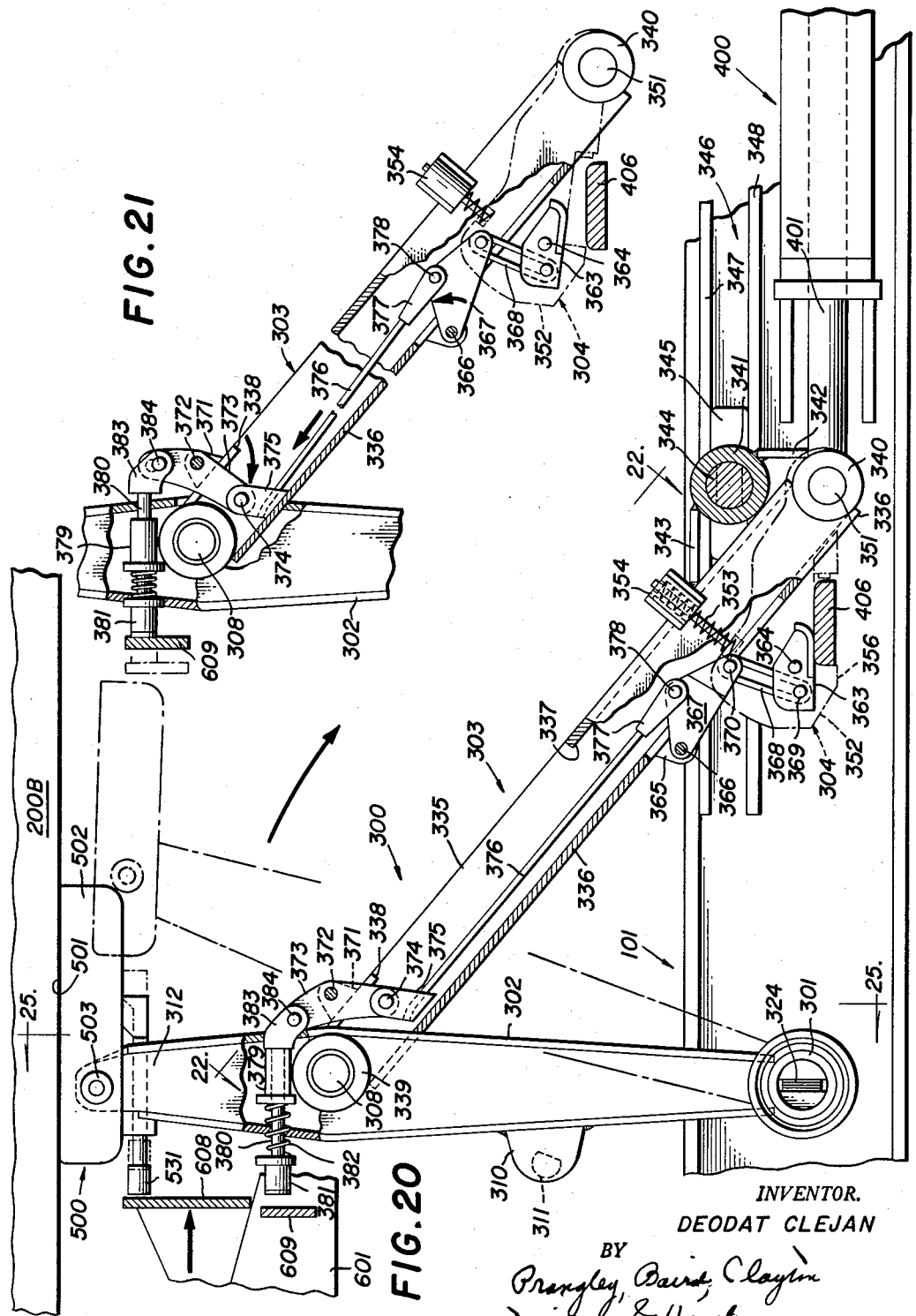

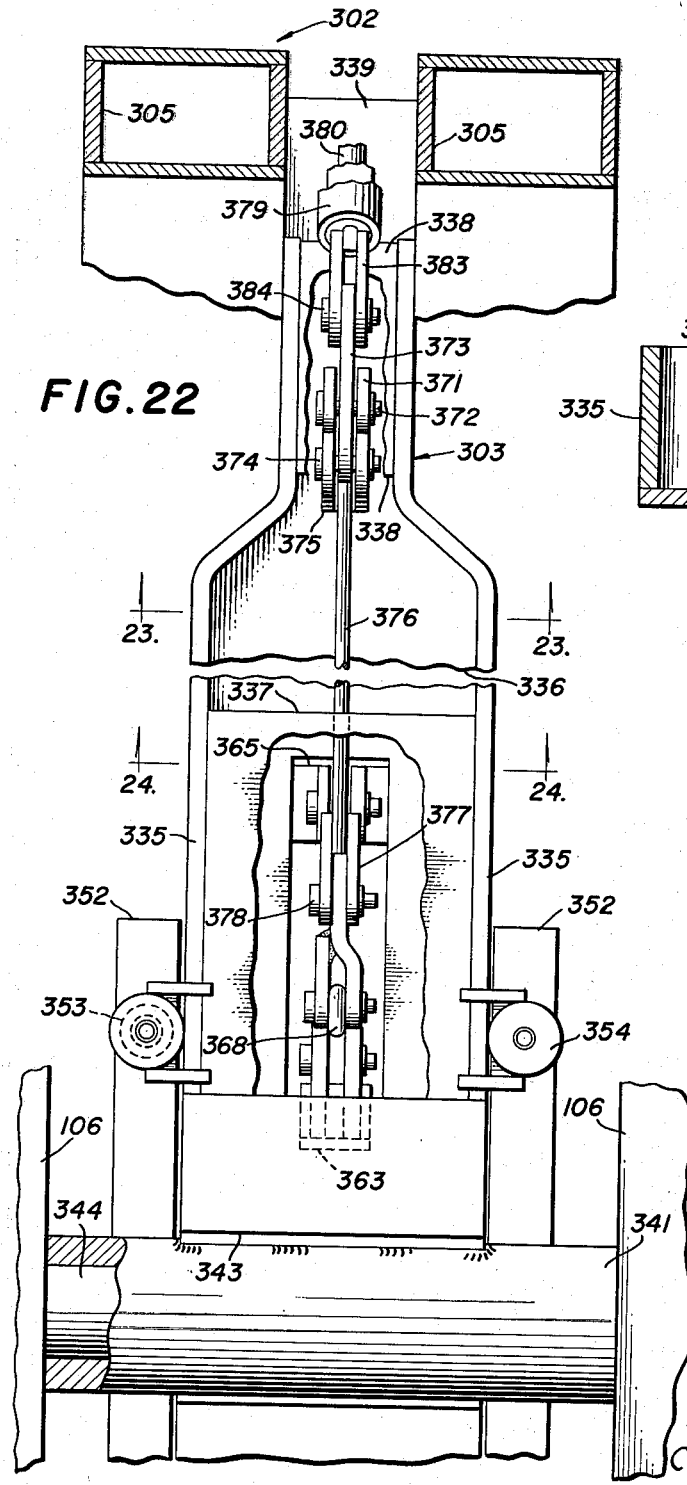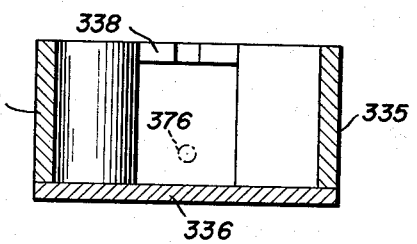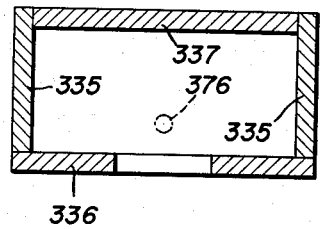

Aug. 11, 1964 D. CLEJAN 3,143,978
FREIGHT TRANSPORTATION SYSTEMS AND METHODS
Filed Nov. 13, 1962 18 Sheets-Sheet 12
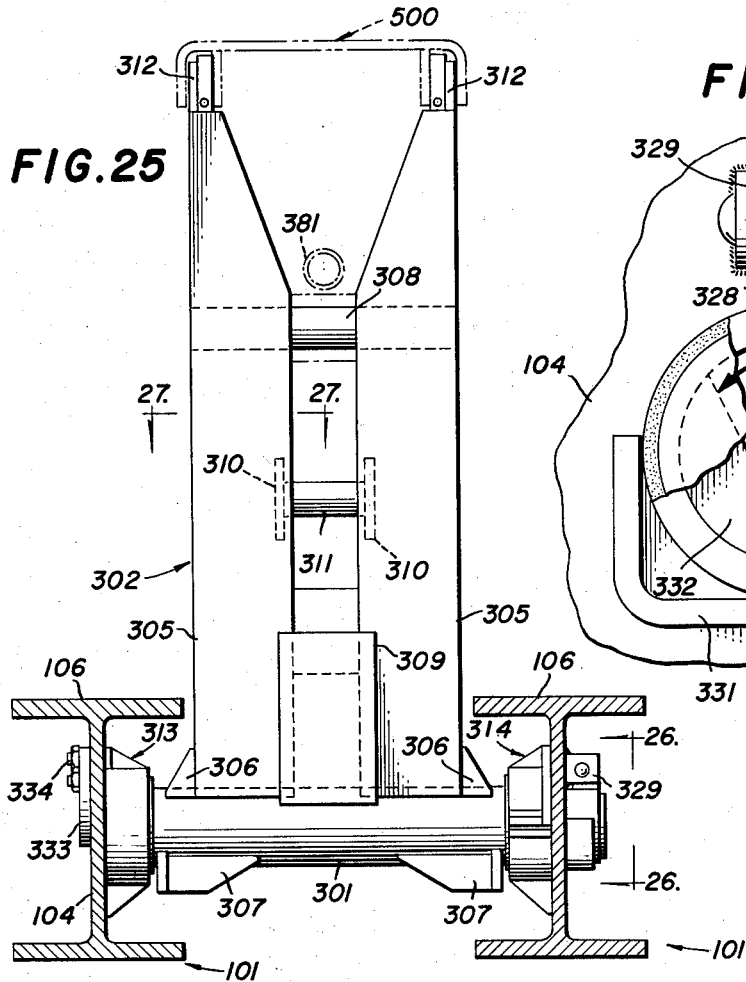
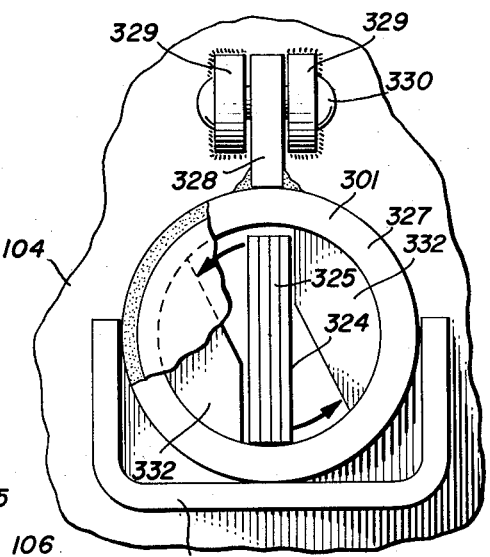
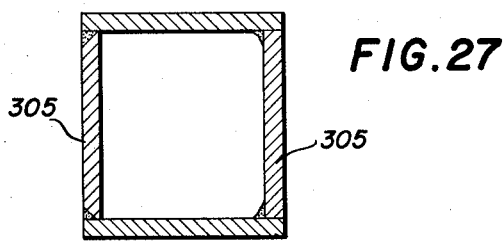
INVENTOR.
DEODAT CLEJAN
BY
ATTYS.

Aug. 11, 1964 D. CLEJAN 3,143,978
FREIGHT TRANSPORTATION SYSTEMS AND METHODS
Filed Nov. 13, 1962 18 Sheets-Sheet 13
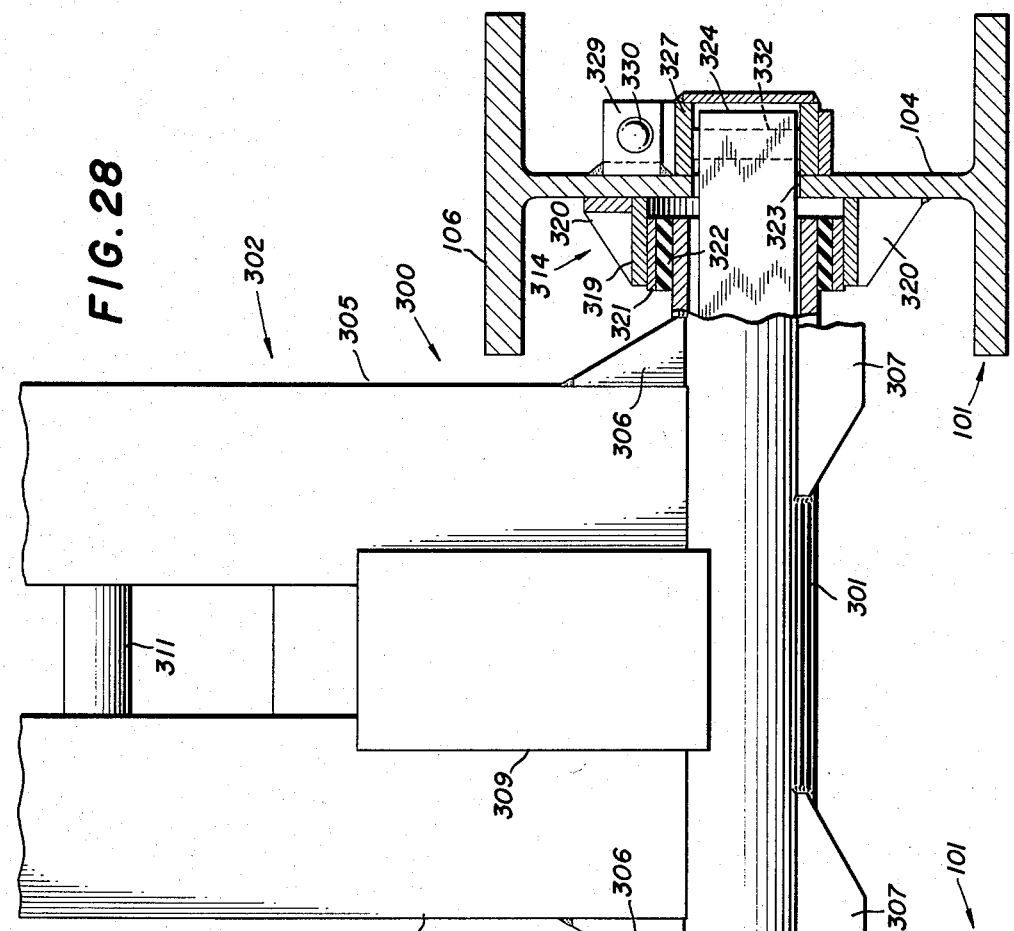
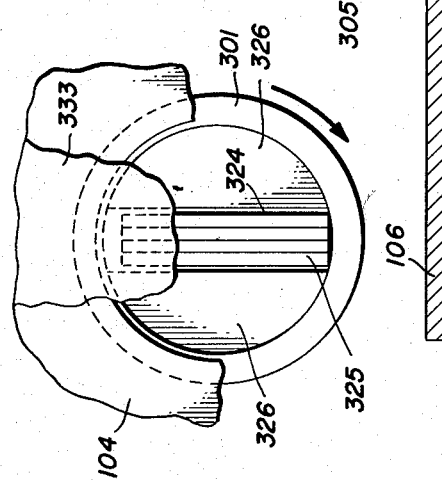
INVENTOR.
DEODAT CLEJAN
BY
Prangley Baird Clayin,
Miller & Vogel,
ATTYS.

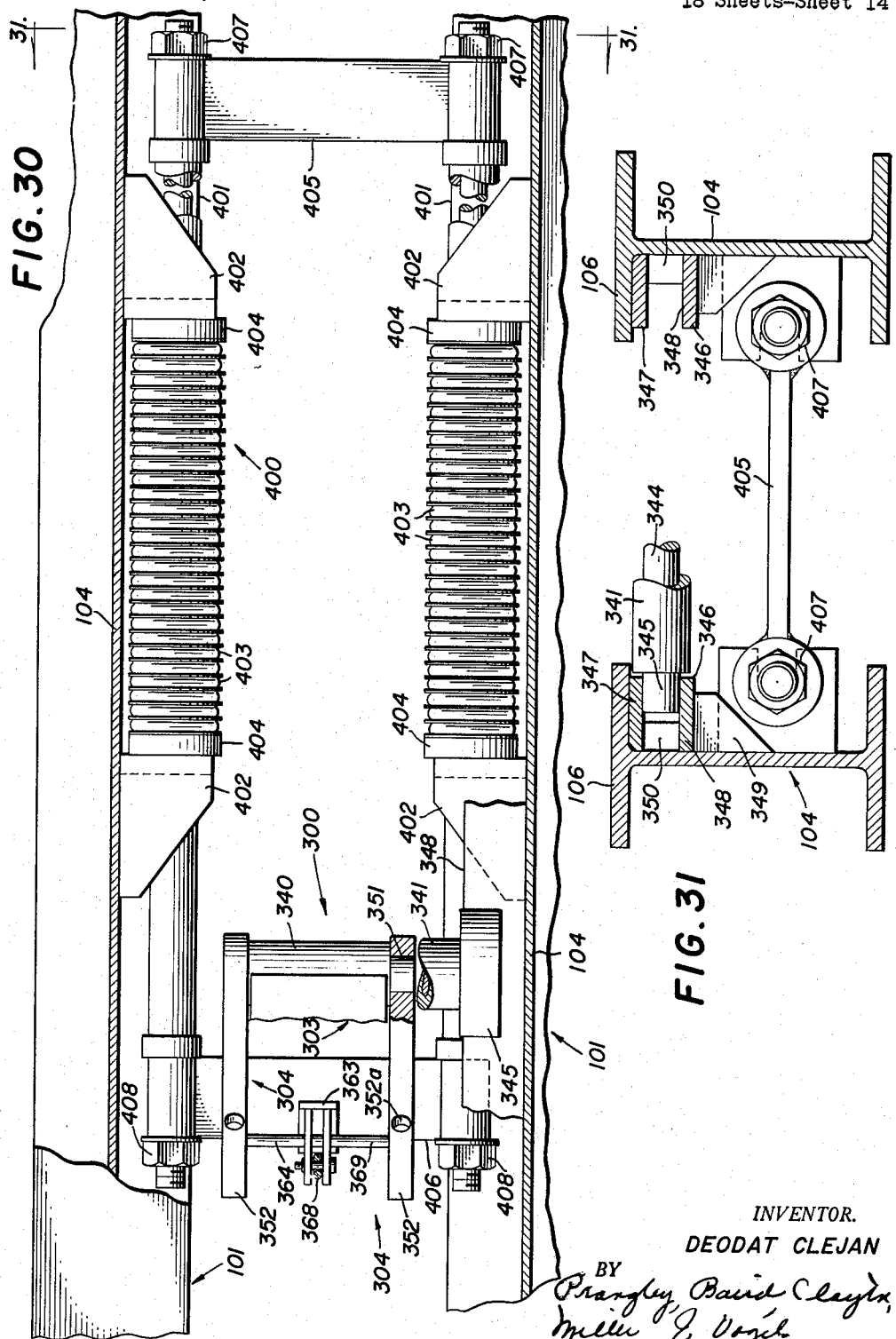

Aug. 11, 1964    D. CLEJAN    3,143,978
FREIGHT TRANSPORTATION SYSTEMS AND METHODS
Filed Nov. 13, 1962    18 Sheets-Sheet 15

INVENTOR.
DEODAT CLEJAN
BY
ATTYS.

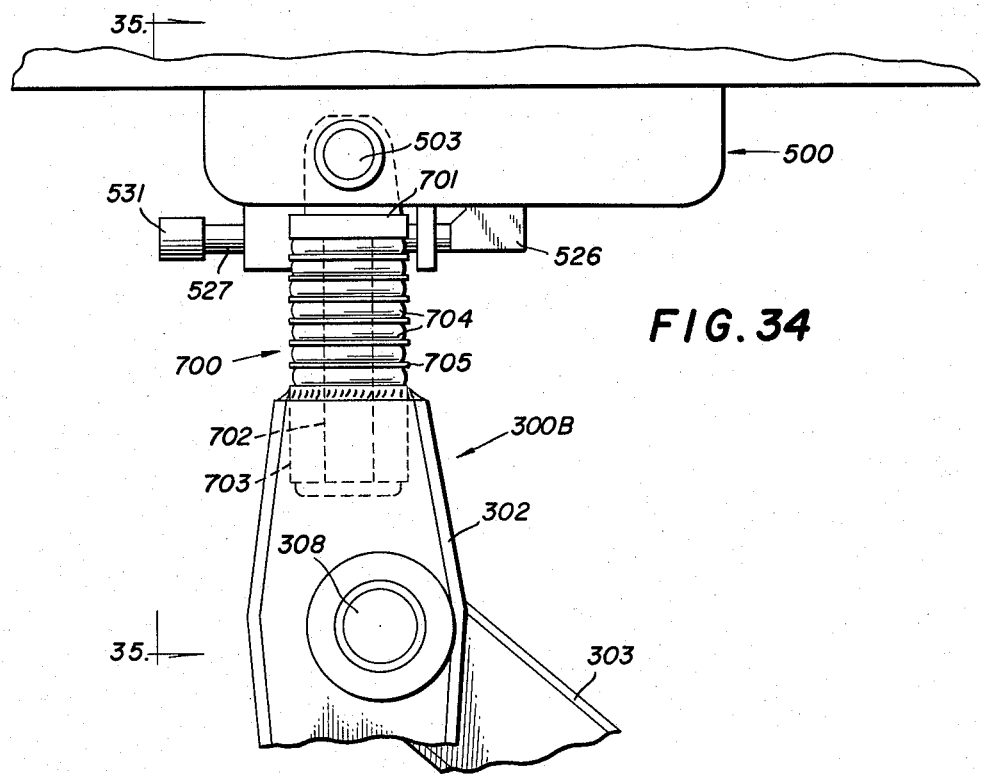
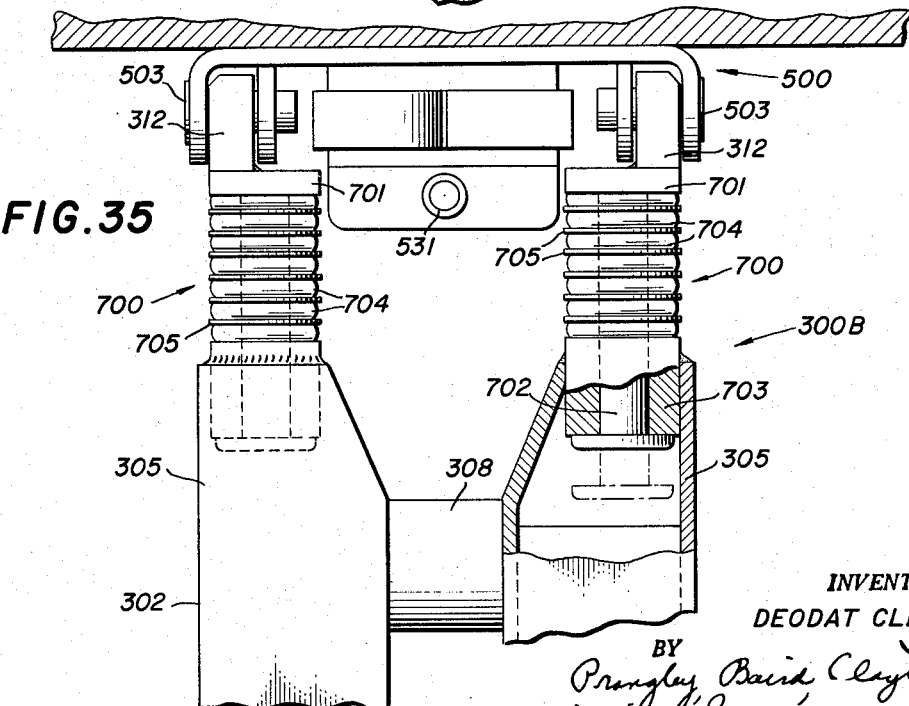

Aug. 11, 1964 D. CLEJAN 3,143,978
FREIGHT TRANSPORTATION SYSTEMS AND METHODS
Filed Nov. 13, 1962 18 Sheets-Sheet 17

INVENTOR.
DEODAT CLEJAN
BY
ATTYS.

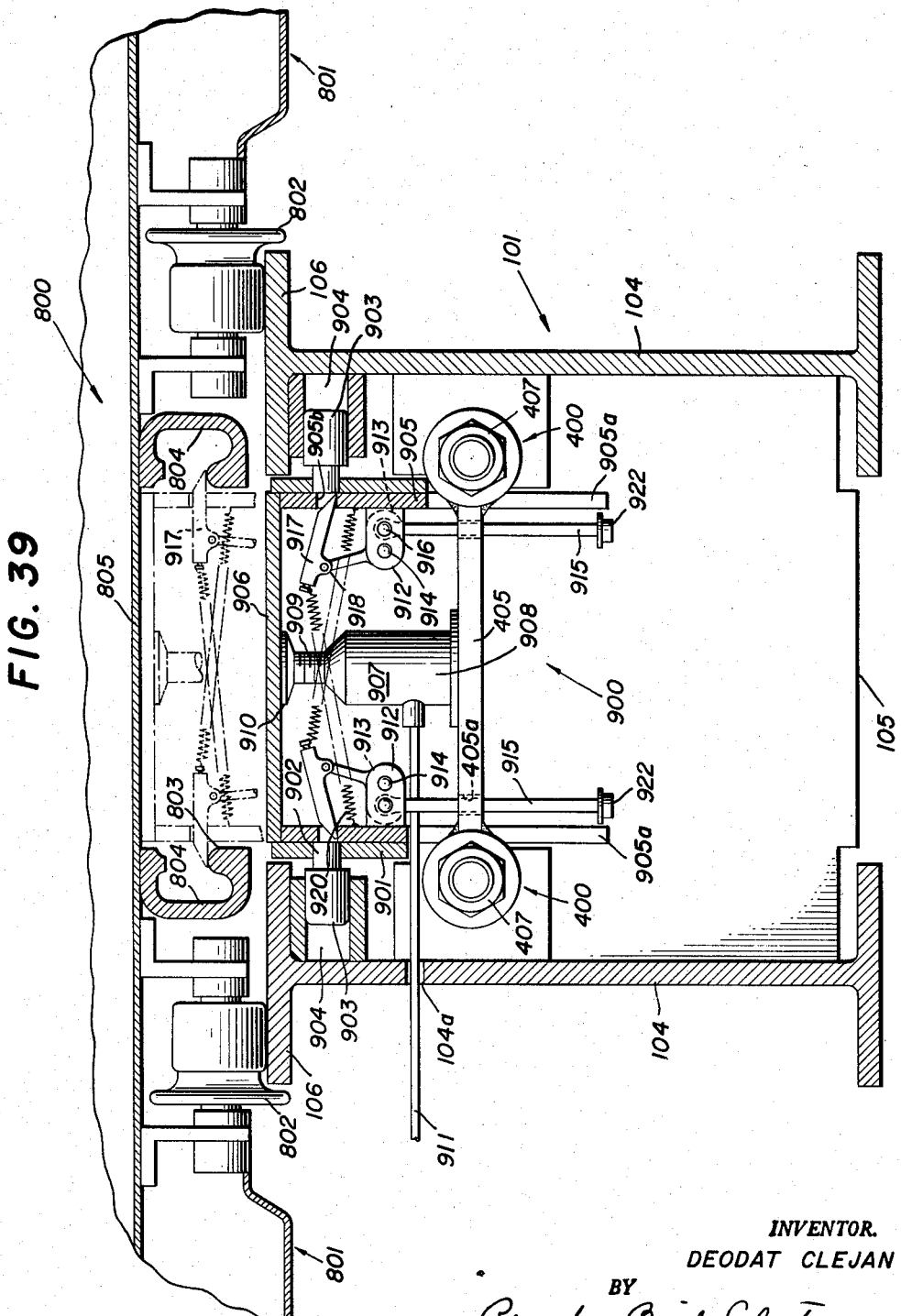

__United States Patent Office__  3,143,978
Patented Aug. 11, 1964

3,143,978
FREIGHT TRANSPORTATION SYSTEMS AND METHODS
Deodat Clejan, Chicago, Ill., assignor to General American Transportation Corporation, Chicago, Ill., a corporation of New York
Filed Nov. 13, 1962, Ser. No. 237,201
24 Claims. (Cl. 105—368)

The present invention relates to freight transportation systems and methods, and more particularly to such systems and methods of the combination road-and-railway type. This application comprises a continuation-in-part of the copending application of Deodat Clejan, Serial No. 861,291, filed December 22, 1959, now abandoned.

It is a general object of the invention to provide an improved system for and method of loading a road semi-trailer upon a railway car incorporating a semi-trailer hitch carrying a first fifth-wheel mechanism, and employing a tractor having a rear end carrying a second fifth-wheel mechanism; wherein the king pin carried by the front end of the semi-trailer is first coupled to the second fifth-wheel mechanism, the tractor and the coupled semi-trailer are moved under the motive power of the tractor onto the top of the frame of the railway car, the hitch is actuated under the motive power of the tractor from its storage position disposed closely adjacent to the top of the frame of the railway car into its erected position disposed well above the top of the frame of the railway car so as to locate the first fifth-wheel mechanism behind the second fifth-wheel mechanism, the second fifth-wheel mechanism is operated to uncouple the king pin of the semi-trailer, and the first fifth-wheel mechanism is operated immediately to couple the king pin of the semi-trailer, whereby a flying transfer is made of the support of the front end of the semi-trailer from the second fifth-wheel mechanism to the first fifth-wheel mechanism.

Another general object of the invention is to provide an improved system for and method of unloading a road semi-trailer from a railway car incorporating a semi-trailer hitch carrying a first fifth-wheel mechanism, and employing a tractor having a rear end carrying a second fifth-wheel mechanism, where the semi-trailer is mounted upon the top of the frame of the railway car with the first fifth-wheel mechanism coupled to the king pin carried by the front end thereof and with the hitch arranged in its erected position disposed well above the top of the frame of the railway car; wherein the tractor is moved under its own motive power and onto the top of the frame of the railway car and so as to locate the second fifth-wheel mechanism in front of the first fifth-wheel mechanism, the tractor is then moved into cooperating relation with the first fifth-wheel mechanism so as to operate it to uncouple the king pin of the semi-trailer, the tractor is then moved into cooperating relation with the hitch in order to operate it from its erected position into its storage position, and the second fifth-wheel mechanism is operated immediately to couple the king pin of the semi-trailer, whereby a flying transfer is made of the support of the front end of the semi-trailer from the first fifth-wheel mechanism to the second fifth-wheel mechanism.

Another object of the invention is to provide a railway car for transporting indiscriminately a road semi-trailer of the type including a rear end carrying road wheels and a front end carrying a king pin and a freight carrier of the type including an underframe carrying low rollers; wherein the railway car comprises a longitudinally extending frame adapted to support upon the top thereof either a semi-trailer or a freight carrier, a shock-absorbing device carried by the frame, a semi-trailer hitch carried by the frame and adapted to interconnect the shock-absorbing device and the king pin carried by the front end of a semi-trailer mounted upon the top of the frame, and a freight carrier hitch carried by the frame and adapted to interconnect the shock-absorbing device and the underframe of a freight carrier mounted upon the top of the frame, whereby the shock-absorbing device affords protection to the connected semi-trailer or freight carrier mounted upon the top of the frame against severe longitudinal shocks from the frame.

Another object of the invention is to provide a railway car of the character described, wherein each of the hitches mentioned is selectively movable between a storage position disposed closely adjacent to the frame of the railway car and in non-interfering relation with respect to the underframe of a freight carrier mounted upon the top thereof and an erected position disposed well above the frame of the railway car and in cooperating relation with the mounted semi-trailer or freight carrier.

Another object of the invention is to provide a railway car for transporting road semi-trailers and incorporating a semi-trailer hitch of improved construction and arrangement.

Another object of the invention is to provide a railway car for transporting freight carriers and incorporating a freight carrier hitch of improved construction and arrangement.

A further object of the invention is to provide a road semi-trailer hitch comprising a supporting frame subject to longitudinal shocks, a standard pivotally mounted at the lower end thereof upon the frame for movements between a storage position disposed closely adjacent to the frame and an erected position disposed well above the frame, a fifth-wheel mechanism carried by the upper end of the standard and selectively operative in the erected position thereof to latch and to unlatch the king pin carried by the front end of the cooperating semi-trailer, and a shock-absorbing device carried by the frame and selectively connectible to the standard in its erected position, wherein the shock-absorbing device biases the connected standard in its erected position into a normal upstanding attitude and accommodates pivotal movements of the standard fore-and-aft with respect to its upstanding attitude and longitudinally of the frame, and wherein the shock-absorbing device resists the fore-and-aft pivotal movements of the standard with respect to its normal upstanding attitude so as to afford protection to a semi-trailer latched to the fifth-wheel mechanism carried by the standard against the transmission thereto of severe longitudinal shocks from the frame.

A further object of the invention is to provide a road semi-trailer hitch of the character described, and further comprising latching mechanism having a set position connecting the standard in its erected position to the shock-absorbing device and a trip position disconnecting the standard from the shock-absorbing device, wherein the latching mechanism is automatically operated into its set position in response to movement of the standard into its erected position, and wherein the standard is biased by gravity into its storage position so that it is automatically moved from its erected position into its storage position in response to operation of the latching mechanism into its trip position.

A further object of the invention is to provide a road semi-trailer hitch of the character described, that further incorporates an improved trunnion mounting arrangement which includes a resilient biasing element that is strained in response to movement of the standard from its erected position into its storage position so as to produce a reactive force opposing movement of the standard into its storage position, thereby to minimize the torque required to move the standard from its storage position back into its erected position.

A further object of the invention is to provide a railway car for transporting a road semi-trailer of the type including a rear end carrying road wheels of standard road gauge; wherein the railway car comprises an elongated longitudinally extending frame, a pair of longitudinally extending and laterally spaced-apart stationary platforms respectively carried on the opposite sides of the frame and projecting laterally outwardly therefrom and disposed below the top thereof and constituting a roadway of standard road gauge, the roadway being arranged to engage and to support the road wheels of the semi-trailer so as to mount the same upon the top of the frame in straddling relation therewith in order to accommodate movements of the mounted semi-trailer longitudinally along the frame, a pair of elongated longitudinally extending and laterally spaced-apart wheel guides respectively carried by the opposite sides of the frame and each disposed outwardly of the adjacent side thereof and below the top thereof and above the associated one of the platforms and adjacent to the inner edge thereof, wherein each one of the wheel guides is adapted to engage the inside surface of one of the road wheels carried by a semi-trailer mounted upon the top of the frame incident to longitudinal movement of the semi-trailer along the frame in the event of substantial misalignment between the centerline of the frame and the centerline of the semi-trailer, whereby the one wheel guide exerts a reactive force laterally outwardly upon the engaged inside surface of the one road wheel tending to rotate the rear end of the mounted semi-trailer in order to minimize the misalignment mentioned thus to effect centering of the mounted semi-trailer with respect to the frame, and further comprising a stand carried by the central portion of the frame and arranged intermediate the wheel guides and mounted on the frame for movements between a storage position and an erected position, the stand in its storage position being disposed closely adjacent to the top of the frame and between the wheel guides and in its erected position being disposed well above the top of the frame and from between the wheel guides, the stand being biased into its storage position, latching mechanism cooperating between the frame and the stand and having set and trip positions, facility responsive to movement of the stand from its storage position into its erected position for actuating the latching mechanism into its set position to hold the stand in its erected position, facility for actuating the latching mechanism into its trip position, whereby the stand is moved from its erected position back into its storage position in response to actuation of the latching mechanism into its trip position, a head carried by the upper end of the stand and adapted to be disposed in the erected position of the stand below and in supporting relation with the front end of a road semi-trailer carried by the frame, and locking mechanism carried by the head and adapted to cooperate with the kingpin carried by the front end of the supported road semi-trailer, the locking mechanism being selectively operative into a locked position connecting and holding the cooperating kingpin and into an unlocked position disconnecting and releasing the cooperatitng kingpin.

A further object of the invention is to provide a railway car of the character described, wherein the vertical projections above the stationary platforms of the wheel guides and of the stand and the head when the stand occupies its storage position are substantially less than the normal road clearance of the underframe of a carried road semi-trailer, so as to accommodate ready movement without interference of the road semi-trailer longitudinally of the frame when the stand occupies its storage position.

A still further object of the invention is to provide an improved railway car for transporting indiscriminately road semi-trailers of first and second types, wherein the first type of semi-trailer includes a rear end carrying road wheels of standard road gauge and the second type of semi-trailer includes a rear end carrying both road wheels of standard road gauge and track rollers of given narrow gauge depending therefrom and disposed inwardly of and above the road wheels carried thereby; and wherein the railway car comprises a longitudinally extending narrow center sill, a pair of longitudinally extending and laterally spaced-apart stationary rails respectively provided on the opposite top sides of the center sill and constituting a trackway of the given narrow gauge, and a pair of longitudinally extending and laterally spaced-apart stationary platforms respectively carried on the opposite sides of the center sill and projecting laterally outwardly therefrom and disposed below the top thereof and constituting a roadway of standard road gauge, the roadway being arranged to engage and to support the road wheels of the first type semitrailer so as to mount the same upon the top of the center sill in straddling relation with the trackway and with the underportion thereof positioned above the trackway and out of contact therewith in order to accommodate movements of the mounted first type semi-trailer longitudinally along the center sill, the trackway being arranged to engage and to support the track rollers carried by the second type semi-trailer so as to mount the same upon the top of the center sill with the road wheels thereof projecting laterally outwardly over the roadway and with the road wheels thereof positioned above the roadway and out of contact therewith in order to accommodate movements of the mounted second type semi-trailer longitudinally along the center sill.

Further features of the invention pertain to the particular arrangement of the elements of the freight transportation system and of the steps of the method, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fractured side elevational view of a freight transportation system embodying the present invention and including a railway car, this figure illustrating the left-hand end of the railway car mounting an equipped road semi-trailer and including a first semi-trailer hitch supporting the front end of this mounted semi-trailer;

FIG. 2 is another fractured side elevational view of the freight transportation system, this figure illustrating the right-hand end of the railway car mounting an unequipped road semi-trailer and including a second semi-trailer hitch supporting the front end of this mounted semi-trailer;

FIG. 3 is an enlarged plan view, partly broken away, of the left-hand end of the railway car, taken in the direction of the arrows along the line 3—3 in FIG. 1;

FIG. 4 is a greatly enlarged side elevational view of the railway car, illustrating the railway bridging rail and the roadway bridging platform carried thereby, this figure being taken in the direction of the arrows along the line 4—4 in FIG. 3;

FIG. 5 is a greatly enlarged lateral sectional view of the railway bridging rail and the roadway bridging platform, taken in the direction of the arrows along the line 5—5 in FIG. 4;

FIG. 13 is a greatly enlarged fragmentary plan view, similar to FIG. 11, illustrating the jaws of this fifth-wheel mechanism in their open positions;

FIG. 14 is a greatly enlarged front elevational view of this fifth-wheel mechanism, taken in the direction of the arrows along the line 14—14 in FIG. 11;

FIG. 15 is a greatly enlarged rear elevational view of this fifth-wheel mechanism, taken in the direction of the arrows along the line 15—15 in FIG. 11;

FIG. 16 is an enlarged side elevational view, partly broken away, of this fifth-wheel mechanism of FIG. 11;

Figure 7:
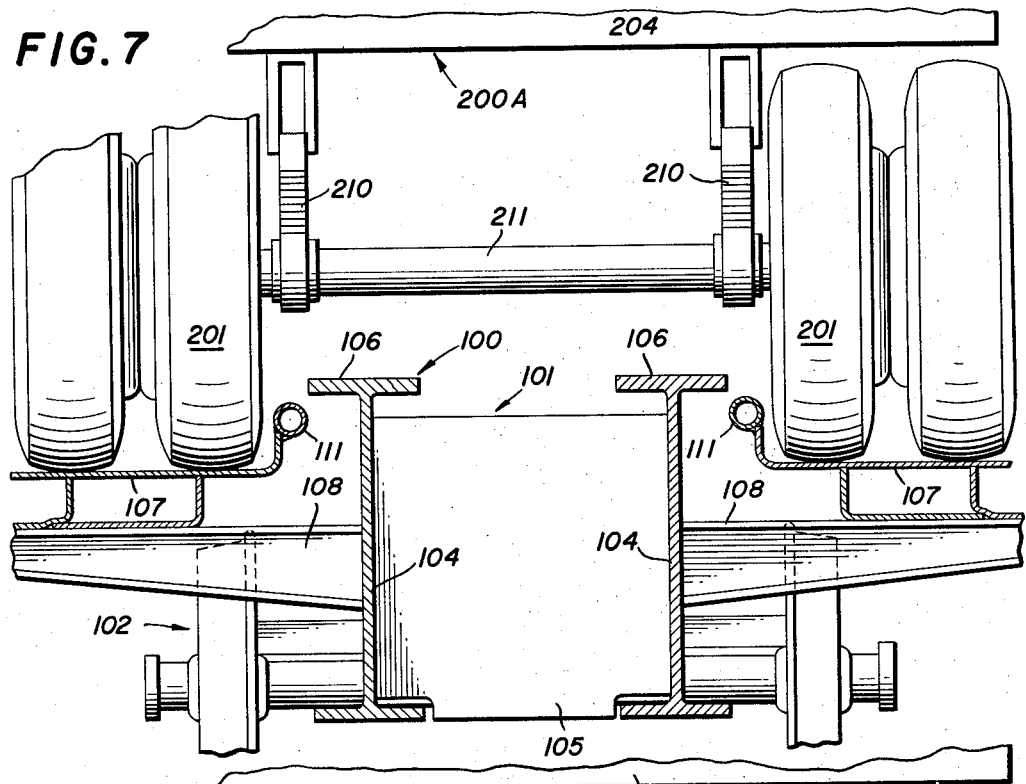
FIG. 7 is an enlarged lateral sectional view of the railway car, taken in the direction of the arrows along the line 7—7 in FIG. 2, and illustrating the supporting arrangement for the mounted unequipped road semi-trailer.
Figure 32:
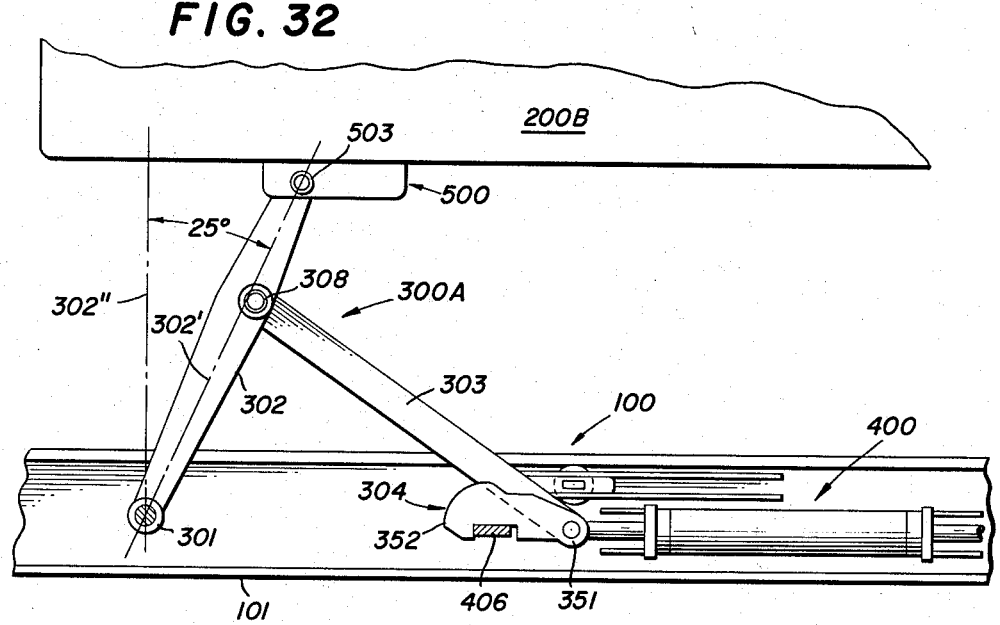
Figure 33:
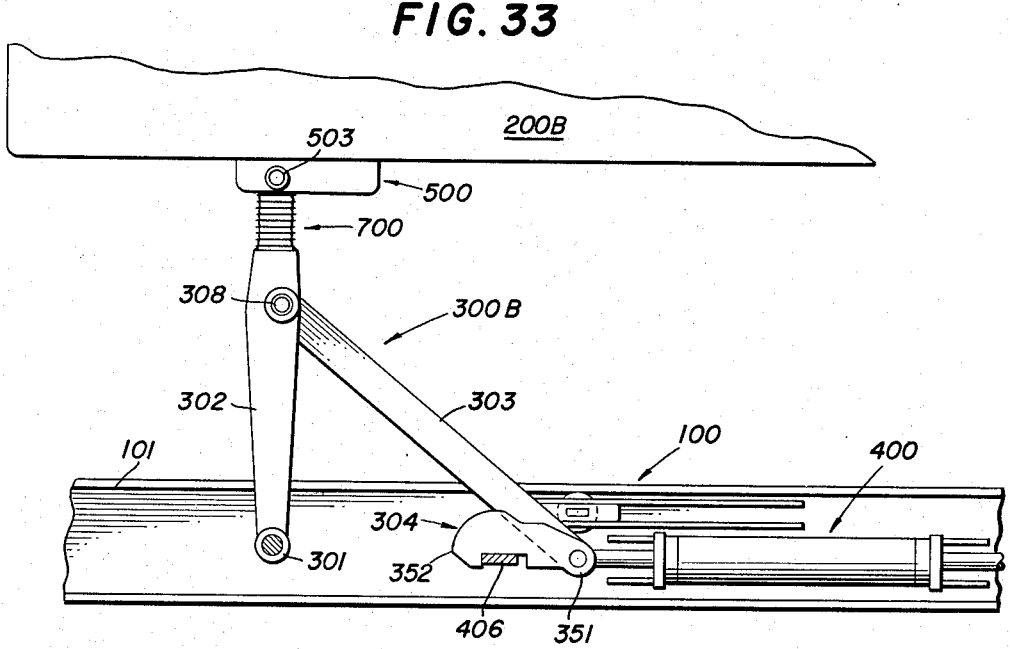
Figure 36:
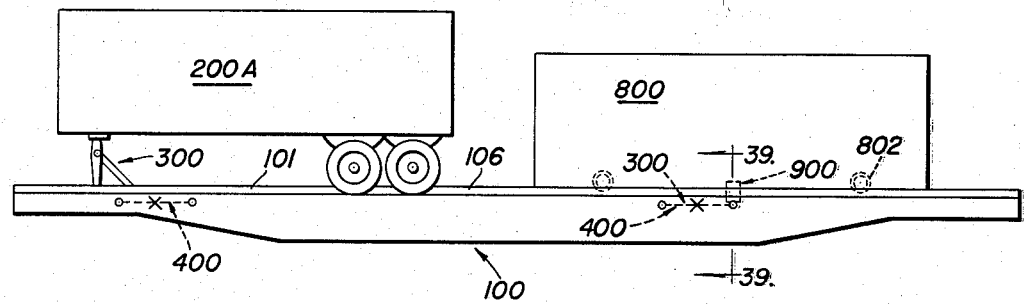
Figure 37:
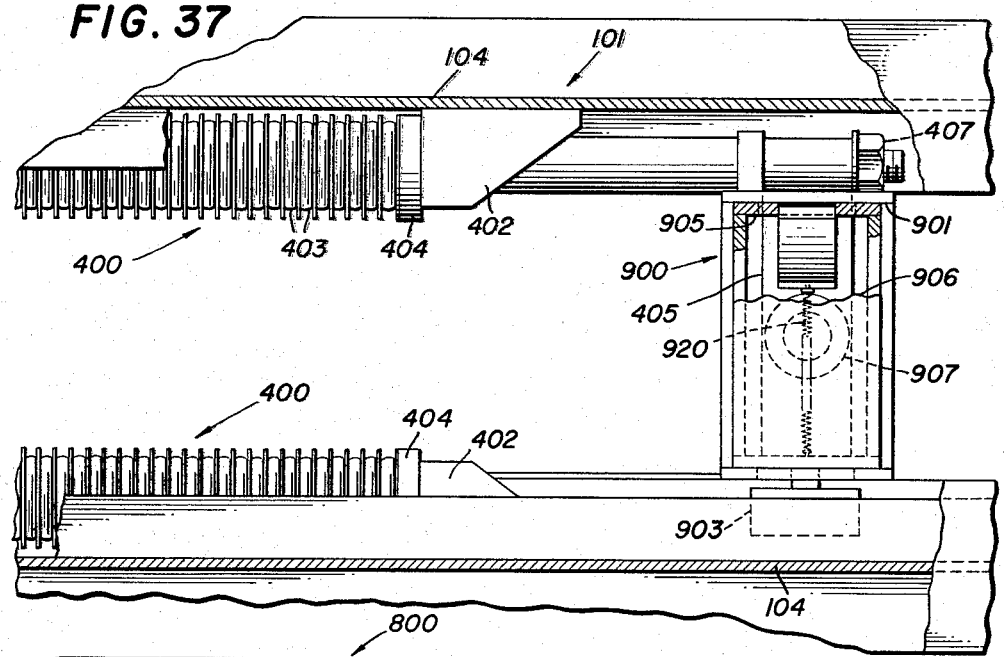
Figure 38:
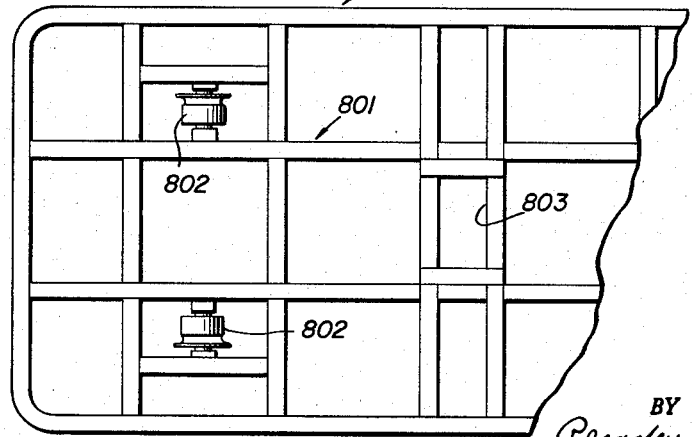

FIG. 17 is an enlarged side elevational view, partially diagrammatic, of the railway car and the equipped road semi-trailer, as shown in FIG. 1, and also illustrating the rear end of a tractor that is employed in loading the semi-trailer upon the railway car, this figure particularly illustrating the initial step in operating the cooperating semi-trailer hitch from its storage position into its erected position;

FIG. 18 is another enlarged side elevational view, similar to FIG. 17, partially diagrammatic, of the railway car and the equipped road semi-trailer, as shown in FIG. 1, and illustrating the rear end of the tractor that is employed in loading the semi-trailer upon the railway car, this figure particularly illustrating the final step in operating the cooperating semi-trailer hitch from its storage position into its erected position and the transfer of the king pin from the fifth-wheel mechanism carried by the rear end of the tractor to the fifth-wheel mechanism carried by this hitch;

FIG. 19 is an enlarged fragmentary side elevational view of this semi-trailer hitch in its erected position, as shown in FIG. 18, and illustrating the extreme forward and rearward pivotal positions thereof with respect to its normal upstanding attitude, incident to shock-absorbing actions therein;

FIG. 20 is a greatly enlarged fragmentary side elevational view of this semi-trailer hitch in its erected position, as shown in FIG. 18, and illustrating both the latch mechanism provided in this hitch for restraining the same in its erected position and the latch mechanism provided in the fifth-wheel mechanism carried thereby, and also illustrating the cooperation between certain elements carried by the extreme rear end of the tractor and the two latch mechanisms mentioned, this figure further illustrating the latch position of the latch mechanism carried by this hitch;

FIG. 21 is another greatly enlarged fragmentary side elevational view, similar to FIG. 20, of the latch mechanism provided in this semi-trailer hitch, and illustrating the linkage incorporated therein immediately following tripping of the latch mechanism;

FIG. 22 is a greatly enlarged fragmentary plan view of the diagonal strut incorporated in this semi-trailer hitch, taken in the direction of the arrows along the lines 22—22 in FIG. 20;

FIG. 23 is a greatly enlarged transverse sectional view of the diagonal strut, taken in the direction of the arrows along the line 23—23 in FIG. 22;

FIG. 24 is a greatly enlarged transverse sectional view of the diagonal strut, taken in the direction of the arrows along the line 24—24 in FIG. 22;

FIG. 25 is a greatly enlarged rear elevational view of the standard incorporated in this semi-trailer hitch, taken in the direction of the arrows along the line 25—25 in FIG. 20;

FIG. 26 is a greatly enlarged end elevational view, partly broken away, of the trunnion arrangement mounting one lower end of the standard, taken in the direction of the arrows along the line 26—26 in FIG. 25;

FIG. 27 is a greatly enlarged transverse sectional view of the standard, taken in the direction of the arrows along the line 27—27 in FIG. 25;

FIG. 28 is a greatly enlarged fragmentary rear view of the lower portion of the mounting arrangement for the standard, as shown in FIG. 25;

FIG. 29 is a greatly enlarged end elevational view, partly broken away, of the trunnion arrangement mounting the other lower end of the standard, taken in the direction of the arrows along the line 29—29 in FIG. 28;

FIG. 30 is a greatly enlarged fragmentary horizontal sectional view of one of the shock-absorbing mechanisms mounted in the center sill of the railway car and cooperating with the semi-trailer hitch of FIGS. 1 and 18, this figure being taken in the direction of the arrows along the line 30—30 in FIG. 18;

FIG. 31 is a greatly enlarged lateral sectional view of this shock-absorbing mechanism, taken in the direction or the arrows along the line 31—31 in FIG. 30;

FIG. 32 is an enlarged fragmentary side elevational view, similar to FIG. 18, illustrating a modified form of the semi-trailer hitch, wherein the standard thereof in its erected position occupies a normal upstanding attitude that is rearwardly inclined with respect to the vertical;

FIG. 33 is an enlarged fragmentary side elevational view, similar to FIG. 18, illustrating another modified form of the semi-trailer hitch and incorporating an additional shock-absorbing mechanism in the vertical standard immediately below the fifth-wheel mechanism carried thereby;

FIG. 34 is a greatly enlarged fragmentary side elevational view of the upper portion of the semi-trailer hitch, as shown in FIG. 33;

FIG. 35 is a greatly enlarged fragmentary front elevational view of the semi-trailer hitch, taken in the direction of the arrows along the line 35—35 in FIG. 34;

FIG. 36 is a reduced side elevational view of the freight transportation system, similar to FIGS. 1 and 2, and illustrating a modified form thereof, including the railway car carrying an unequipped road semi-trailer upon the left-hand end thereof and a freight container upon the right-hand end thereof;

FIG. 37 is a fragmentary plan view of the rear portion of the other shock-absorbing mechanism, similar to that shown in FIG. 30, that is arranged in the center sill of the railway car and incorporating a freight container hitch;

FIG. 38 is an enlarged fragmentary plan view of the underframe of the freight container, as shown in FIG. 36, and illustrating the portions of the understructure that cooperate with this hitch; and FIG. 39 is a greatly enlarged transverse sectional view of the railway car, taken in the direction of the arrows along the line 39—39 in FIG. 36, and illustrating the cooperation between the freight container hitch and the underframe of the freight container.

Referring now to FIGS. 1 and 2 of the drawings, the freight transportation system there illustrated, and embodying the features of the present invention, essentially comprises a railway car 100 of the universal type in that it is adapted to support and to transport indiscriminately road vehicles of first and second types. As illustrated, a road vehicle 200A of the first type is mounted on the right-hand end of the railway car 100 and a road vehicle 200B of the second type is mounted on the left-hand end of the railway car 100. Specifically, the road vehicle 200A of the first type is in the form of a road semi-trailer and essentially comprises a chassis provided with a rear end carrying road wheels 201 and a front end carrying both a king pin 202 and a front landing gear 203, as well as a body 204 adapted to receive the cargo that is to be transported. The road vehicle 200B of the second type is also in the form of a road semi-trailer and is essentially of the same construction as that of the road vehicle 200A of the first type, except that it also carries at the rear end thereof dolly mechanisms including track rollers, indicated at 205. Accordingly, it will be understood that the road semi-trailer 200A of the first type is entirely conventional and is unequipped with respect to the dolly mechanisms mentioned; whereas the road semi-trailer 200B of the second type is entirely conventional, except for the incorporation therein of the dolly mechanisms mentioned. Thus hereinafter, the road semi-trailer 200A of the first type is referred to as an "unequipped" trailer, while the road semi-trailer 200B of the second type is referred to as an "equipped" trailer.

Figure 6:
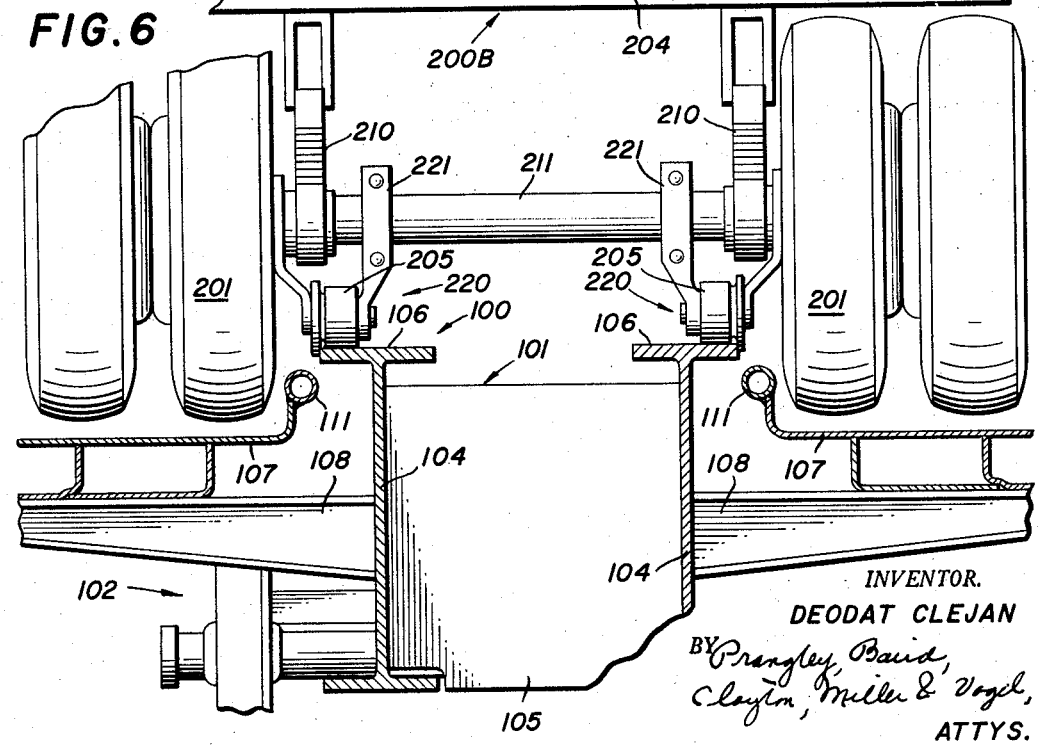
FIG. 6 is an enlarged lateral sectional view of the railway car, taken in the direction of the arrows along the line 6—6 in FIG. 1, and illustrating the supporting arrangement for the mounted equipped road semi-trailer.
Figure 10:
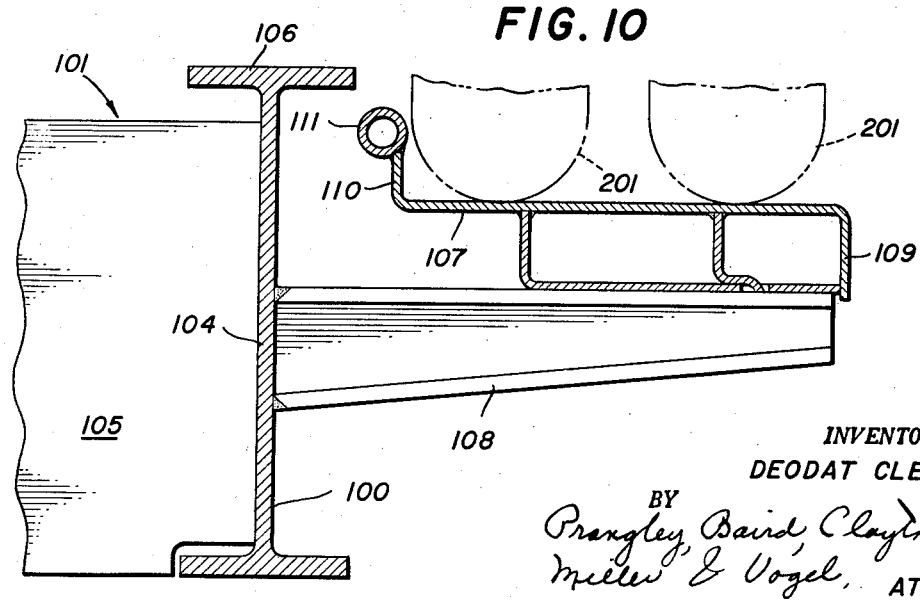
FIG. 10 is a greatly enlarged fragmentary lateral sectional view of the railway car of FIGS. 1, 2 and 9, illustrating one of the roadway platforms and one of the inside wheel guide rails incorporated therein.

Before proceeding with further description of the structural details of the trailers 200A and 200B, it is pointed out that the railway car 100 of the universal type essentially comprises, as best shown in FIGS. 1, 2, 3, 6 and 7, a longitudinally extending center sill 101 of "fish-belly" construction supported at the opposite ends thereof by a pair of trucks 102 of standard rail gauge that cooperate with an associated railway track 103, also of standard rail gauge. The center sill 101 essentially comprises a pair of longitudinally extending and laterally spaced-apart I-beams 104 that are suitably connected together at a plurality of longitudinally spaced-apart points by a corresponding plurality of cross braces 105. The top flanges 106 of the I-beams constitute a pair of longitudinally extending and laterally spaced-apart rails provided on the top of the center sill 101 and constituting a trackway of given narrow gauge. Also the railway car 100 comprises a pair of longitudinally extending and laterally spaced-apart platforms 107 respectively carried by the outer sides of the webs of the I-beams 104 and respectively projecting outwardly therefrom and disposed below the top flanges 106 and constituting a roadway of standard road gauge. In the arrangement, and as best shown in FIGS. 6, 7 and 10, each of the platforms 107 is supported by a plurality of longitudinally spaced-apart and laterally outwardly projecting cantilever beams 108 disposed therebelow in supporting relation therewith, the inner ends of the beam 108 being rigidly secured, as by welding, to the outer side of the web of the adjacent I-beam 104. Specifically, each of the platforms 107 is of fabricated structure and of substantial box-like configuration, including an outer downwardly turned flange 109 and an inner upwardly turned flange 110. Also, the railway car 100 comprises a pair of longitudinally extending and laterally spaced-apart wheel guide rails 111 respectively carried upon the extreme upper ends of the upwardly directed flanges 110 provided on the inner edges of the platforms 107. As best shown in FIG. 10, each of the wheel guide rails 111 is preferably of substantially tubular form and is secured, as by welding, upon the extreme upper end of the associated upwardly directed flange 110; whereby each of the wheel guide rails 111 is disposed below the adjacent rail 106 carried on the top of the associated I-beam 104 and above the top of the associated platform 107. Also, each of the wheel guide rails 111 is disposed laterally outwardly of the adjacent rail 106 and laterally inwardly of the inner edge of the associated platform 107 and presents a smooth outwardly facing rubbing surface to the adjacent inner surface of the inner road wheel 201 carried by an unequipped trailer 200A; which arrangement is utilized for a purpose more fully explained hereinafter.

As best shown in FIG. 7, the unequipped trailer 200A is provided at the rear end thereof with spring mechanisms 210 carrying a pair of laterally extending tandem axles 211 that, in turn, carry the road wheels 201 on the outer ends thereof, dual road wheels 201 being illustrated for the purpose of description. When the unequipped trailer 200A is mounted upon the top of the railway car 100, the road wheels 201 directly engage the platforms 107 so that the rear axles 211 straddle the top of the center sill 101 and are positioned above the track rails 106 and out of contact therewith, as clearly illustrated in FIG. 7.

As best shown in FIG. 6, the equipped trailer 200B is constructed at the rear end thereof in a manner identical to that of the unequipped trailer 200A, as shown in FIG. 7, except for the provision of the previously mentioned dolly mechanisms, indicated at 220. For the purpose of the present description, the dolly mechanisms 220 have been illustrated as essentially comprising brackets 221 suitably secured to the opposite sides of the rear axles 211 in straddling relation with respect to the respectively associated spring mechanisms 210; whereby the track rollers 205 respectively carried by the brackets 221 are disposed directly below the spring mechanisms 210 and are of the previously mentioned narrow gauge of the track rails 206. When the equipped trailer 200B is mounted upon the top of the railway car 100 the track rollers 205 carried by the rear axles 211 straddle the track rails 106 and engage the same for the purpose of supporting the rear end of the trailer 200B so as to mount the same upon the top of the center sill 101 with the road wheels 201 projecting outwardly over the platforms 107 and positioned thereabove and out of contact therewith, as clearly illustrated in FIG. 6.

Recapitulating: When the unequipped trailer 200A is mounted upon the top of the center sill 101, the rear end thereof is directly supported by the engagements between the road wheels 201 and the platforms 107; and when the equipped trailer 200B is mounted upon the top of the center sill 101, the rear end thereof is directly supported by the engagements between the track rollers 205 and the track rails 106.

Again referring to FIGS. 1 and 2, the railway car 100 carries two longitudinally spaced-apart semi-trailer hitches 300 of identical construction and arrangement, one of the hitches 300 being disposed adjacent to the left-hand end of the railway car 100, as shown in FIG. 1, and normally disposed in supporting relation with the cooperating front end of the trailer 200B mounted upon the left-hand end of the railway car 100, and the other of the hitches 300 being disposed adjacent to the central portion of the railway car 100, as shown in FIG. 2, and normally disposed in supporting relation with the cooperating front end of the trailer 200A mounted upon the right-hand end of the railway car 100. As explained more fully hereinafter, the hitch 300 disposed in supporting relation with the front end of the trailer 200B also normally latches in place the king pin 202 thereof; and similarly, the hitch 300 disposed in supporting relation with the front end of the trailer 200A also normally latches in place the king pin 202 thereof. Accordingly, regardless of the type of the semi-trailer 200A or 200B that is mounted upon the top of the railway car 100, the front end thereof is always supported in the same manner by the cooperating hitch 300, and also regardless of the mounted position of the semi-trailer with respect to the opposite ends of the railway car 100.

A plurality of the railway cars 100 are normally arranged in a train, the adjacent ends of the railway cars being coupled together by car couplers, not shown; and the semi-trailers 200A and 200B are loaded indiscriminately upon the string of railway cars 100 longitudinally with respect to the train. In order to accommodate such longitudinal loading of the trailers 200A and 200B, each of the railway cars 100 comprises end structure providing both a continuous trackway and a continuous roadway along the train of railway cars 100; and this end structure that is provided at the left-hand end of the railway car 100 is best shown in FIGS. 1, 3, 4 and 5. More particularly, and referring to FIG. 3, the lower car rail 106 has pivotally connected thereto a bridging rail 120 and the lower car platform 111 has pivotally connected thereto a bridging platform 121. As best shown in FIGS. 4 and 5, the inner end of the bridging rail 120 is pivotally connected by a pivot pin 122 to the adjacent extreme outer end of the lower car rail 106 and the inner end of the bridging platform 121 is pivotally connected by a pivot pin 123 to the adjacent extreme outer end of the lower car platform 107. The outer end of the bridging rail 120 is provided with structure 124 that is adapted to cooperate with an abutment, indicated at 125, carried by the adjacent extreme outer end of the rail structure of the coupled railway car; and the extreme outer end of the bridging platform 121 is provided with structure 126 that is adapted to cooperate with an abutment, indicated at 127, carried by the adjacent extreme outer end of the platform structure of the coupled railway car. The bridging rail 120 and the bridging platform 121 each have active positions, indicated in solid lines in FIG. 4, and inactive positions, indicated in dotted lines in FIG. 4; and the bridging rail 120 and the bridging platform 121 are movable together between their active and inactive positions, as explained more fully hereinafter. More particularly, when the bridging rail 120 occupies its active position, its lower position illustrated in FIG. 4, the structure 124 engages the adjacent abutment 125, thereby completing a continuous rail system between the two coupled railway cars 100; and likewise, when the bridging platform 121 occupies its active position, its lower position illustrated in FIG. 4, the structure 126 engages the abutment 127, thereby completing a continuous road system between the two coupled railway cars 100.

It will be understood that the right-hand end of the railway car 100 comprises end structure identical to that provided at the left-hand end of the railway car 100, except that the bridging rail and the bridging platform involved are disposed in cooperating relation with respect to the upper car rail 106 and the upper car platform 107. Accordingly, each railway car 100 carries at each end thereof end structure that is complementary to the end structure carried by either end of any other railway car 100, so that, either end of any railway car 100 may be connected to either end of another railway car 100. This will be best understood by reference to FIG. 3, wherein it will be appreciated that the rail bridge 120 and the platform bridge 121 carried at the left-hand end of the railway car illustrated produces continuous rail and road systems with respect to the lower side of the right-hand end of the coupled railway car, not shown, disposed at the left of the railway car 100 illustrated; while the rail bridge indicated at 120' and the platform bridge indicated at 121' carried at the right-hand end of the coupled railway car, not illustrated, produce continuous rail and road systems with respect to the upper side of the left-hand end of the railway car 100 illustrated. Also it is noted that, as shown in FIG. 3, the upper surfaces of the car platforms 107 and the upper surfaces of each of the bridging platforms 121 may carry embosses, respectively indicated at 107a and 121a, so as to provide additional frictional contact with the engaging road wheels 201 of a semi-trailer 200A or 200B, or other road vehicle, supported thereby.

Again referring to FIGS. 4 and 5, the bridging rail 120 and the bridging platform 121 are actuated simultaneously by an arrangement including a manually operable lever or handle 130 that is connected at the lower end thereof to a bushing 131 mounted upon a pivot pin carried by a plate 132 secured to the adjacent outer edge of the car platform 107. The bushing 131 is rigidly connected to the inner end of an arm 133, the outer end of which is connected to a tube 134 that is, in turn, connected to the underportion of the bridging platform 121 by a pair of tabs 135. Also, the bridging platform 121 is linked to the bridging rail 120 by an arrangement including a tab 136 carried by the bridging rail 120, and a link 137. One end of the link 137 is connected by a pivot pin 138 arranged in the end of the tube 134 and the other end of the link 137 is connected to the tab 136 by a spindle 139. Accordingly, when the lever or handle 130 is rotated in the clockwise direction, as viewed in FIG. 4, from its position illustrated, the bushing 131 is correspondingly rotated causing the arm 133 to lift the bridging platform 121 from its active position illustrated in full lines into its inactive position illustrated in dotted lines. As the bridging platform 121 is thus rotated in the clockwise direction, as viewed in FIG. 4, about the pivot pin 123, the motion is transmitted by the link 137 to the bridging rail 120 so that the bridging rail 120 is rotated in the clockwise direction about the pivot pin 122 from its active position illustrated in full lines into its inactive position illustrated in dotted broken lines. Accordingly, it will be understood that the bridging rail 120 and the bridging platform 121 may be readily moved simultaneously between their active and inactive positions by corresponding manipulations of the lever or handle 130. At this point it is mentioned that the bridging rail 120 and the bridging platform 121 occupy their lowered or active positions only during loading of the semi-trailers 200A and 200B upon the coupled railway cars 100; and after the loading operation, the bridging rail 120 and the bridging platform 121 are operated into their raised or inactive positions. It will, of course, be understood that the inactive positions of the bridging rails 120 and the bridging platforms 121 accommodate articulation of the coupled railway cars 100, without bending or other damage to these bridging elements 120 and 121.

The above-described mechanism for simultaneously actuating the bridging rail 120 and the bridging platform 121 between their respective active or use positions and their inactive or storage positions is disclosed and claimed in U.S. Patent No. 3,063,386, granted on November 13, 1962.

As previously noted, the semi-trailers 200A and 200B are normally loaded longitudinally upon the railway car, and ordinarily a tractor is employed in this operation; which tractor may be either equipped or unequipped. The unequipped tractor is entirely conventional, comprising a chassis provided with a front axle carrying front road wheels that are steered and a rear axle carrying rear road wheels that are driven, as well as a motor and the usual facilities. Also, the rear end of the unequipped tractor carries a conventional fifth-wheel mechanism that is selectively operative between active and inactive positions with respect to the depending king pin 202 carried by the front end of the semi-trailer 200A or 200B, the fifth wheel mechanism in its active position supporting the front end of the semi-trailer and latching the king pin in place, and the fifth-wheel mechanism in its inactive position unlatching the king pin to facilitate the removal of the semi-trailer from its supported position. The equipped tractor is identical to the above described conventional tractor, except that it further comprises low front rollers carried by the front axle and disposed inwardly with respect to the front road wheels, and also driven rear rail wheels disposed inwardly with respect to the rear road wheels. The front rollers are flanged to face inwardly so that they are adapted to straddle the track rails 106 carried on the top of the center sill 101 of the railway car 100 and to guide thereon. The driven rear rail wheels are driven together with the rear road wheels and are also flanged to face inwardly so that they too are adapted to straddle the track rails 106 carried on the top of the center sill 101 of the railway car 100 and to guide thereon.

In the loading operation the fifth-wheel mechanism carried by the tractor, and regardless of the type thereof, is coupled to the king pin 202 carried by the front end of the semi-trailer 200A or 200B, and this coupled unit is backed upon the railway car 100. In the event the unequipped semi-trailer 200A is involved, the road wheels 201 thereof engage the platforms 107 and cooperate with the wheel guide rails 111 to insure centering of the semi-trailer 200A upon the top of the railway car 100 as it is backed in place thereon. In the event the equipped semi-trailer 200B is involved, the low rollers 205 carried by the rear axle 211 straddle and engage the track rails 106 and guide thereon so that the road wheels 201 are disposed above the platforms 107, whereby automatic centering of the semi-trailer 200B is assured. The guiding and centering of an unequipped tractor, as it is backed upon the top of the railway car 100, is substantially identical to that of the unequipped semi-trailer 200A; and likewise, the centering and guiding of the equipped tractor, as it is backed upon the top of the railway car 100, is substantially identical to that of the equipped semi-trailer 200B.

Figure 8:
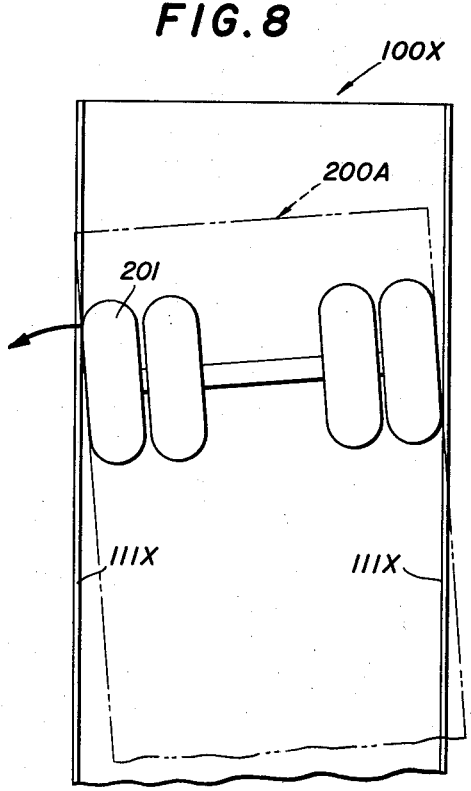
FIG. 8 is a diagrammatic plan view of a conventional railway flat car provided with outside wheel guide rails, and mounting an unequipped road semi-trailer, and illustrating undesirable jack-knifing tendency incident to misaligned loading of the road semi-trailer upon the railway car.
Figure 9:
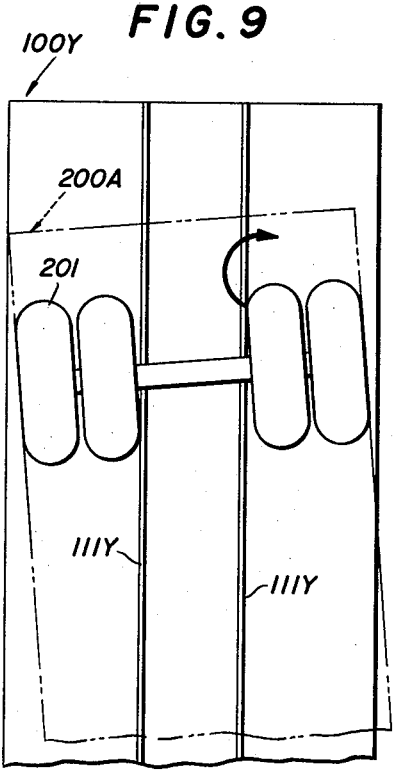
FIG. 9 is a diagrammatic plan view of the inventive railway car of FIGS. 1 and 2 incorporating inside wheel guide rails, and mounting an unequipped road semi-trailer, and illustrating desirable centering tendency incident to misaligned loading of the road semi-trailer upon the railway car.

Before describing in greater detail the centering and guiding of an unequipped semi-trailer and an unequipped tractor upon the railway car 100, reference is made to the schematic diagram of FIGS. 8 and 9. In FIG. 8, there is illustrated a conventional railway flat car 100X that is provided with outside wheel guide rails 111X disposed along the opposite sides thereof, and there is shown diagrammatically an unequipped semi-trailer 200A mounted upon the top of the conventional railway flat car 100X, and illustrating the case wherein there is substantial misalignment between the center line of the conventional railway car 100X and the center line of the unequipped semi-trailer 200A. In FIG. 9, there is illustrated diagrammatically an unequipped semi-trailer 200A mounted upon the top of the inventive railway car 100Y, provided with the inside wheel guide rails 111Y disposed adjacent to the center thereof and on opposite sides of the center line thereof, and illustrating the case wherein there is substantial misalignment between the center line of the inventive railway car 100Y and the center line of the unequipped semi-trailer 200A.

Referring more particularly to FIG. 8, it will be observed that under the conditions mentioned, wherein there is a substantial misalignment between the center line of the unequipped semi-trailer 200A and the center line of the conventional railway flat car 100X, as the semi-trailer 200A is backed, one of the outside road wheels 201 thereof engages the adjacent outside guide rail 111X, thereby exerting a rotational torque upon the rear end of the semi-trailer 200A tending to cause further misalignment between the two center lines mentioned and the resulting jack-knifing of the semi-trailer 200A with respect to the tractor, at the connection between the king pin 202 of the semi-trailer 200A and the supporting fifth-wheel mechanism carried by the rear end of the tractor. When this occurs, the driver must operate the tractor in the forward direction in order to relieve the jack-knifing mentioned; whereby the loading of the unequipped semi-trailer 200A upon the conventional flat car 100X is effected by a series of alternate rearward and forward movements of the unequipped semi-trailer 200A and the coupled tractor; which operations are, of course, time-consuming and substantially injurious to the rubber of the road wheels carried by these two coupled vehicles.

Referring more particularly to FIG. 9, it will be observed that under the conditions mentioned, wherein there is a substantial misalignment between the center line of the unequipped semi-trailer 200A and the center line of the inventive railway car 100Y, as the semi-trailer 200A is backed, one of the inside road wheels 201 thereof engages the adjacent inside guide rail 111Y, thereby exerting a rotational torque upon the rear end of the semi-trailer 200A tending to minimize the misalignment between the two center lines mentioned and the resulting prevention of jack-knifing of the semi-trailer 200A with respect to the tractor, at the connection between the king pin 202 of the semi-trailer 200A and the supporting fifth-wheel mechanism carried by the rear end of the tractor. Since this occurs, the driver may continue to operate the tractor in the rearward direction, as the jack-knifing tendency mentioned is automatically relieved; whereby the loading of the unequipped semi-trailer 200A upon the inventive railway car 100Y is effected by a continuous rearward movement of the unequipped semi-trailer 200A and the coupled tractor; which operations are, of course, effected rapidly and without damage to the rubber of the road wheels carried by these two coupled vehicles.

With further reference to the wheel guiding and centering arrangement that is incorporated in the railway car 100, it will be observed in FIGS. 3 and 4 that the wheel guiding rails 111 extend substantially from end-to-end of the center sill 101 and that each extreme outer end of each wheel guiding rail 111 is flared and curved inwardly toward the web of the adjacent I-beam 104, as indicated at 111a, thereby positively to prevent scuffing of the inside surface of the rubber of the inside road wheels 201 carried by the unequipped road semi-trailer 200A incident to loading the same upon the railway car 100 in the manner described above.

Referring now to FIGS. 17, 18 and 19, the semi-trailer hitch 300 that is incorporated in the left-hand end of the railway car 100 and arranged in cooperating relation with the equipped semi-trailer 200B is illustrated in greater detail; which semi-trailer hitch 300 is identical to the semi-trailer hitch 300 incorporated in the central portion of the railway car 100 and arranged in cooperating relation with the unequipped semi-trailer 200A. The semi-trailer hitch 300 illustrated essentially comprises a laterally extending trunnion 301 supported at the opposite ends thereof in the webs of the laterally spaced-apart I-beams 104 of the center sill 101, a standard 302, and a strut 303; which hitch 300 is operative between a storage position, as shown in FIG. 17, wherein it is disposed within the hollow center sill 101 and below the top thereof, and an erected position, as shown in FIG. 18, wherein it is disposed out of the hollow center sill 101 and well above the top thereof. Also two longitudinally spaced-apart shock-absorbers 400 are incorporated in the center sill 101 and respectively arranged in cooperating relation with the semi-trailer hitches 300. Furthermore, the upper end of the standard 302 of each of the semi-trailer hitches 300 carries a fifth-wheel mechanism 500; and as illustrated in FIGS. 18 and 19, when the semi-trailer hitch 300 occupies its erected position, the fifth-wheel mechanism 500 is adapted to support the front end of the associated equipped semi-trailer 200B, the fifth-wheel mechanism 500 engaging and holding the cooperating king pin 202 depending from the front end of the semi-trailer 200B, as indicated in FIG. 18. Also, when the hitch 300 occupies its erected position, the rear end of the strut 303 is operatively connected to the shock-absorbing mechanism 400 by latch structure 304 that is carried by the lower end of the strut 303.

As best shown in FIGS. 20 and 25 to 29, inclusive, the trunnion 301 is of generally tubular form, and the standard 302 comprises a pair of laterally spaced-apart legs 305, each of substantially box-like form, as shown in FIG. 27, and rigidly secured to the intermediate portion of the trunnion 301, as by welding. Also, the connections between the lower ends of the legs 305 and the trunnion 301 are reinforced by suitable gusset plates 306 secured in place, as by welding, between the lower ends of the legs 305 and the trunnion 301. Further, the outer ends of the trunnion 301 are reinforced adjacent to the lower portions thereof by suitable gusset plates 307, so as to lend the required rigidity to the trunnion 301. The upper portions of the legs 305 are rigidly secured together by a laterally extending pivot pin 308, to which the upper end of the strut 303 is pivotally connected, as explained more fully hereinafter; also, the lower ends of the legs 305 are rigidly secured together by a tie plate 309 that is further secured to the adjacent central portion of the trunnion 301. Further, the front sides of the legs 305 carry forwardly projecting ears 310 between which there is rigidly secured a hook shaft 311 (see FIGS 20, 25 and 28), that is employed in operating the hitch 300 from its storage position of FIG. 17 into its erected position of FIG. 18. The upper ends of the legs 305 taper outwardly, as illustrated in FIG. 25; and the extreme upper ends of the legs 305 carry a pair of laterally spaced-apart lugs 312 to which the associated fifth-wheel mechanism 500 is pivotally connected, as explained more fully hereinafter.

Referring now to FIGS. 25 to 29, inclusive, the opposite ends of the trunnion 301 terminate respectively adjacent to the inside surfaces of the webs of the associated I-beams 104 and are respectively supported for pivotal movements by associated bearing structures 313 and 314 located between the upper and lower flanges of the respectively associated I-beams 104. As viewed in FIG. 28, the bearing structure 313 is arranged at the left-hand end of the trunnion 301 and the bearing structure 314 is arranged at the right-hand end of the trunnion 301; whereby the standard 302 is disposed between the upper flanges or track rails 106 of the I-beams 104 of the center sill 101, so that the standard 302 may be readily pivoted between its stored and erected positions, as previously noted, without interference with the I-beams 104. More particularly, the bearing structure 313 comprises a supporting ring 315 that is rigidly secured to the adjacent inner surface of the web of the associated I-beam 104 by a plurality of gusset plates 316; which supporting ring 315 receives a bearing ring 317 internally thereof and arranged for rotary movements with respect thereto; which bearing ring 317 is arranged in surrounding relation with the adjacent left-hand end of the trunnion 301 with a resilient cushioning ring 318 therebetween. Preferably, the cushioning ring 318 is formed of neoprene, or other resilient rubber-like material, and is bonded to the adjacent inner surface of the bearing ring 317 and to the adjacent outer surface of the left-hand end of the trunnion 301. Similarly, the bearing structure 314 comprises a supporting ring 319 that is rigidly secured to the adjacent inner surface of the web of the associated I-beam 104 by a plurality of gusset plates 320; which supporting ring 319 receives a bearing ring 321 internally thereof and arranged for rotary movements with respect thereto; which bearing ring 321 is arranged in surrounding relation with the adjacent right-hand end of the trunnion 301 with a resilient cushioning ring 322 therebetween. Preferably, the cushioning ring 322 is formed of neoprene, or other resilient rubber-like material, and is bonded to the adjacent inner surface of the bearing ring 321 and to the adjacent outer surface of the right-hand end of the trunnion 301.

Accordingly, it will be appreciated that the bearing structures 313 and 314 not only support the trunnion 301 for pivotal movements between the webs of the associated laterally spaced-apart I-beams 104, but they also provide a resilient mounting between the trunnion 301 and the I-beams 104, thereby effecting cushioning of the standard 302 in its erected position, for a purpose more fully explained hereinafter.

Still referring to FIG. 28, a pair of aligned openings 323 are respectively formed in the webs of the laterally spaced-apart I-beams 104 in alignment with the opposite ends of the tubular trunnion 301; and arranged within the tubular trunnion 301 and extending laterally therethrough is a torsion member 324 that essentially comprises a plurality of individual leaf springs 325 arranged in stacked relation, as best illustrated in FIGS. 26 and 29. Referring now to FIGS. 28 and 29, a pair of abutments 326 are arranged in the outer left-hand end of the tubular trunnion 301 and rigidly secured thereto; which abutments 326 are disposed on opposite sides of the adjacent left-hand end of the torsion member 324; whereby the left-hand end of the torsion member 324 rotates directly with the adjacent left-hand end of the trunnion 301 incident to rotation of the trunnion 301 in the bearing structures 313 and 314. Referring now to FIGS. 28 and 26, a cap 327 is arranged on the outer side of the web of the I-beam 104 disposed on the right-hand side of the center sill 101, as viewed in FIG. 28; which cap 327 carries an upwardly projecting tab 328 arranged between a pair of outwardly projecting ears 329 rigidly secured to the adjacent outer surface of the adjacent web of the I-beam 104; and the tab 328 is mounted upon the ears 329 for pivotal movement with respect thereto by an associated pivot pin 330. Thus, it will be understood that the cap 327 is pivotally movable with respect to the associated web of the I-beam 104 about the pivot pin 330, thereby to afford access to the adjacent right-hand end of the torsion member 324, when the cap 327 occupies its open position with respect to the associated opening 323. Further, a substantially U-shaped retainer 331 is disposed below the cap 327 and rigidly secured to the adjacent surface of the web of the I-beam 104; which retainer 331 restrains the cap 327 against longitudinal movements from side to side, as viewed in FIG. 26. Arranged within the cap 327 are a pair of abutments 332 that are rigidly secured thereto and disposed on opposite sides of the adjacent right-hand end of the torsion member 324.

When the standard 302 occupies its erected position, the torsion member 324 is unstrained and may be removed from its normal position within the trunnion 301 through the opening 323 provided in the web of the adjacent I-beam 104 in the left-hand end of the trunnion 301, as viewed in FIG. 28, after removal of an associated cover 333 carried by the adjacent web of the I-beam 104 and normally secured in place by a bolt 334 provided with an associated nut. Accordingly, when the standard 302 occupies its erected position, the unstrained torsion member 324 extends laterally through the trunnion 301, the left-hand end of the torsion member 324 being disposed between the associated abutments 326 rigidly secured to the trunnion 301 and the right-hand end of the torsion member 324 projecting through the opening 323 provided in the web of the associated I-beam 104 and into the cap 327 and disposed between the abutments 332 rigidly secured thereto. As the standard 302 is moved from its erected position, as shown in FIG. 18, toward its storage position, as shown in FIG. 17, the trunnion 301 is rotated in the clockwise direction causing the abutments 326 arranged in the left-hand end thereof to twist the left-hand end of the torsion member 324 in the clockwise direction, as viewed in FIG. 29, so that the right-hand end of the torsion member 324 is rotated in the counterclockwise direction, as viewed in FIG. 26. The initial counterclockwise rotation of the torsion member 324, as viewed in FIG. 26, is unopposed; however, after rotation of the torsion member 324 through a predetermined angle in the counterclockwise direction, the right-hand end thereof engages the abutments 332 that are arranged in the cap 327 and rigidly secured thereto, whereby the torsion member 324 is strained as the left-hand end thereof is rotated further in the clockwise direction, as viewed in FIG. 29, since the right-hand end of the torsion member 324 cannot be rotated further in the counterclockwise direction, as viewed in FIG. 26, as the cap 327 is fixedly secured to the web of the adjacent I-beam 104 by the arrangement including the ears 329 and the retainer 331, as shown in FIG. 26. Accordingly, as the standard 302 is pivoted in the clockwise direction from its erected position of FIG. 18, into its storage position of FIG. 17, the torsion member 324 is strained, or twisted between the pair of abutments 326 and the pair of abutments 332, so as to store energy in the torsion member 324 as the standard 302 is pivoted into its final storage position, as shown in FIG. 17. Of course, this straining of the torsion member 324 is productive of a reactive force between the cap 327 and the left-hand end of the trunnion 301, as viewed in FIG. 28, thereby opposing the final pivotal movement of the standard 302 into its storage position, as shown in FIG. 17; which reactive force, tending to move the standard 302 from its storage position of FIG. 17 back into its erected position of FIG. 18, minimizes the torque that must be exerted from the outside upon the hitch 300 in order to move the same from its storage position of FIG. 17 into its erected position of FIG. 18.

Referring now to FIGS. 20 to 24, inclusive, and 31, the strut 303 is of substantially box-like form including a pair of side plates 335, a bottom plate 336, a lower top plate 337 and an upper top plate 338. The upper ends of the side plates 335 are inwardly offset toward each other, so that the upper end of the strut 303 is substantially narrower in the lateral direction than is the lower end thereof; the upper end of the strut 303 terminates in a laterally extending hollow bearing 339 that is journalled upon the pivot pin 308 extending between the legs 305 of the standard 302; and the lower end of the strut 303 terminates in respective lower and upper laterally extending tubular members 340 and 341 (see particularly FIG. 20). The upper tubular member 341 is rigidly secured to the lower tubular member 340 by an associated gusset plate 342, and the upper tubular member 341 is rigidly secured to the lower top plate 337 by an associated gusset plate 343; whereby the lower end of the strut 303 carries the tubular members 340 and 341 rigidly secured thereto. The upper tubular member 341 constitutes a bearing member in which there is journalled a laterally extending supporting shaft 344; and the opposite ends of the supporting shaft 344 carry a pair of slides 345 that are respectively arranged in a pair of trackways 346 respectively carried by the pair of laterally spaced-apart I-beams 104.

As best shown in FIGS. 20 and 31, each of the trackways 346 is located adjacent to the junction between the upper portion of the web of the associated I-beam 104 and the upper flange 106 thereof and below the inwardly directed projection of the upper flange 106 thereof; and each of the trackways 346 comprises an upper rail element 347 and a lower rail element 348. The upper rail element 347 may be secured directly to the undersurface of the inwardly directed projection of the upper flange 106, and each of the lower rail elements 347 may be supported by a suitable number of longitudinally spaced-apart gusset plates 349 directly secured to the inner surface of the web of the associated I-beam 104. Finally, the rail elements 347 may be secured together in vertical spaced-apart relationship by a number of longitudinally spaced-apart blocks 350 arranged therebetween.

Accordingly, it will be understood that the upper end of the strut 303 is pivotally connected to the intermediate portion of the standard 302 by the cooperation between the pivot pin 308 and the bearing member 339; while the lower end of the strut 303 is supported by the pair of shoes 345 arranged in sliding engagements with the pair of laterally spaced-apart trackways 346 respectively carried by the laterally spaced-apart I-beams 104 of the center sill 101. Thus the movements of the standard 302 between its storage position of FIG. 17 and its erected position of FIG. 18 are guided upon the center sill 101, and particularly through the strut 303 by the sliding movements of the shoes 345 along the trackways 346. More specifically, when the standard 302 is moved from its erected position, as shown in FIG. 20, the lower end thereof is pivoted in the clockwise direction with the trunnion 301; whereby the lower end of the strut 303 moves toward the right, this movement of the strut 303 being guided by the cooperation between the shoes 345 and the cooperating trackways 346.

Referring now to FIGS. 20, 22 and 30, the lower tubular member 340 carried by the lower end of the strut 303 constitutes a bearing member for a laterally extending shaft 351 that comprises a portion of the previously mentioned latch structure 304. More particularly, the latch structure 304 comprises a pair of laterally spaced-apart latch elements 352 rigidly secured to the extreme outer ends of the shaft 351, the latch elements 352 being disposed outwardly of the respectively adjacent side plates 335 of the strut 303, as shown in FIG. 22. As illustrated, the two latch elements 352 project forwardly with respect to the shaft 351 and are normally biased downwardly in the counterclockwise direction, with respect to the strut 303, as viewed in FIG. 20, by a pair of cooperating laterally spaced-apart coil springs 353. Each of the coil springs 353 cooperates with one of the latch elements 352, one end of the coil spring 353 being arranged in an associated cup 354 rigidly secured to the adjacent side plate 335 of the strut 303, and the other end of the coil spring 353 being received in a recess 352a provided in the upper surface of the adjacent latch element 352 (see FIG. 30). Each of the latch elements 352 carries a downwardly directed latch portion or dog 356 having set and trip positions with respect to the associated shock-absorbing mechanism 400, as explained more fully below.

Referring now to FIGS. 20, 30 and 31, the shock-absorbing mechanism 400 that cooperates with the associated hitch 300 essentially comprises two longitudinally extending and laterally spaced-apart shafts 401 respectively arranged adjacent to the webs of the associated I-beams 104 of the center sill 101 and generally positioned rearwardly of the cooperating lower end of the strut 303 of the hitch 300. More particularly, the shock-absorbing mechanism 400 is housed within the hollow center sill 101, and each of the longitudinally extending shafts 401 is mounted for longitudinal sliding movements with respect to the associated I-beam 104. As illustrated, each of the shafts 401 is mounted for longitudinal movements in a pair of longitudinally spaced-apart brackets 402 carried by the web of the associated I-beam 104 and projecting inwardly with respect thereto. The intermediate portion of the shaft 401 carries a stack of resilient snubbing rings 403 arranged in surrounding relation with respect thereto and disposed between the brackets 402; which snubbing rings 403 are preferably formed of neoprene, or other resilient cushioning material. Specifically, the snubbing rings 403 are disposed in stacked relation between two longitudinally spaced-apart annular collars 404 arranged in surrounding relationship with respect to the shaft 401 and disposed adjacent to the respective brackets 402. The rear ends of the shafts 401 are operatively connected together by a laterally extending rear tie bar 405, and the front ends of the shafts 401 are operatively connected together by a laterally extending front tie bar 406, the tie bars 405 and 406 being removably secured in place by cooperating nuts 407 and 408 arranged on the threaded rear and front ends of the shafts 401. In the arrangement, the front tie bar 406 cooperates with the pair of latch elements 352 carried by the lower end of the strut 303 of the hitch 300; and specifically, the latch elements 352 are operative into set and trip positions with respect to the front tie bar 406, as respectively shown in FIGS. 20 and 21, and explained more fully hereinafter.

It will be understood that when the front tie bar 406 is moved rearwardly, or to the right, with respect to the center sill 101, the rearwardly moving shafts 401 compress the two stacks of snubbing rings 403 between the left-hand collars 404 and the right-hand brackets 402; and conversely, when the tie bar 406 is moved forwardly, or to the left, with respect to the center sill 101, the forwardly moving shafts 401 compress the two slacks of snubbing rings 403 between the right-hand collars 404 and the left-hand brackets 402. According, the mechanism 400 not only resiliently opposes the movements of the front tie bar 406 with respect to the normal position thereof, as illustrated in FIG. 30, but it also snubs these movements and dissipates the energy thereof; which snubbing action is, of course, transmitted to the adjacent hitch 300, when the latch structure 304 occupies its set position.

Again referring to FIGS. 18 and 20, when the standard 302 is pivoted in the counterclockwise direction from its storage position, as shown in FIG. 17, into its erected position, as shown in FIG. 18, the strut 303 moves to the left and into an upwardly inclined position, as shown in FIG. 18; whereby the latch elements 352 carried by the rear of the strut 303 slide over the front tie bar 406 and into their latched positions, as shown in FIGS. 18 and 20; whereby at this time, the lower end of the strut 303 is latched to the adjacent shock-absorbing mechanism 400, thereby to retain the hitch 300 in its erected position. In the erected position of the hitch 300, the standard 302 is biased by the connected shock-absorbing mechanism 400 into a normal upstanding attitude, as shown in FIG. 18, and as indicated by the vertically disposed center line 357, as shown in FIG. 19. At this time, the standard 302 is pivotally movable with the trunnion 301 fore-and-aft with respect to its normal upstanding attitude and longitudinally of the center sill 101 between the extreme forward position, indicated by the center line 358, and the extreme rearward position, indicated by the center line 359, as shown in FIG. 19. These pivotal movements of the standard 302 in its erected position are, of course, transmitted thereto through the fifth-wheel mechanism 500 by the connected equipped semi-trailer 200B, incident to rolling movements of the connected semi-trailer 200B longitudinally of the center sill 101; and these pivotal movements of the standard 302 are transmitted by the strut 303 to the front tie bar 406 of the shock-absorbing mechanism 400; whereby the pivotal movements mentioned are cushioned and limited by the shock-absorbing mechanism 400 effecting corresponding cushioning and limiting of the movements of the semi-trailer 200B. More particularly, as shown in FIG. 19, when the standard 302 occupies its normal upstanding attitude disposed along the center line 357, the front tie bar 406 occupies its normal position disposed along the center line 360; as the standard 302 is pivoted forwardly into the position of the center line 358, the front tie bar 406 is moved forwardly to the position of the center line 361; and as the standard 302 is pivoted rearwardly into the position of the center line 359, the front tie bar 406 is moved rearwardly to the position of the center line 362. From a comparison of the positions of the center lines 357, 358 and 359 with the center lines 360, 361 and 362, it will be appreciated that the movements of the upper end of the standard 302, and consequently of the fifth-wheel mechanism 500 carried thereby, are increased or multiplied with respect to the movements of the front tie bar 406, due to the mechanical advantage of the linkage of the elements incorporated in the hitch 300. In view of the foregoing, it will be appreciated that the shock-absorbing mechanism 400 prevents the transmission of severe longitudinal shocks from the center sill 101 of the railway car 100 to the equipped semi-trailer 200B connected to the high 300 and mounted upon the top of the center sill 101.

Again referring to FIGS. 20 and 21, it is noted that tripping mechanism is incorporated in the hitch 300 for the purpose of selectively operating the latch structure 304 from its latched position, as shown in FIG. 20, into its unlatched position, as shown in FIG. 21. More particularly, a cam 363 is arranged between the laterally spaced-apart latch element 352 and is pivotally mounted upon a pivot pin 364 extending between the latch elements 352. A pair of laterally spaced-apart ears 365 are carried by the lower end of the strut 303 and connected together by a pivot pin 366; and a lever 367 is pivotally mounted upon the pivot pin 366 and arranged in an opening provided in the bottom plate 366 of the strut 303 and adjacent to the cam 363. A link 368 is connected between a pivot pin 369 carried by the cam 363 and a pivot pin 370 carried by the lever 367. A pair of laterally space-apart ears 371 are carried by the upper end of the strut 303 and connected together by a laterally extending pivot pin 372, upon which there is mounted a lever 373. The lower end of the lever 373 is connected by a pivot pin 374 to a fixture 375 that is connected to the upper end of a tie bar 376; and the lower end of the tie bar 376 is connected to a fixture 377 that is connected by a pivot pin 378 to the lever 367. A barrel 379 is secured to the upper end of the standard 302 above the pivot pin 308; and arranged within the barrel 379 is a plunger 380 that is mounted for sliding movement with respect thereto, the outer end of the plunger 380 terminating in a strike button 381, and the plunger 380 being biased toward the left, as viewed in FIG. 20, by a surrounding coil spring 382 acting between the adjacent ends of the barrel 379 and the strike button 381. The right-hand end of the plunger 380 carries a fixture 383 that is secured by a pivot pin 384 to the upper end of the lever 373. Accordingly, the cam 363 is operatively connected to the strike button 381 through the linkage above described; and moreover, the cam 363 is biased into its position, as shown in FIG. 20, through the linkage described by the coil spring 382.

In order to operate the cam 363 so as to effect lifting of the latch elements 352 in the clockwise direction about the pivot pin 351, as viewed in FIG. 20, and the consequent operation of the latch elements 352 into their unlatching positions with respect to the front tie bar 406 and into the positions as illustrated in FIG. 21, the strike button 381 is operated or moved from its extended position, as shown in FIG. 20, toward the right, as shown in FIG. 21. This movement of the strike button 381 toward the right is against the bias of the coil spring 382; whereby the plunger 380 is moved toward the right with respect to the barrel 379, thereby moving the fixture 383 toward the right, causing the lever 373 to be rotated in the clockwise direction about the pivot pin 372, with the result that the fixture 375 is lifted upwardly moving the tie bar 376 upwardly. The upward movement of the tie bar 376 rotates the lever 367 in the counterclockwise direction, as viewed in FIG. 20, lifting the link 368 upwardly, so that the cam 363 is rotated in the clockwise direction, as viewed in FIG. 20; whereby the lower curved end thereof cams against the top surface of the front tie bar 406, lifting the latch elements 353 upwardly from their latching positions of FIG. 20 into their unlatching positions of FIG. 21. Also, at this time, the force that is exerted upon the strike button 381, following operation of the latch elements 352 into their unlatching positions of FIG. 21, effects clockwise rotation of the standard 302 with the trunnion 301; whereby the hitch 300 is moved from its erected position of FIG. 18 back into its storage position of FIG. 17, since the hitch 300 is gravity-biased into its storage position.

Of course, after the force is removed from the strike button 381, the coil spring 382 returns the strike button 381 and the remainder of the linkage back into the positions, as ilustrated in FIG. 20, with the result that the cam 363 is returned back into its normal position; however, at this time, the lower end of the strut 303 has moved rearwardly, guided by the sliding engagements between the shoes 345 and the trackways 346; whereby the hitch 300 in its storage position is operatively disconnected from the associated shock-absorbing mechanism 400, as clearly illustrated in FIG. 17.

Figure 11:
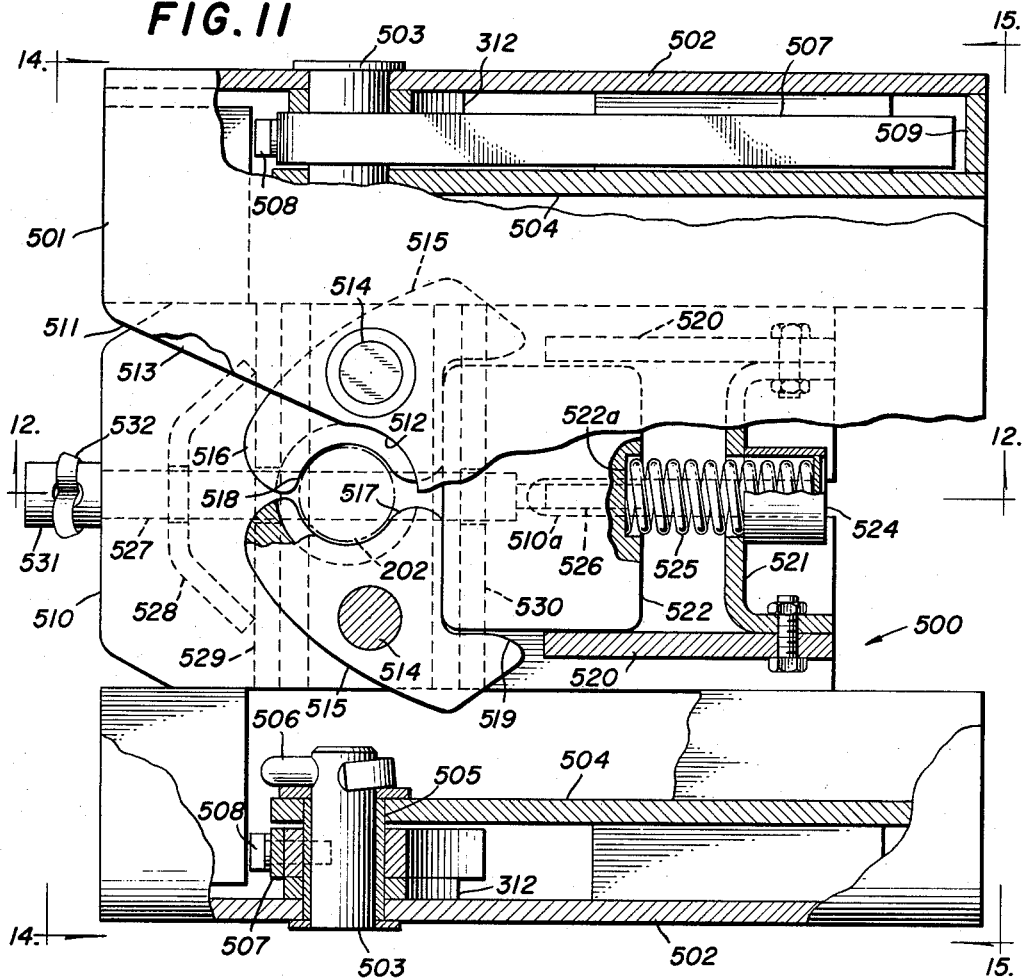
FIG. 11 is a greatly enlarged plan view, partly broken away, of the fifth-wheel mechanism incorporated in the semi-trailer hitch, as shown in FIG. 2, the jaws of this fifth-wheel mechanism being illustrated in their closed positions.

Considering now the construction and arrangement of the fifth-wheel mechanism 500 and referring to FIGS. 11 to 16, inclusive, this mechanism essentially comprises a head in the form of a top plate 501 defining a table adapted to engage the reinforced understructure of the front end of either an unequipped semi-trailer 200A or an equipped semi-trailer 200B; which top plate 501 is provided with a pair of laterally spaced-apart and downwardly directed side aprons 502 extending longitudinally of the center sill 101 of the railway car 100; which side aprons 502 are pivotally connected adjacent to the front ends thereof, the left-hand ends thereof, as viewed in FIG. 11, to the outwardly directed lugs 312 carried by the upper ends of the legs 305 of the standard 302 by an arrangement including a pair of pivot pins 503. More particularly, a pair of longitudinally extending and laterally spaced-apart plates 504 are respectively arranged inwardly of the side aprons 502 and in spaced relation therewith, the upper edges of the plates 504 being suitably secured, as by welding, to the lower surface of the top plate 501. The plates 504 lend additional rigidity to the structure and respectively receive the inner ends of the previously mentioned pivot pins 503. In the arrangement, each of the pivot pins 503 is disposed within a cylindrical bearing element 505 that extends through aligned openings provided in the adjacent side apron 502 and in the adjacent plate 504, the inner end of the pivot pin 503 having an opening therein through which a cotter key 506 is arranged. Accordingly, the head of the fifth-wheel mechanism 500 is mounted upon the lugs 312 carried by the upper ends of the legs 305 of the standard 302 for pivotal movements about the aligned pivot pins 503; and the head is normally restrained in a position disposed substantially normally to the standard 302, as shown in FIG. 16, by an arrangement including a pair of laterally spaced-apart and longitudinally extending leaf springs 507 acting between the lugs 312 on the standard 302 and the undersurface of the top plate 501. More particularly, as illustrated in FIG. 16, each of the leaf springs 507 is substantially L-shaped, including a short downwardly directed leg 507a wrapped over the adjacent lug 312 on the standard 302 and secured in place by an associated screw 508 and a long rearwardly extending leg 507b arranged immediately below the undersurface of the top plate 501 and in engagement therewith.

Further, the heat of the mechanism 500 comprises a rear plate 509, disposed at the right-hand side of FIG. 11, and a bottom plate 510 spaced below the top plate 501 and cooperating therewith to provide a hollow box-like structure having an open front end disposed at the left of FIG. 11. Also, a guide slot 511 is formed in the central front portion of the top plate 501 and having rearwardly converging side walls terminating in a substantially semi-circular recess 512 disposed adjacent to the longitudinal center line of the top plate 501 and rearwardly of the front edge thereof; which recess 512 defines a home position for the cooperating depending king pin 202 carried by the front end of an associated semi-trailer 200A, etc.

The lower central portion of the top plate 501 is reinforced by a top block 513 disposed therebelow and positioned forwardly above the bottom plate 510; the top block 513 and the bottom plate 510 are suitably secured in assembled relation with the top block 513 spaced above the bottom plate 510. Also, the top block 513 has a guide slot formed in the front central portion thereof that generally conforms to the guide slot 511 formed in the top plate 501, as well as a centrally disposed semi-circular recess at the rear central portion thereof that generally conforms to the semi-circular recess 512 formed in the top plate 501.

A pair of laterally spaced-apart and vertically disposed pivot pins 514 are arranged on opposite sides of the semi-circular recess 512 and extend through the top block 513 and the bottom plate 510; and upon the pivot pins 514, a pair of locking members 515 are respectively pivotally mounted intermediate the ends thereof. Each of the locking members 515 comprises, as best shown in FIG. 13, a forwardly directed protuberance 516 and an inwardly directed centrally disposed protuberance 517 cooperating to define a forwardly directed substantially semi-circular locking jaw 518; and also, each of the locking members 515 comprises a rearwardly directed cam 519. Accordingly, the locking elements 515 are pivotally mounted upon the pivot pins 514 between the upper block 513 and the lower plate 510 and are movable between locking and unlocking positions with respect to a cooperating king pin 202, indicated in broken lines in FIG. 13.

Also arranged between the top block 513 and the bottom plate 510 and rearwardly of the locking members 513 is guide structure including a pair of longitudinally extending and laterally spaced-apart guide members 520 and a connecting bridge member 521; and arranged between the guide members 520 and forwardly of the bridging member 521, there is disposed a locking block 522. The locking block 522 is located rearwardly of the locking members 515 and forwardly of the bridging member 521 and is mounted for longitudinal sliding movements upon the bottom plate 510 along the longitudinal axis of the head of the mechanism 500. A centrally disposed opening 523 is arranged in the bridging member 521 that is covered by an associated hollow cap 524; and within the cap 524 there is arranged a compression spring 525. As viewed in FIG. 13, the rear end of the compression spring 525 bears against the end of the cap 524 and the front end of the compression spring 525 is arranged in a recess 522a provided in the rear end of the locking block 522; whereby the compression spring 525 biases the locking block 522 forwardly, or toward the left, as viewed in FIG. 13, into engagement with the cams 519 carried by the rear ends of the locking members 515.

When the locking members 515 occupy their unlocking positions, as shown in FIG. 13, the locking jaws 518 are open and are adapted to receive a cooperating king pin 202 when moved longitudinally rearwardly thereinto and the cams 519 engage the locking block 522; whereby the locking block 522 restrains the locking members 515 in their unlocking positions illustrated, by frictional engagement. At this time, in the event a king pin 202 is moved longitudinally rearwardly between the locking jaws 518, it will pass between the front protuberances 516 carried by the locking members 515 and will engage the centrally disposed protuberances 517 as it arrives in its home position in the semi-circular recess 512 provided in the top plate 501; whereby the engagements of the king pin 202 with the central protuberances 517 rotates the locking members 515 about the pivot pins 514 to spread the cams 519 away from each other, as viewed in FIG. 13, so that the cams 519 ride over the adjacent corners at the front end of the locking block 522, with the result that the compression spring 525 projects the locking block 522 forwardly between the cams 519 and into its locking position, shown in FIG. 11. At this time, the king pin 202 is firmly gripped between the locking jaws 518 in its home position in the semi-circular recess 512 provided in the top plate 501 and is retained in place by virtue of the fact that the locking block 522 is now projected between the cams 519 provided at the rear ends of the locking members 515.

Figure 12:
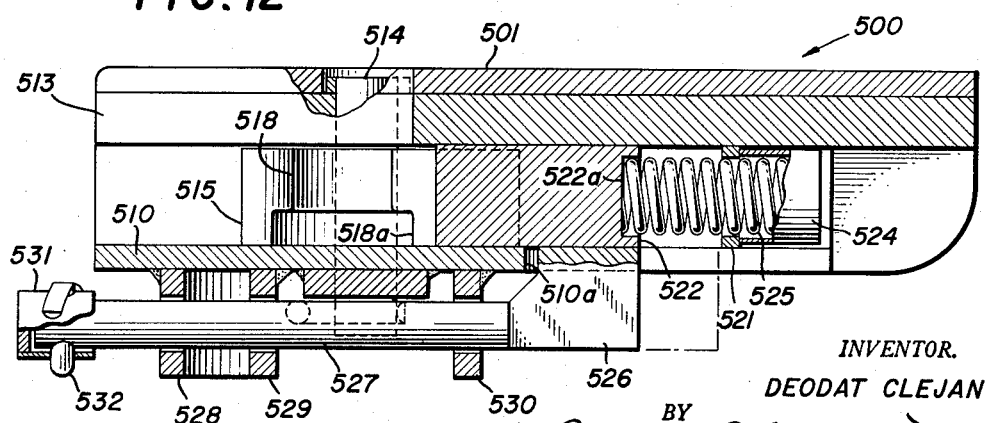
FIG. 12 is a greatly enlarged longitudinal sectional view of this fifth-wheel mechanism, taken in the direction of the arrows along the line 12—12 in FIG. 11.

Also, as best illustrated in FIGS. 12 and 13, the locking jaws 518 provided on the front end of the locking members 515 are contoured to define a cavity 518a at the lower portions thereof disposed closely adjacent to the top surface of the bottom plate 510, so as to conform to the normal shape of the king pin 202. More particularly, the depending king pin 202 carried by the front end of a semi-trailer 200A or 200B normally comprises an enlarged head that is supported by the top surface of the bottom plate 510 in the home position thereof in the semi-circular recess 512 provided in the top plate 501; whereby the locking jaws 518 grip the shank of the cooperating king pin 202, as well as the enlarged head thereof disposed in the cavities 518a, as noted above.

As best shown in FIGS. 12 and 13, the rear end of the block 522 carries a depending tab 526 that is disposed in a cooperating centrally disposed and longitudinally extending slot 510a provided in the bottom plate 510; whereby the tab 526 projects downwardly below the bottom plate 510. A longitudinally extending and centrally disposed plunger 527 is mounted below the plate 510 upon a number of depending elements 528, 529 and 530 carried thereby; and the rear end of the plunger 527 is connected to the tab 526. The front end of the plunger 527 projects forwardly of the front end of the head of the mechanism 500 and terminates in a strike button 531 that is secured in place thereupon by an associated cotter key 532. More particularly, the plunger 527 is mounted in cooperating openings provided in the elements 528, 529 and 530 for sliding movements longitudinally of the bottom plate 510, thereby to effect corresponding sliding movements of the connected locking block 522 with respect to the cams 519 carried at the rear ends of the locking members 515.

When the locking jaws 518 carried by the locking members 515 occupy their locking positions, as illustrated in FIGS. 11 and 12, the locking block 522 occupies its forwardly projected position, as previously explained; whereby the plunger 527 occupies its forwardly projected position, also illustrated in FIGS. 11 and 12, the locking block 522 and the plunger 527 being moved into their forward positions by the compression spring 525. At this time, in the event the strike button 531 is struck a blow and moved rearwardly toward the right, as viewed in FIGS. 11 and 12, the plunger 527 is moved rearwardly causing the locking block 522 to move rearwardly against the bias of the compression spring 525 so that the locking block 522 is moved from between the cams 519 in order to accommodate rotational movements of the locking members 515 to move the locking jaws 518 into their unlocking positions with respect to the associated king pin 202, as shown in FIG. 13.

The construction and arrangement of the fifth-wheel mechanism 500 of FIGS. 11 to 16, inclusive, are disclosed and claimed in U.S. Patent No. 3,050,320, granted on August 21, 1962.

Reconsidering the operation of the hitch 300 and the method of loading the equipped semi-trailer 200B onto the top of the railway car 100, reference is again made to FIGS. 17 and 18, and it is assumed that at this time, the hitch 300 occupies its storage position, as illustrated in FIG. 17. In this loading operation, a tractor 600 partially illustrated in FIGS. 17 and 18, is employed; and the rear end of the chassis of the tractor 600 is indicated at 601 as being supported by rear road wheels 602; and also, it is assumed that the tractor 600 is of the unequipped type, so that the road wheels 602 thereof are supported upon the road platforms 107 carried on the opposite sides of the center sill 101 of the railway car 100, in the manner previously explained. Also, the rear end of the chassis 601 carries a conventional fifth-wheel mechanism 603 that is adapted to support the front end of the associated semi-trailer 200B and selectively to lock and to unlock the king pin 202 thereof. The fifth-wheel mechanism 603 is arranged automatically to receive and to lock the associated king pin 202, and the fifth-wheel mechanism 603 may be operated into unlocking relation with respect to the king pin 202 through an associated control cable 604 that may be governed from the cab, not shown, of the tractor 600. Also the rear end of the chassis 601 carries a pivotally mounted link 605 that, in turn, carries a pivotally mounted hook 606; which link 605 and hook 606 may be suitably operated through an associated control cable 607 that may be governed from the cab of the tractor 600. Further, the rear end of the chassis 601 carries two centrally disposed and longitudinally spaced-apart stops or abutments 608 and 609 that are arranged respectively to cooperate with the strike buttons 531 and 381 respectively carried by the fifth-wheel mechanism 500 and by the hitch 300, as indicated in FIG. 20. This arrangement is described more fully below, but, at this time, it is noted that the abutment 608 is disposed more rearwardly than is the abutment 609, so that the abutment 608 first strikes the strike button 531 and immediately thereafter, the abutment 609 strikes the strike button 381.

Returning now to the method of loading the equipped semi-trailer 200B upon the top of the railway car 100 and again referring to FIG. 17, the king pin 202 of the semi-trailer 200B is coupled to the fifth-wheel mechanism 603 carried by the rear end of the chassis 601 of the tractor 600, while the semi-trailer 200B and the tractor 600 are in the freight yard associated with the railway track 103, upon which the railway car 100 is standing. The tractor 600 draws the coupled semi-trailer 200B to the vicinity of the adjacent front end of the railway car 100 and then backs the semi-trailer 200B rearwardly onto the top of the railway car 100, with the rail bridging member 120 and the platform bridging member 121 in their lower positions, in the manner previously explained; whereby the semi-trailer 200B and then the tractor 600 are backed upon the adjacent left-hand end of the railway car 100, the rear end of the semi-trailer 200B being supported by the engagements between the track rollers 205 and the track rails 106 carried by the top of the I-beams 104 and the road wheels 602 of the tractor 600 engaging the platforms 107 carried by the opposite sides of the center sill 101 of the railway car 100, in the manner previously explained.

More particularly, the semi-trailer 200B is backed over the hitch 300 in its storage position, as shown in FIG. 17 and so that the hook 606 carried by the rear end of the chassis 601 of the tractor 600 is disposed above the hook shaft 311 carried by the standard 302 of the hitch 300. The control cable 607 is manipulated from the cab of the tractor 600, so as to lower the link 605 and the hook 606 in order to cause the hook 606 to engage the hook shaft 311, as illustrated in FIG. 17. At this time, the tractor 600 and the coupled semi-trailer 200B is moved forwardly under the motive power of the tractor 600, so that the hook 606 pulls forwardly upon the hook shaft 311 causing the standard 302 to pivot in the counterclockwise direction about the trunnion 301, as viewed in FIG. 17; whereby the standard 302 is pivoted upwardly and into an upstanding position disposed behind the rear end of the chassis 601 positioning the fifth-wheel mechanism 500 behind the fifth-wheel mechanism 603. At this time, the control cable 604 is actuated in order to operate the fifth-wheel mechanism 603 so as to uncouple the king pin 202 carried by the front end of the semi-trailer 200B while the tractor 600 is driven forwardly pivoting further the standard 302 into its normal upstanding attitude. The tractor 600 is then driven further forwardly so as to pivot the standard 302 into its fully upstanding attitude; whereby the hitch 300 is operated into its fully erected position, as shown in FIG. 18, so that the fifth-wheel mechanism 603 is moved from under the front end of the semi-trailer 200B and the fifth-wheel mechanism 500 is moved immediately thereafter under the front end of the semi-trailer 200B. At this time, the fifth-wheel mechanism 500 operates automatically to receive the king pin 202 of the semi-trailer 200B and to lock the same in place; and also the latch structure 304 is operated into its latched position with respect to the front tie bar 406 of the shock-absorbing mechanism 400. The tractor 600 is then backed up slightly so as to disengage the hook 606 from the hook shaft 311; and the control cable 607 is actuated from the cab of the tractor 600 so as to raise the link 605 and the hook 606 back into their normal elevated positions. At this time, the tractor 600 is completely disconnected from the hitch 300; the hitch 300 occupies its erected position; and the fifth-wheel mechanism 500 supports the front end of the semi-trailer 200B and locks in place the king pin 202 of the semi-trailer 200B. Accordingly, the front end of the semi-trailer 200B is connected to the fifth-wheel mechanism 500, and the hitch 300 in its erected position is operatively connected to the shock-absorbing mechanism 400. Of course, the tractor 600 is then driven off of the left-hand end of the railway car 100 to be employed in further loading operations. In view of the foregoing, it will be understood that a flying transfer is made of the support of the front end of the semi-trailer 200B from the fifth-wheel mechanism 603 carried by the rear end of the chassis 601 of the tractor 600 to the fifth-wheel mechanism 500 carried by the upper end of the standard 302 of the hitch 300 carried by the railway car 100, with a continuous forward movement of the tractor 600 along the top of the railway car 100.

As previously explained, during the operation of the railway car 100, the semi-trailer 200B is mounted upon the top thereof and is capable of limited longitudinal rolling movements therealong; which longitudinal movements of the semi-trailer 200B and the connected fifth-wheel mechanism 500 take place together, and as a unit, imparting corresponding fore-and-aft movements to the hitch 300 and the consequent transmission of such fore-and-aft movements to the shock-absorbing mechanism 400; whereby the shock-absorbing mechanism 400 absorbs the severe longitudinal shocks effecting cushioned and limited longitudinal movements of the semi-trailer 200B in its mounted position upon the top of the railway car 100.

Considering now the method of unloading the semi-trailer 200B from its mounted position upon the top of the railway car 100, and again referring to FIGS. 17 and 18, and also to FIG. 20, it is noted that the tractor 600 is backed onto the left-hand end of the railway car 100, in the manner previously explained, until the rear end of the chassis 601 thereof is located immediately forwardly with respect to the hitch 300 in its erected position supporting the front end of the semi-trailer 200B. Upon further rearward movement of the tractor 600 along the top of the railway car 100, the fifth-wheel mechanism 603 is moved below the front end of the semi-trailer 200B and then the abutments 608 and 609 sequentially engage the respective cooperating strike buttons 531 and 381. More particularly, when the abutment 608 engages the strike button 531, the fifth-wheel mechanism 500 is operated in the manner previously explained; whereby the locking jaws 518 incorporated therein are operated into their unlocking positions with respect to the king pin 202 carried by the front end of the semi-trailer 200B; when the abutment 609 engages the strike button 381, the cam 363 is operated to actuate the latch structure 304 into its unlatching position with respect to the front tie bar 406 of the shock-absorbing mechanism 400. Also, the impact from the abutment 609 carried by the rear end of the chassis 601 of the tractor 600 and the strike button 381 effects rotation of the standard 302 in the clockwise direction, with the trunnion 301, as viewed in FIG. 18; whereby the hitch 300 is moved from its erected position of FIG. 18 back into its storage position of FIG. 17 fundamentally by the action of gravity. In the movement of the hitch 300 out of its erected position, the fifth-wheel mechanism 500 disengages the front end of the semi-trailer 200B and immediately thereafter the fifth-wheel mechanism 603 engages and supports the front end of the semi-trailer 200B effecting locking in place of the king pin 202 carried by the front end of the semi-trailer 200B. At this time, the front end of the semi-trailer 200B is supported upon the fifth-wheel mechanism 603 carried by the rear end of the chassis 601 of the tractor 600; whereby the tractor 600 may be driven forwardly off of the left-hand end of the railway car 100 drawing the coupled semi-trailer 200B along therewith, so as to complete the unloading operation. In view of the foregoing, it will be understood that the rearward movement of the tractor 600 along the top of the railway car 100 in the unloading operation described above, is continuous; whereby a flying transfer is made of the support of the front end of the semi-trailer 200B from the fifth-wheel mechanism 500 carried by the hitch 300 to the fifth-wheel mechanism 603 carried by the rear end of the chassis 601 of the tractor 600; and simultaneously, the hitch 300 is moved from its erected position of FIG. 18 back into its storage position of FIG. 17.

Referring now to FIG. 32, a modified form of the hitch 300A carried by the railway car 100 and supporting the front end of the associated semi-trailer 200B is there illustrated that is essentially of the same construction and arrangement as that previously described, except in the hitch 300A the normal upstanding attitude of the standard 302 is rearwardly inclined with respect to the vertical by an angle of about 25°. As illustrated, when the hitch 300A occupies its erected position, so that the latch structure 304 carried by the lower rear end of the strut 303 is latched to the front tie bar 406 of the shock-absorbing mechanism 400, the center line 302' of the standard 302 is rearwardly inclined with respect to the vertical line 302'' by the angle of about 25° mentioned; whereby the weight of the front end of the semi-trailer 200B acting upon the connected fifth-wheel mechanism 500 tends further to rotate the standard 302 in the clockwise direction with the trunnion 301; which further rotation of the standard 302 is opposed by the shock-absorbing mechanism 400 through the upwardly inclined strut 303.

Accordingly, it will be understood that the shock-absorbing mechanism 400 in the hitch 300A affords cushioning to the vertical movements of the front end of the connected semi-trailer 200B, as well as to the longitudinal movements of the semi-trailer 200B relative to the center sill 101. For example, in the event the mounted semi-trailer 200B moves longitudinally toward the left with respect to the center sill 101, this movement is transmitted through the fifth-wheel mechanism 500 to the standard 302 causing the latter to rotate with the trunnion 301 in the counterclockwise direction reducing the angle between the center line 302' of the standard 302 and the vertical line 302'', so that the standard 302 exerts a corresponding force through the strut 303 upon the shock-absorbing mechanism 400. In this movement of the semi-trailer 200B toward the left with respect to the center sill 101, as viewed in FIG. 32, the front end of the semi-trailer 200B is necessarily lifted against the action of gravity, thereby absorbing some of the energy of the moving semi-trailer 200B, the remainder of the energy of this moving semi-trailer 200B being absorbed by the shock-absorbing mechanism 400.

This arrangement is very advantageous by virtue of the particular utilization of the action of gravity in conjunction with the action of the shock-absorbing mechanism 400 in cushioning longitudinal movements of the semi-trailer 200B forwardly with respect to the center sill 101 of the railway car 100. Furthermore, the arrangement provides for cushioning of vertical movements of the front end of the semi-trailer 200B with respect to the center sill 101 in the event the railroad bed 103 over which the railway car 100 is traveling is rough or otherwise out-of-level.

Referring now to FIGS. 33 to 35, inclusive, a modified form of the hitch 300B carried by the railway car 100 and supporting the front end of the associated semi-trailer 200B is there illustrated that is essentially of the same construction and arrangement as that of the hitch 300, previously described; except that in the hitch 300B, a pair of vertically disposed shock-absorbing mechanisms 700 are arranged in the extreme upper ends of the legs 305 of the standard 302 and between the lugs 312 carried at the upper ends of the legs 305 and the main body portion of the standard 302. In the arrangement, the lugs 312 are connected to the head 500 by the pivot pins 503, in the manner previously described; however, in this case, the shock-absorbing mechanisms 700 mentioned are interposed between the lugs 312 and the main body portions of the legs 305 of the standard 302, as noted above.

Specifically, each of the lugs 312 is provided with a base 701 that carries a pin 702 that is arranged in sliding engagement with a bushing 703 carried by the upper end of the main body portion of the adjacent leg 305 of the standard 302; and the shock-absorbing mechanism 700 comprises a plurality of cushioning rings 704 separated by metallic washers 705, both surrounding the pin 702. Preferably, the cushioning rings 704 are formed of neoprene, or other resilient rubber-like material. Accordingly, in each shock-absorbing mechanism 700, the cushioning rings 704 and the intervening washers 705 are arranged in stacked relation between the base 701 and the bushing 703.

The fundamental operation of the hitch 300B is the same as that of the hitch 300, previously described, in that the longitudinal movements of the connected semi-trailer 200B with respect to the center sill 101 of the railway car 100 are shocked by the main shock-absorber 400 incorporated in the center sill 101; however, in this case, vertical movements of the front end of the connected semi-trailer 200B are shocked or cushioned by the vertical shock-absorbing mechanisms 700 incorporated directly in the standard 302, as described above.

Referring now to FIG. 36, a modified form of the freight transportation system is there illustrated that comprises the railway car 100 carrying on the left-hand end thereof the unequipped road semi-trailer 200A, and carrying on the right-hand end thereof a freight carrier or container 800; and preferably, the freight container 800 is of the general construction and arrangement of that disclosed in the copending application of Deodat Clejan, Serial No. 813,957, filed May 18, 1959. In the arrangement, two of the longitudinally spaced-apart shock-absorbing mechanisms 400 are incorporated in the center sill 101; and two of the semi-trailer hitches 300 are carried by the center sill 101 and respectively operatively associated with the two shock-absorbing mechanisms 400. As illustrated, the hitch 300 carried by the left-hand end of the railway car 100 occupies its erected position supporting the front end of the semi-trailer 200A, and the semi-trailer hitch 300 carried by the central portion of the railway car 100 occupies its storage position in non-interfering relation with the freight container 800 disposed thereabove and mounted upon the right-hand end of the railway car 100.

As shown in FIG. 38, the freight container 800 comprises a rigid underframe 801 that carries front and rear pairs of low rollers 802 of the narrow gauge of the track rails 106 provided on the top of the center sill 101; which low rollers 802 are flanged and face inwardly so that they are adapted to engage the track rails 106 and to straddle and to guide thereon incident to longitudinal movement of the freight container 800 in its mounted position upon the top of the center sill 101. Accordingly, it will be understood that the freight container 800 may be loaded and unloaded in any suitable manner with respect to the top of the center sill 101 of the railway car 100; and when the freight container 800 occupies its mounted position, it is movable longitudinally along the track rails 106 in supported position upon the low rollers 802. Further, the underframe 801 of the freight container 800 comprises elements defining a rigid hollow box-like structure 803 adjacent to the central portion thereof; which box-like structure 803 includes a pair of longitudinally extending and laterally spaced-apart latch keepers 804 depending from the bottom wall 805 of the freight container 800, as shown in FIG. 39.

Further, the center sill 101 of the railway car 100 incorporates at least one freight carrier or container hitch 900, as shown in FIGS. 37 and 39; which hitch 900 is adapted to cooperate with the box-like structure 803 carried by the underframe 801 of the freight container 800, when the freight container 800 occupies its mounted position upon the top of the right-hand end of the railway car 100. The freight container hitch 900 is operatively connected to the rear tie bar 405 incorporated in the shock-absorbing mechanism 400 carried by the central portion of the center sill 101, as illustrated in FIG. 37; while the semi-trailer hitch 300, not illustrated, is operatively associated with the front tie bar 406 incorporated in this shock-absorbing mechanism 400, in the manner previously explained. As explained more fully hereinafter, the container hitch 900 is operative between a storage position disposed below the track rails 106 carried at the top of the center sill 101, as illustrated in full lines in FIG. 39, and an erected position disposed well above the track rails 106 and cooperating with the box-like structure 803 incorporated in the underframe 801 of the freight container 800, as illustrated in broken lines in FIG. 39.

Accordingly, it will be understood that when both the semi-trailer hitch 300 and the freight container hitch 900 occupy their storage positions they are disposed below the track rails 106 provided upon the top of the center sill 101 and respectively adjacent to the front end and to the rear end of the associated shock-absorbing mechanism 400 and located in non-interfering relation with the movement longitudinally along the center sill 101 of the road semi-trailers 200A, 200B, etc. and of the freight containers 800, etc. Further, it will be appreciated that when a road semi-trailer 200A or 200B is mounted upon the right-hand end of the railway car 100, as shown in FIG. 36, the semi-trailer hitch 300 is operated from its storage position into its erected position in order to support the front end of the semi-trailer and to bring about the connection of the front end of the mounted semi-trailer 200A, etc., to the shock-absorbing mechanism 400 disposed at the central portion of the railway car 100. On the other hand, when the freight container 800 is mounted upon the right-hand end of the railway car 100, as shown in FIG. 36, the container hitch 900 is operated from its storage position into its erected position to connect the underframe 801 of the freight container 800 to the shock-absorbing mechanism 400 disposed at the central portion of the railway car 100. Accordingly, it will be appreciated that the railway car 100, shown in FIG. 36, is arranged to transport indiscriminately, unequipped road semi-trailers 200A, equipped road semi-trailers 200B, and freight containers 800.

Referring now more particularly to FIGS. 37 and 39, the freight container hitch 900 comprises an outer substantially rectangular box-like slide or cradle 901 that is arranged between the webs of the I-beams 104 of the center sill 101 and provided with a pair of laterally outwardly extending supporting arms 902 that carry a pair of shoes 903 that are disposed in sliding engagements with a pair of trackways 904 arranged immediately below the inwardly directed portions of the top flanges 106 of the I-beams 104; whereby the cradle 901 is mounted for guided longitudinal sliding movements with respect to the center sill 101 as established by the cooperation between the shoes 903 and the trackways 904. A substantially rectangular box-like plunger or piston 905 is arranged within the cradle 901 and mounted thereupon for vertical sliding movements with respect thereto, the upper end of the piston 905 being closed by a top plate 906. Arranged within the piston 905 is a jack mechanism 907 that is provided with a body 908 suitably secured to the rear tie bar 405 of the shock-absorbing mechanism 400; and which jack 907 is provided with an upstanding threaded screw 909 terminating in a head 910 engaging the undersurface of the top plate 906. The jack 907 comprises conventional mechanism for selectively projecting and retracting the screw 909, thereby selectively to elevate and to lower the head 910, with the result that the piston 905 may be selectively elevated and lowered with respect to the cradle 901. The mechanism for selectively projecting and retracting the screw 909 is arranged in the body 908 and is selectively operated by an associated rotatable operating rod 911. The lower ends of the laterally spaced-apart side walls of the piston 905 are slotted, as indicated at 905a, and receive the opposite ends of the rear tie bar 405 in straddling relation therewith; whereby the rear tie bar 405 and the piston 905 are secured together for longitudinal movements with respect to the center sill 101; which longitudinal movements of the piston 905 are transmitted to the cradle 901 and guided by the shoes 903 cooperating with the trackways 904.

The operating rod 911, comprising a part of the jack mechanism 907, projects laterally through one of the slots 905a provided in the left-hand side wall of the piston 905 and thence further laterally outwardly through an elongated longitudinally extending slot 104a provided in the web of the adjacent left-hand I-beam 104, so that the operating rod 911 is movable with the jack 907 in its movements longitudinally with the rear tie bar 405 with respect to the center sill 101. In view of the foregoing, it will be appreciated that by rotation of the operating rod 911 in one direction from the exterior of the center sill 101, the jack mechanism 907 is operated to project the screw 909 with respect to the body 908 causing the head 910 to rise, so as to elevate the plunger 905 with respect to the cradle 901. On the other hand, when the operating rod 911 is rotated in the opposite direction from the exterior of the center sill 101, the screw 909 of the jack mechanism 907 is retracted with respect to the body 908 causing the head 910 to be lowered, with the result that the piston 905 is lowered with respect to the associated cradle 901. Thus it will be understood that when the freight container 800 is mounted upon the top of the center sill 101 so that the box-like structure 803 provided in the underframe 801 thereof is in vertical alignment with the piston 905 of the freight container hitch 900, the piston 905 may be selectively projected and retracted with respect to the box-like structure 803 by selective rotations of the operating shaft 911 in opposite directions. More particularly, when the operating shaft 911 is rotated in the one direction, the piston 905 is projected with respect to the cradle 901 and thus operated into its erected position, wherein it is disposed within the box-like structure 803, as indicated by the broken lines in FIG. 39; on the other hand, when the operating shaft 911 is rotated in the other direction, the piston 905 is retracted with respect to the cradle 901 and thus operated into its storage position, wherein it is disposed completely out of the box-like structure 803 provided in the underframe 801.

Further, the freight container hitch 900 comprises a pair of laterally spaced-apart and inwardly directed ears 912 to which a pair of levers 913 are pivotally connected by a pair of pivot pins 914. Each of the levers 913 is substantially L-shaped and the inner end of one of the arms thereof is pivotally connected to a downwardly projecting operating rod 915 by an associated pivot pin 916, and the outer end of the other of the arms thereof carries a latch 917 pivotally connected thereto by an associated pivot pin 918. The outer end of each of the latches 917 is arranged in a cooperating latch opening 905b arranged in the adjacent side wall of the piston 905; and each of the latches 917 is movable between a projected latching position and a retracted unlatching position. Also, each of the latches 917 is biased into its retracted unlatching position by an associated coil spring 920, one end of the coil spring 920 being connected to the inner end of the latch 917 and the other end of the spring 920 being connected to the opposite wall of the piston 905. The operating rods 915 extend downwardly in the piston 905 and project through a corresponding pair of laterally spaced-apart holes 405a provided in the rear tie bar 405 of the shock-absorbing mechanism 400; and the extreme lower ends of the operating rods 915 carry a pair of enlarged heads 922.

When the piston 905 occupies its storage position, as illustrated in solid lines in FIG. 39, the operating rods 915 project through the holes 405a provided in the rear tie bar 405, so that the heads 922 carried by the operating rods 915 are disposed well below the rear tie bar 405; and the coil springs 920 retain the latches 917 in their retracted or unlatching positions with respect to the latch openings 905b provided in the side walls of the piston 905. Now as the piston 905 is moved upwardly from its storage position, as shown in full lines in FIG. 39, toward its erected posiiton, as shown in broken lines in FIG. 39, the ears 912 move upwardly therewith carrying the latches 917 and the operating rods 915 upwardly with the piston 905. Immediately preceding the final erected position of the piston 905 in its upward movement, the enlarged heads 922 carried by the lower ends of the operating rods 915 engage the rear tie bar 405 adjacent to the holes 405a provided therein, thereby arresting further upward movement of the operating rods 915 with the piston 905. Accordingly, further upward movement of the piston 905 into its final erected position, as illustrated in dotted lines in FIG. 39, causes the ears 912 to move further upwardly, so that the downward forces exerted upon the operating rods 915 by the rear tie bar 405 bring about rotation of the levers 913 in opposite directions, thereby projecting the latches 917 laterally outwardly through the associated latch openings 905b provided in the side walls of the piston 905 and thus into the hollow latch keepers 804, as indicated in broken lines in FIG. 39.

Accordingly, at this time, when the piston 905 occupies its fully erected position, the piston 905 not only fits into the box-like structure 803 provided in the underframe 801 of the freight container 800, but also the latches 917 are projected laterally outwardly into latching positions with respect to the associated hollow keepers 804 forming a part of the underframe 801. Hence, the piston 905 in its fully erected position securely latches the underframe 801 thereto, whereby the longitudinal movements of the freight container 800 along the center sill 101 are transmitted to the piston 905 effecting corresponding longitudinal movements of the cradle 901 that, in turn, is arranged in straddling relation with respect to the rear tie bar 405; whereby the longitudinal movements mentioned are transmitted to the shock-absorbing mechanism 400. Accordingly, the shock-absorbing mechanism 400 shocks, cushions and limits the longitudinal movements of the freight container 800 with respect to the center sill 101 of the railway car 100. Moreover, the laterally projecting latches 917 in their latching positions in the latch keepers 804 prevent lateral tilting or displacement of the underframe 801 of the freight container 800 with respect to the center sill 101.

Subsequently, when the piston 905 is returned from its fully erected position back toward its storage position, the downward movements of the ears 912 relieve the forces exerted upon the operating rods 915, so that the coil springs 920 withdraw the latches 917 from their projected latching positions back into the piston 905 and into their retracted unlatching positions with respect to the latch openings 905b provided in the side walls of the piston 905; whereby the latches 917 disengage the latch keepers 804 provided in the underframe 801 of the freight container 800. When the latches 917 are thus returned back into their unlatching positions with respect to the latch keepers 804, the piston 905 may be then returned back into its fully retracted or storage position, as illustrated in solid lines in FIG. 39.

By way of recapitulation, it is noted that the railway car 100, shown in FIGS. 1 and 2, comprises two longitudinally spaced-apart shock-absorbing mechanisms 400 incorporated in the center sill 101 thereof and two longitudinally spaced-apart semi-trailer hitches 300 carried by the center sill 101 thereof and respectively cooperating with the shock-absorbing mechanisms 400. The modified form of the railway car 100, as shown in FIG. 36, is identical to the railway car 100 shown in FIGS. 1 and 2, except that it further comprises at least one freight container hitch 900 carried by the center sill 101 thereof and cooperating with one of the shock-absorbing mechanisms 400 incorporated in the central portion of the center sill 101; whereby this shock-absorbing mechanism 400 cooperates selectively with one of the semi-trailer hitches 300 and with the container hitch 900. Further, it will be understood that two of the freight container hitches 900 may be carried by the longitudinally spaced-apart center sill 101 of the railway car 100 and arranged respectively to cooperate with the two shock-absorbing mechanisms 400 incorporated therein.

As a constructional example of the railway car 100: the flanged wheels carried by the trucks 102 and cooperating with the track rails 103 are of standard rail gauge; the longitudinal distance between the striker plates carried at the opposite ends of the center sill 101 is 85 ft. 8 in.; the vertical distance between the top of the road platforms 107 carried by the center sill 101 and the top of the track rails 103 is 3 ft. ½ in.; the vertical distance between the top of the top flanges 106 of the I-beams 104 incorporated in the center sill 101 and the top of the road platforms 107 is 8 in.; the lateral distance between the downwardly turned flanges 109 carried by the opposite sides of the road platforms 107 is 8 ft. 4 in.; the lateral distance between the outside edges of the top flanges 106 of the I-beams 104 incorporated in the center sill 101 is 3 ft. 3⅛ in.±¼ in.; the lateral distance between the inside edges of the top flanges 106 of the I-beams 104 incorporated in the center sill 101 is 1 ft. 5$^{15}/_{16}$±¼ in.; and the other dimensions involved are generally related to those mentioned above in accordance with the scales of the various figures of the drawings.

In view of the foregoing, it is apparent that there has been provided an improved freight transportation system involving a railway car, equipped road semi-trailers, unequipped road semi-trailers, freight containers, equipped tractors and unequipped tractors; wherein the railway car incorporates either, or both, an improved semi-trailer hitch and an improved freight container hitch, as well as a shock-absorbing arrangement operatively associated with the hitch or hitches. Also the railway car is of the universal type in that it is capable of transporting indiscriminately equipped road semi-trailers, unequipped road semi-trailers and freight containers, while affording shock absorption protection to the transported road semi-trailer or freight container during the transportation thereof. Further, the railway car embodies an improved road wheel guiding arrangement accommodating ready loading of the road semi-trailers thereupon without damage to the rubber of the wheels of the road semi-trailer. Furthermore, there is provided a road semi-trailer hitch of improved and simplified construction and arrangement, and also a freight container hitch of improved construction and arrangement. Finally, the road semi-trailer hitch comprises a fifth-wheel mechanism of improved and simplified construction and arrangement.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A multi-purpose railway car for transporting indiscriminately a road semi-trailer of the type including a rear end carrying road wheels and a front end carrying a king pin and a freight carrier of the type including an underframe carrying low rollers; said railway car comprising a longitudinally extending hollow frame, a pair of trucks supporting the opposite ends of said frame, structure carried by said frame for supporting either a semi-trailer or a freight carrier mounted upon the top thereof and for accommodating limited movements of the mounted semi-trailer or freight carrier longitudinally of said frame, a shock-absorbing device carried by said frame, first and second independent hitches carried by said frame in corresponding longitudinally spaced-apart positions and independently selectively cooperating with said shock-absorbing device, said first hitch being selectively movable between a storage position disposed closely adjacent to the top of said frame and an erected position disposed well above the top of said frame, said first hitch in its storage position being disposed in non-interfering relation with the underframe of a freight carrier mounted upon the top of said frame, means including said first hitch in its erected position for interconnecting said shock-absorbing device and the king pin of a semi-trailer mounted upon the top of said frame so as to afford shock absorption between said frame and the mounted semi-trailer, said second hitch being selectively movable between a storage position disposed closely adjacent to the top of said frame and an erected position disposed well above the top of said frame, said second hitch in its storage position being disposed in non-interfering relation with the underframe of a freight carrier mounted upon the top of said frame, and means including said second hitch in its erected position for interconnecting said shock-absorbing device and the underframe of a freight carrier mounted upon the top of said frame so as to afford shock absorption between said frame and the mounted freight carrier.

2. A multi-purpose railway car for transporting indiscriminately a road semi-trailer of the type including a rear end carrying road wheels of standard road gauge and a front end carrying a king pin and a freight carrier of the type including an underframe carrying low track rollers of given narrow gauge; said railway car comprising a longitudinally extending hollow frame, a pair of trucks supporting the opposite ends of said frame, a pair of longitudinally extending and laterally spaced-apart platforms respectively carried by the opposite sides of said frame and disposed below the top thereof and defining a roadway of standard road gauge, said roadway being arranged to engage the road wheels carried by the rear end of the semi-trailer so as to mount the same upon the top of said frame and to accommodate limited movements of the mounted semi-trailer longitudinally of said frame, a pair of longitudinally extending and laterally spaced-apart rails carried by the top of said frame and defining a trackway of said given narrow gauge, said trackway being arranged to engage the track rollers carried by the underframe of the freight carrier so as to mount the same upon the top of said frame and to accommodate limited movements of the mounted freight carrier longitudinally of said frame, a shock-absorbing device carried by said frame, first and second independent hitches carried by said frame in corresponding longitudinally spaced-apart positions and independently selectively cooperating with said shock-absorbing device, said first hitch being selectively movable between a storage position disposed closely adjacent to the top of said frame and an erected position disposed well above the top of said frame, said first hitch in its storage position being disposed between and below the rails of said trackway and in non-interfering relation with the underframe of a freight carrier mounted upon the top of said frame, means including said first hitch in its erected position for interconnecting said shock-absorbing device and the king pin of a semi-trailer mounted upon the top of said frame so as to afford shock absorption between said frame and the mounted semi-trailer, said second hitch being selectively movable between a storage position disposed closely adjacent to the top of said frame and an erected position disposed well above the top of said frame, said second hitch in its storage position being disposed between and below the rails of said trackway and in non-interfering relation with the underframe of a freight carrier mounted upon the top of said frame, and means including said second hitch in its erected position for interconnecting said shock-absorbing device and the underframe of a freight carrier mounted upon the top of said frame so as to afford shock absorption between said frame and the mounted freight carrier.

3. A railway car for transporting a road semi-trailer of the type including a rear end carrying road wheels and a front end carrying a king pin; said railway car comprising a longitudinally extending frame, a pair of trucks supporting the opposite ends of said frame, said frame being adapted to support a trailer mounted upon the top thereof, a standard mounted adjacent to the lower end thereof upon said frame for pivotal movements with respect thereto about a fixed axis extending transversely thereof, said standard being selectively pivotally movable between a storage position disposed closely adjacent to the top of said frame and an erected position disposed well above the top thereof, a motion limiting and cushioning device carried by said frame, latching mechanism having a set position connecting said standard in its erected position to said device and a trip position disconnecting said standard from said device, means responsive to pivotal movement of said standard into its erected position for setting said latching mechanism, said standard in its erected position being biased by said connected device into a normal upstanding attitude and being pivotable fore and aft with respect thereto and longitudinally of said frame against the bias of said connected device, means operative to trip said latching mechanism, said standard being gravity biased into its storage position, whereby said standard is pivoted into its storage position in response to tripping of said latching mechanism, a head carried by the upper end of said standard and adapted to be disposed in the erected position of said standard below and in supporting relation with the front end of a trailer mounted upon the top of said frame, and locking mechanism carried by said head and adapted to cooperate with the king pin carried by the supported front end of a trailer mounted upon the top of said frame, said locking mechanism being selectively operative into a locked position connecting and holding the cooperating king pin and into an unlocked position disconnecting and releasing the cooperating king pin, said head and a connected trailer mounted upon the top of said frame being movable as a unit longitudinally of said frame effecting corresponding pivotal movements of said standard in its erected position fore-and-aft with respect to its normal upstanding attitude and longitudinally of said frame, whereby said connected device limits and cushions the movements of the mounted trailer longitudinally of said frame.

4. A railway car for transporting a road semi-trailer of the type including a rear end carrying road wheels and a front end carrying a king pin; said railway car comprising a longitudinally extending hollow center sill, a pair of trucks supporting the opposite ends of said center sill, said center sill being adapted to support a trailer mounted upon the top thereof, a standard mounted adjacent to the lower end thereof upon said center sill for pivotal movements with respect thereto about a fixed axis extending transversely thereof, said standard being selectively pivotally movable between a storage position disposed within said hollow center sill and below the top thereof and an erected position disposed out of said hollow center sill and above the top thereof, a motion limiting and cushioning device carried by said center sill, latching mechanism having a set position connecting said standard in its erected position to said device and a trip position disconnecting said standard from said device, means responsive to pivotal movement of said standard into its erected position for setting said latching mechanism, said standard in its erected position being biased by said connected device into a normal upstanding attitude and being pivotable fore-and-aft with respect thereto and longitudinally of said center sill against the bias of said connected device, means operative to trip said latching mechanism, said standard being gravity biased into its storage position, whereby said standard is pivoted into its storage position in response to tripping of said latching mechanism, a head carried by the upper end of said standard and adapted to be disposed in the erected position of said standard below and in supporting relation with the front end of a trailer mounted upon the top of said center sill, and locking mechanism carried by said head and adapted to cooperate with the king pin carried by the supported front end of a trailer mounted upon the top of said center sill, said locking mechanism being selectively operative into a locked position connecting and holding the cooperating king pin and into an unlocked position disconnecting and releasing the cooperating king pin, said head and a connected trailer mounted upon the top of said center sill being movable as a unit longitudianlly of said center sill effecting corresponding pivotal movements of said standard in its erected position fore-and-aft with respect to its normal upstanding attitude and longitudinally of said center sill, whereby said connected device limits and cushions the movements of the mounted trailer longitudinally of said center sill.

5. A railway car for transporting a road semi-trailer of the type including a rear end carrying road wheels and a front end carrying a king pin; said railway car comprising a longitudinally extending frame, a pair of trucks supporting the opposite ends of said frame, said frame being adapted to support a trailer mounted upon the top thereof, a standard mounted adjacent to the lower end thereof upon said frame for pivotal movements with respect thereto about a fixed axis extending transversely thereof, said standard being selectively pivotally movable between a storage position disposed closely adjacent to the top of said frame and an erected position disposed well above the top thereof, a longitudinally extending trackway carried by said frame, a strut, means mounting one end of said strut upon the upper portion of said standard for pivotal movements with respect thereto about an axis extending transversely of said frame, means mounting the other end of said strut for guided longitudinal movements along said trackway, whereby the pivotal movements of said standard are guided by said strut cooperating with said trackway, a motion limiting and cushioning device carried by said frame, latching mechanism cooperating between said other end of said strut and said device, said latching mechanism having a set position connecting said other end of said strut to said device and a trip position disconnecting said other end of said strut from said device, means responsive to pivotal movement of said standard into its erected position for setting said latching mechanism, said standard in its erected position being biased by said connected device into a normal upstanding attitude and being pivotal fore-and-aft with respect thereto and longitudinally of said frame against the bias of said connected device, means operative to trip said latching mechanism, said standard being gravity biased into its storage position, whereby said standard is pivoted into its storage position in response to tripping of said latching mechanism, a head carried by the upper end of said standard and adapted to be disposed in the erected position of said standard below and in supporting relation with the front end of a trailer mounted upon the top of said frame, and locking mechanism carried by said head and adapted to cooperate with the king pin carried by the supported front end of a trailer mounted upon the top of said frame, said locking mechanism being selectively operative into a locked position connecting and holding the cooperating king pin and into an unlocked position disconnecting and releasing the cooperating king pin, said head and a connected trailer mounted upon the top of said frame being movable as a unit longitudinally of said frame effecting corresponding pivotal movements of said standard in its erected position fore-and-aft with respect to its normal upstanding attitude and longitudinally of said frame, whereby said connected device limits and cushions the movements of the mounted trailer longitudinally of said frame.

6. A railway car for transporting a road semi-trailer of the type including a rear end carrying road wheels and a front end carrying a king pin; said railway car comprising a longitudinally extending frame, a pair of trucks supporting the opposite ends of said frame, said frame being adapted to support a trailer mounted upon the top thereof, a standard, means mounting the lower end of said standard upon said frame for pivotal movements with respect thereto about an axis extending transversely thereof, said standard being selectively pivotally movable between a storage position disposed closely adjacent to the top of said frame and an erected position disposed well above the top thereof, a longitudinally extending trackway carried by said frame, a strut, means mounting one end of said strut upon the upper portion of said standard for pivotal movements with respect thereto about an axis extending transversely of said frame, means mounting the other end of said strut for guided longitudinal movements along said trackway, whereby the pivotal movements of said standard are guided by said strut cooperating with said trackway, a motion limiting and cushioning device carried by said frame, latching mechanism carried by said other end of said strut and cooperating with said device, said latching mechanism having a set position connecting said other end of said strut to said device and a trip position disconnecting said other end of said strut from said device, means responsive to pivotal movement of said standard into its erected position for setting said latching mechanism, said standard in its erected position being biased through said strut by said connected device into a normal upstanding attitude and being pivotable fore-and-aft with respect thereto longitudially of said frame against the bias of said connected device, a member carried by said one end of said strut and operative to trip said latching mechanism, said standard being gravity biased into its storage position, whereby said standard is pivoted into its storage position in response to tripping of said latching mechanism, a head carried by the upper end of said standard and adapted to be disposed in the erected position of said standard below and in supporting relation with the front end of a trailer mounted upon the top of said frame, and locking mechanism carried by said head and adapted to cooperate with the king pin carried by the supported front end of a trailer mounted upon the top of said frame, said locking mechanism being selectively operative into a locked position connecting and holding the cooperating king pin and into an unlocked position disconnecting and releasing the cooperating king pin, said head and a connected trailer mounted upon the top of said frame being movable as a unit longitudinally of said frame effecting corresponding pivotal movements of said standard in its erected position fore-and-aft with respect to its normal upstanding attitude and longitudinally of said frame, whereby said connected device limits and cushions the movements of the mounted trailer longitudinally of said fame.

7. A railway car for transporting a road semi-trailer of the type including a rear end carrying road wheels and a front end carrying a king pin; said railway car comprising a longitudinally extending frame, a pair of trucks supporting the opposite ends of said frame, said frame being adapted to support a trailer mounted upon the top thereof, a standard, means mounting the lower end of said standard upon said frame for pivotal movements with respect thereto about a fixed axis extending transversely thereof, said standard being selectively pivotally movable between a storage position disposed closely adjacent to the top of said frame and an erected position disposed well above the top thereof, a motion limiting and cushioning device carried by said frame, latching mechanism having a set position connecting said standard in its erected position to said device and a trip position disconnecting said standard from said device, means responsive to pivotal movement of said standard into its erected position for setting said latching mechanism, said standard in its erected position being biased by said connected device into a normal upstanding attitude and being pivotable fore-and-aft with respect thereto and longitudinally of said frame against the bias of said connected device, means operative to trip said latching device, said standard being gravity biased into its storage position, whereby said standard is pivoted into its storage position in response to tripping of said latching mechanism, counterbalancing means opposing pivotal movement of said standard into its storage position, thereby to minimize the torque required to pivot said standard from its storage position into its erected position, a head carried by the upper end of said standard and adapted to be disposed in the erected position of said standard below and in supporting relation with the front end of a trailer mounted upon the top of said frame, and locking mechanism carried by said head and adapted to cooperate with the king pin carried by the supported front end of a trailer mounted upon the top of said frame, said mechanism being selectively operative into a locked position connecting and holding the cooperating king pin and into an unlocked position disconnecting and releasing the cooperating king pin, said head and a connected trailer mounted upon the top of said frame being movable as a unit longitudially of said frame effecting corresponding pivotal movements of said standard in its erected position fore-and-aft with respect to its normal upstanding attitude and longitudinally of said frame, whereby said connected device limits and cushions the movements of the mounted trailer longitudinally of said frame.

8. A hitch for a road semi-trailer comprising a pair of longitudinally extending and laterally spaced-apart supports, an element extending laterally between said supports and mounted at the opposite ends thereof upon said supports for rotation about its own axis, a standard rigidly secured at the lower end thereof to the intermediate portion of said element, whereby said standard is mounted for pivotal movements with said element and about the axis thereof extending transversely of said supports, said standard being selectively pivotally movable between a storage position and an erected position, said standard in its storage position being disposed between said supports and in its erected position being disposed from between said supports, a motion limiting and cushioning device carried by said supports, latching mechanism having a set position connecting said standard to said device and a trip position disconnecting said standard from said device, means responsive to pivotal movement of said standard into its erected position for setting said latching mechanism, said standard in its erected position being biased by said connected device into a normal upstanding attitude and being pivotable fore-and-aft with respect thereto longitudinally of said supports against the bias of said connected device, means operative to trip said latching mechanism, said standard being gravity biased into its storage position, whereby said standard is pivoted into its storage position in response to tripping of said latching mechanism, and a fifth-wheel mechanism carried by the upper end of said standard and adapted to be disposed in the erected position of said standard below and in supporting relation with the front end of a cooperating semi-trailer, said fifth-wheel mechanism also being selectively operative into a locked position connecting and holding the cooperating king pin and into an unlocked position disconnecting and releasing the cooperating king pin, said fifth-wheel mechanism and a connected semi-trailer being movable as a unit longitudinally of said supports effecting corresponding pivotal movements of said standard in its erected position fore-and-aft with respect to its normal upstanding attitude and longitudinally of said supports, whereby said connected device limits and cushions the movements of the connected semi-trailer longitudinally of said supports.

9. A hitch for a road semi-trailer comprising a pair of longitudinally extending and laterally spaced-apart supports, an element extending laterally between said supports and mounted at the opposite ends thereof upon said supports for rotation about its own axis, a standard rigidly secured at the lower end thereof to the intermediate portion of said element, whereby said standard is mounted for pivotal movements with said element and about the axis thereof extending transversely of said supports, said standard being selectively pivotally movable between a storage position and an erected position, said standard in its storage position being disposed between said supports and in its erected position being disposed from between said supports, a longitudinally extending trackway carried by said supports, a strut pivotally connected at one end thereof to the upper portion of said standard for pivotal movements with respect to an axis extending transversely of said supports, means mounting the other end of said strut for guided longitudinal movements along said trackway, whereby the pivotal movements of said standard are guided by said strut cooperating with said trackway, a motion limiting and cushioning device carried by said supports, latching mechanism having a set position connecting said other end of said strut to said device and a trip position disconnecting said other end of said strut from said device, means responsive to pivotal movement of said standard into its erected position for setting said latching mechanism, said standard in its erected position being biased through said strut by said connected device into a normal upstanding attitude and being pivotable fore-and-aft with respect thereto longitudinally of said supports against the bias of said connected device, means operative to trip said latching mechanism, said standard being gravity biased into its storage position, whereby said standard is pivoted into its storage position in response to tripping of said latching mechanism, and a fifth-wheel mechanism carried by the upper end of said standard and adapted to be disposed in the erected position of said standard below and in supporting relation with the front end of a cooperating semi-trailer, said fifth-wheel mechanism also being selectively operative into a locked position connecting and holding the cooperating king pin and into an unlocked position disconnecting and releasing the cooperating king pin, said fifth-wheel mechanism and a connected semi-trailer being movable as a unit longitudinally of said supports effecting corresponding pivotal movements of said standard in its erected position fore-and-aft with respect to its normal upstanding attitude and longitudinally of said supports, whereby said connected device limits and cushions the movements of the connected semi-trailer longitudinally of said supports.

10. A hitch for a road semi-trailer comprising a pair of longitudinally extending and laterally spaced-apart supports, an element extending laterally between said supports, means including resilient members arranged between the opposite ends of said element and said supports for mounting said element upon said supports for rotation about its own axis, a standard rigidly secured at the lower end thereof to the intermediate portion of said element, whereby said standard is mounted for pivotal movements with said element and about the axis thereof extending transversely of said supports, said standard being selectively pivotally movable between a storage position and an erected position, said standard in its storage position being disposed between said supports and in its erected position being disposed from between said supports, a motion limiting and cushioning device carried by said supports, latching mechanism having a set position connecting said standard to said device and a trip position disconnecting said standard from said device, means responsive to pivotal movement of said standard into its erected position for setting said latching mechanism, said standard in its erected position being biased by said connected device into a normal upstanding attitude and being pivotable fore-and-aft with respect thereto longitudinally of said supports against the bias of said connected device, means operative to trip said latching mechanism, said standard being gravity biased into its storage position, whereby said standard is pivoted into its storage position in response to tripping of said latching mechanism, and a fifth-wheel mechanism carried by the upper end of said standard and adapted to be disposed in the erected position of said standard below and in supporting relation with the front end of a cooperating semi-trailer, said fifth-wheel mechanism also being selectively operative into a locked position connecting and holding the cooperating king pin and into an unlocked position disconnecting and releasing the cooperating king pin, said fifth-wheel mechanism and a connected semi-trailer being movable as a unit longitudinally of said supports effecting corresponding pivotal movements of said standard in its erected position fore-and-aft with respect to its normal upstanding attitude and longitudinally of said supports, whereby said connected device limits and cushions the movements of the connected semi-trailer longitudinally of said supports.

11. A hitch for a road semi-trailer comprising a pair of longitudinally extending and laterally spaced-apart supports, an element extending laterally between said supports and mounted at the opposite ends thereof upon said supports for rotation about its own axis, a standard rigidly secured at the lower end thereof to the intermediate portion of said element, whereby said standard is mounted for pivotal movements with said element and about the axis thereof extending transversely of said supports, said standard being selectively pivotally movable between a storage position and an erected position, said standard in its storage position being disposed between said supports and in its erected position being disposed from between said supports, a motion limiting and cushioning device carried by said supports, latching mechanism having a set position connecting said standard to said device and a trip position disconnecting said standard from said device, means responsive to pivotal movement of said standard into its erected position for setting said latching mechanism, said standard in its erected position being biased by said connected device into a normal upstanding attitude and being pivotable fore-and-aft with respect thereto longitudinally of said supports against the bias of said connected device, means operative to trip said latching mechanism, said standard being gravity biased into its storage position, whereby said standard is pivoted into its storage position in response to tripping of said latching mechanism, counter-balancing means arranged between said element and at least one of said supports opposing pivotal movement of said standard into its storage position, thereby to minimize the torque required to pivot said standard from its storage position into its erected position, and a fifth-wheel mechanism carried by the upper end of said standard and adapted to be disposed in the erected position of said standard below and in supporting relation with the front end of a cooperating semi-trailer, said fifth-wheel mechanism also being selectively operative into a locked position connecting and holding the cooperating king pin and into an unlocked position disconnecting and releasing the cooperating king pin, said fifth-wheel mechanism and a connected semi-trailer being movable as a unit longitudinally of said supports effecting corresponding pivotal movements of said standard in its erected position fore-and-aft with respect to its normal upstanding attitude and longitudinally of said supports, whereby said connected device limits and cushions the movements of the connected semi-trailer longitudinally of said supports.

12. The hitch set forth in claim 11, wherein said counter-balancing means essentially comprises an elastic element that is strained in response to pivotal movement of said standard into its storage position, thereby exerting a reactive torque upon said standard tending to pivot the same out of its storage position toward its erected position.

13. A hitch for a road semi-trailer comprising a pair of longitudinally extending and laterally spaced-apart supports, a hollow tubular element extending laterally between said supports and mounted at the opposite ends thereof upon said supports for rotation about its own axis, a standard rigidly secured at the lower end thereof to the intermediate portion of said element, whereby said standard is mounted for pivotal movements with said element and about the axis thereof extending transversely of said supports, said standard being selectively pivotally movable between a storage position and an erected position, said standard in its storage position being disposed between said supports and in its erected position being disposed from between said supports, a motion limiting and cushioning device carried by said supports, latching mechanism having a set position connecting said standard to said device and a trip position disconnecting said standard from said device, means responsive to pivotal movement of said standard into its erected position for setting said latching mechanism, said standard in its erected position being biased by said connected device into a normal upstanding attitude and being pivotable fore-and-aft with respect thereto longitudinally of said supports against the bias of said connected device, means operative to trip said latching mechanism, said standard being gravity biased into its storage position, whereby said standard is pivoted into its storage position in response to tripping of said latching mechanism, a torsion bar arranged in said element and connected at the opposite ends thereof respectively to one of said supports and to said element, said torsion bar being strained by pivotal movement of said standard into its storage position, thereby exerting a reactive torque upon said standard tending to pivot the same out of its storage position toward its erected position, and a fifth-wheel mechanism carried by the upper end of said standard and adapted to be disposed in the erected position of said standard below and in supporting relation with the front end of a cooperating semi-trailer, said fifth-wheel mechanism also being selectively operative into a locked position connecting and holding the cooperating king pin and into an unlocked position disconnecting and releasing the cooperating king pin, said fifth-wheel mechanism and a connected semi-trailer being movable as a unit longitudinally of said supports effecting corresponding pivotal movements of said standard in its erected position fore-and-aft with respect to its normal upstanding attitude and longitudinally of said supports, whereby said connected device limits and cushions the movements of the connected semi-trailer longitudinally of said supports.

14. A hitch for a road semi-trailer comprising a longitudinally extending frame, a standard mounted adjacent to the lower end thereof upon said frame for pivotal movements with respect thereto about a fixed axis extending transversely thereof, said standard being selectively pivotally movable between a storage position disposed closely adjacent to the top of said frame and an erected position disposed well above the top thereof, a motion limiting and cushioning device carried by said frame, latching mechanism having a set position connecting said standard in its erected position to said device and a trip position disconnecting said standard from said device, means responsive to pivotal movement of said standard into its erected position for setting said latching mechanism, said standard in its erected position being biased by said connected device into a normal upstanding attitude inclined rearwardly to the vertical and being pivotable with respect thereto against the bias of said connected device, whereby fore-and-aft movements of said standard with respect to its normal upstanding attitude and longitudinally of said frame effect corresponding up-and-down movements of the upper end thereof with respect to said frame, means operative to trip said latching mechanism, said standard being gravity biased into its storage position, whereby said standard is pivoted into its storage position in response to tripping of said latching mechanism, and a fifth-wheel mechanism carried by the upper end of said standard and adapted to be disposed in the erected position of said standard below and in supporting relation with the front end of a cooperating semi-trailer, said fifth-wheel mechanism also being selectively operative into a locked position connecting and holding the cooperating king pin and into an unlocked position disconnecting and releasing the cooperating king pin, said fifth-wheel mechanism and a connected semi-trailer being movable as a unit longitudinally of said frame effecting corresponding pivotal movements of said standard in its erected position fore-and-aft with respect to its normal upstanding attitude and longitudinally of said frame, whereby said connected device limits and cushions the movements of the connected semi-trailer longitudinally of said frame, said fifth-wheel mechanism and the front end of a connected semi-trailer being movable as a unit vertically with respect to said frame effecting corresponding pivotal movements of said standard in its erected position up-and-down with respect to its normal upstanding attitude and vertically of said frame, whereby said connected device limits and cushions the movements of the connected semi-trailer vertically of said frame.

15. A hitch for a road semi-trailer comprising a longitudinally extending frame, a standard mounted adjacent to the lower end thereof upon said frame for pivotal movements with respect thereto about a fixed axis extending transversely thereof, said standard being selectively pivotally movable between a storage position disposed closely adjacent to the top of said frame and an erected position disposed well above the top thereof, a motion limiting and cushioning device carried by said frame, latching mechanism having a set position connecting said standard in its erected position to said device and a trip position disconnecting said standard from said device, means responsive to pivotal movement of said standard into its erected position for setting said latching mechanism, said standard in its erected position being biased by said connected device into a normal upstanding attitude and being pivotable fore-and-aft with respect thereto and longitudinally of said frame against the bias of said connected device, means operative to trip said latching mechanism, said standard being gravity biased into its storage position, whereby said standard is pivoted into its storage position in response to tripping of said latching mechanism, a shock-absorbing mechanism carried by the upper end of said standard, and a fifth-wheel mechanism carried by said shock-absorbing mechanism and adapted to be disposed in the erected position of said standard below and in supporting relation with the front end of a cooperating semi-trailer, said fifth-wheel mechanism also being selectively operative into a locked position connecting and holding the cooperating king pin and into an unlocked position disconnecting and releasing the cooperating king pin, said fifth-wheel mechaism and the front end of a connected semi-trailer being movable as a unit vertically with respect to said standard in its erected poistion, whereby said shock-absorbing mechanism limits and cushions the movements of the front end of the connected semi-trailer vertically with respect to said standard, said fifth-wheel mechanism and a connected semi-trailer being movable as a unit longitudinally of said frame effecting corresponding pivotal movements of said standard in its erected position fore-and-aft with respect to its normal upstanding attitude and longitudinally of said frame, whereby said connected device limits and cushions the movements of the connected semi-trailer longitudinally of said frame.

16. The method of loading a road semi-trailer upon a railway car in a freight transportation system comprising a railway car including a longitudinally extending frame supported at the opposite ends thereof by a pair of trucks, a road semi-trailer including a rear end carrying road wheels and a front end carrying a king pin, a tractor carrying road wheels, a first fifth-wheel mechanism carried by the rear of said tractor and adapted to support the front end of said trailer and selectively to couple and to uncouple said king pin, structure carried by said frame for supporting both said trailer and said tractor mounted upon the top thereof with said first fifth-wheel mechanism coupling said king pin, thereby to accommodate movements of said mounted tractor and said coupled mounted trailer longitudinally of said frame under the motive power of said mounted tractor, a standard mounted adjacent to the lower end thereof upon said frame for pivotal movements with respect thereto about a fixed axis extending transversely thereof, said standard being selectively pivotally movable between a substantially horizontal storage position disposed closely adjacent to the top of said frame and a substantially vertical erected position disposed well above the top of said frame, latching mechanism for connecting said standard in its erected position to said frame, said latching mechanism being automatically set to latch said standard in its erected position in response to movement of said standard from its storage position into its erected position, a second fifth-wheel mechanism carried by the upper end of said standard and movable therewith and adapted to be disposed in the erected position of said standard below and in supporting relation with the front end of said mounted trailer and also adapted automatically to couple said king pin in response to engagement thereof with said king pin, means carried by said tractor for operating said first fifth-wheel mechanism to uncouple said king pin, and additional means carried by the rear end of said tractor for pivotally moving said standard from its storage position into its erected position under the motive power of said tractor and immediately following operation of said first fifth-wheel mechanism to uncouple said king pin; said method of loading said trailer upon said railway car comprising placing said first fifth-wheel mechanism in its supporting position below the front end of said trailer and coupling said king pin, moving said tractor and said coupled trailer as a unit longitudinally onto the frame of said railway car and under the motive power of said tractor, connecting the rear end of said tractor to said standard when said standard is in its storage position, moving said tractor forwardly along said frame in order to pivot said connected standard from its storage position substantially into its erected position so as to position said second fifth-wheel mechanism below the front end of said trailer and adjacent to the rear end of said tractor and located behind said king pin, operating said first fifth-wheel mechanism to uncouple said king pin, then moving said tractor further forwardly along said frame in order to pivot said connected standard into its fully erected position and simultaneously to move said first fifth-wheel mechanism from its supporting position below the front end of said trailer while moving said second fifth-wheel mechanism into its supporting position below the front end of said trailer and engaging said king pin to couple the same, thereby to effect independently of any other supporting facility a direct flying transfer of the support of the front end of said mounted trailer from said first fifth-wheel mechanism to said second fifth-wheel mechanism, and then disconnecting the rear end of said tractor from said standard when said standard is in its fully erected position.

17. The method of unloading a road semi-trailer from a railway car in a freight transportation system comprising a railway car including a longitudinally extending frame supported at the opposite ends thereof by a pair of trucks, a road semi-trailer including a rear end carrying road wheels and a front end carrying a king pin, a tractor carrying road wheels, a first fifth-wheel mechanism carried by the rear end of said tractor and adapted to be positioned below and in supporting relation with the front end of said trailer and also adapted automatically to couple said king pin in response to engagement thereof with said king pin, structure carried by said frame for supporting both said trailer and said tractor mounted upon the top thereof with said first fifth-wheel mechanism coupling said king pin, thereby to accommodate movements of said mounted tractor and said coupled mounted trailer longitudinally of said frame under the motive power of said mounted tractor, a standard mounted adjacent to the lower end thereof upon said frame for pivotal movements with respect thereto about a fixed axis extending transversely thereof, said standard being selectively pivotally movable between a substantially horizontal storage position disposed closely adjacent to the top of said frame and a substantially vertical erected position disposed well above the top of said frame, latching mechanism having a set position connecting said standard in its erected position to said frame, said standard being biased by gravity into its storage position and being moved from its erected position into its storage position in response to tripping of said latching mechanism, a second fifth-wheel mechanism carried by the upper end of said standard and movable therewith and adapted to support the front end of said mounted trailer and selectively to couple and to uncouple said king pin, means carried by the rear end of said tractor for operating said second fifth-wheel mechanism to uncouple said king pin when said second fifth-wheel mechanism is in its supporting position with respect to the front end of said mounted trailer with said standard in its erected position, and additional means carried by the rear end of said tractor for tripping said latching mechanism with said standard in its erected position; said method of unloading said trailer from its mounted position upon the top of said railway car when the front end thereof is supported by said second fifth-wheel mechanism coupling said king pin with said standard in its erected position comprising moving said tractor in its mounted position upon the top of said frame rearwardly therealong under the motive power of said mounted tractor and to a position disposed immediately forwardly of said second fifth-wheel mechanism, operating said second fifth-wheel mechanism from said rearwardly moving mounted tractor to uncouple said king pin, then tripping said latching mechanism from said rearwardly moving mounted tractor causing said standard to pivot from its erected position back into its storage position, and immediately moving said first fifth-wheel mechanism below and in supporting position with the front end of said trailer causing said first fifth-wheel mechanism to engage said king pin so as to couple the same, thereby to effect independently of any other supporting facility a direct flying transfer of the support of the front end of said mounted trailer from said second fifth-wheel mechanism to said first fifth-wheel mechanism.

18. A railway car for transporting a freight carrier of the type including an underframe carrying low track rollers of given narrow gauge; said railway car comprising a longitudinally extending narrow hollow box-like frame, a pair of trucks of standard rail gauge supporting the opposite ends of said frame, a pair of longitudinally extending and laterally spaced-apart rails carried by the top of said frame and defining a trackway of said given narrow gauge, said trackway being arranged to engage the track rollers carried by the underframe of the freight carrier so as to mount the same upon the top of said frame and to accommodate limited movements of the mounted freight carrier longitudinally of said frame, a hitch carried by said frame and located between the rails of said trackway, means mounting said hitch upon said frame for both limited longitudinal movements with respect thereto and limited vertical movements with respect thereto, said hitch being selectively movable in the vertical direction between a storage position disposed within said hollow frame and below the top thereof and an erected position disposed out of said hollow frame and well above the top thereof, said hitch in its storage position being disposed in non-interfering relation with the underframe of a freight carrier mounted upon the top of said frame, said hitch in its erected position being disposed in interfering relation with the underframe of a freight carrier mounted upon the top of said frame, means for selectively moving said hitch between its storage and erected positions, latching mechanism carried by the upper end of said hitch and selectively operative between unlatching and latching positions with respect to the cooperating underframe of a freight carrier mounted upon the top of said frame, means responsive to movement of said hitch from its storage position into its erected position for operating said mechanism from its unlatching position into its latching position and responsive to movement of said hitch from its erected position towards its storage position for operating said mechanism from its latching position into its unlatching position, and a shock-absorbing device carried by said frame and connected to said hitch and arranged to oppose and to damp longitudinal movements of said hitch with respect to said frame, whereby a freight carrier mounted upon the top of said frame and latched to said hitch in its erected position is afforded protection by said device from longitudinal shocks from said frame.

19. A railway car for transporting a road semi-trailer of the type including a rear end carrying road wheels and a front end carrying a substantially centrally disposed depending kingpin; said railway car comprising an elongated longitudinally extending frame, structure carried by said frame and defining on the opposite top sides thereof a pair of elongated longitudinally extending and laterally spaced-apart side platforms arranged in a substantially horizontal plane, said side platforms being adapted respectively to support the road wheels respectively carried by the opposite sides of a road semi-trailer carried by said frame so as to accommodate longitudinal movements of the carried road semi-trailer with respect to said frame, a pair of elongated longitudinally extending rub rails mounted on said frame and arranged in substantially parallel laterally spaced-apart relation and respectively positioned adjacent to and above the opposite inner sides of said side platforms, said rub rails being respectively provided with smooth outer rubbing surfaces respectively presented to the adjacent inner sides of the road wheels respectively carried by the opposite sides of a road semi-trailer and respectively supported by said side platforms so as to prevent scuffing damage to the road wheels and to exert outwardly directed thrusts upon the road wheels incident to rubbing engagements therebetween, whereby said rub rails effect inside guiding of a road semi-trailer carried by said frame incident to longitudinal movement of the carried road semi-trailer with respect to said frame, a stand mounted adjacent to the lower end thereof upon the central portion of said frame intermediate said rub rails for pivotal movements about a fixed laterally extending axis, said stand being selectively pivotable longitudinally of said frame between a rearwardly disposed storage position and a forwardly disposed erected position, the top of said stand in its storage position being disposed closely adjacent to the top of said frame and between said rub rails and the top of said stand in its erected position being disposed well above the top of said frame and from between said rub rails, a motion limiting and cushioning device carried by said frame, latching mechanism having a set position connecting said stand in its erected position to said device and a trip position disconnecting said stand in its erected position from said device, means for operating said latching mechanism into its set position, said stand in its erected position being baised by said connected device into a normal upstanding attitude and being pivotable fore-and-aft with respect thereto and longitudinally of said frame against the bias of said connected device, means for operating said latching mechanism into its trip position, said stand being gravity biased into its storage position, whereby said stand is pivoted from its erected position back into its storage position in response to operation of said latching mechanism into its trip position, a head carried by said stand and movable therewith and disposed at the top thereof when said stand occupies its erected position, said head when said stand occupies its erected position being adapted to support the front end of a road semi-trailer carried by said frame, said head having a forwardly opening slot therein adapted to receive the kingpin carried by the front end of a supported road semi-trailer, and locking mechanism carried by said head and adapted to cooperate with the kingpin received in said slot, said locking mechanism being selectively operative into a locked position connecting and holding a cooperating kingpin and into an unlocked position disconnecting and releasing a cooperating kingpin, whereby an operative connection may be completed between said frame and the kingpin carried by the front end of a supported road semi-trailer carried by said frame via said device and said stand in its erected position and said head and said locking mechanism in its locked position, the vertical projections above said side platforms of said rub rails and of said stand and said head when said stand occupies its storage position being substantially less than the normal road clearance of a road semi-trailer carried by said frame so as to prevent interference with longitudinal movements along said frame of the carried road semi-trailer.

20. A railway car for transporting a road semi-trailer of the type including a rear end carrying road wheels and a front end carrying a substantially centrally disposed depending kingpin; said railway car comprising an elongated longitudinally extending frame, structure carried by said frame and defining on the opposite top sides thereof a pair of elongated longitudinally extending and laterally spaced-apart side platforms arranged in a substantially horizontal plane, said side platform being adapted respectively to support the road wheels respectively carried by the opposite sides of a road semi-trailer carried by said frame so as to accommodate longitudinal movements of the carried road semi-trailer with respect to said frame, a pair of elongated longitudinally extending rub rails mounted on said frame and arranged in substantially parallel laterally spaced-apart relation and respectively positioned adjacent to and above the opposite inner sides of said side platforms, said rub rails being respectively provided with smooth outer rubbing surfaces respectively presented to the adjacent inner sides of the road wheels respectively carried by the opposite sides of a road semi-trailer and respectively supported by said side platforms so as to prevent scuffing damage to the road wheels and to exert outwardly directed thrusts upon the road wheels incident to rubbing engagements therebetween, whereby said rub rails effect inside guiding of a road semi-trailer carried by said frame incident to longitudinal movement of the carried road semi-trailer with respect to said frame, a stand mounted adjacent to the lower end thereof upon the central portion of said frame intermediate said rub rails for pivotal movements about a fixed laterally extending axis, said stand being selectively pivotable longitudinally of said frame between a rearwardly disposed storage position and a forwardly disposed erected position, the top of said stand in its storage position being disposed closely adjacent to the top of said frame and between said rub rails and the top of said stand in its erected position being disposed well above the top of said frame and from between said rub rails, a motion limiting and cushioning device carried by said frame, latching mechanism having a set position connecting said stand in its erected position to said device and a trip position disconnecting said stand in its erected position from said device, means responsive to pivotal movement of said stand into its erected position for operating said latching mechanism into its set position, said stand in its erected position being biased by said connected device into a normal upstanding attitude and being pivotable fore-and-aft with respect thereto and longitudinally of said frame against the bias of said connected device, means for operating said latching mechanism into its trip position, said stand being gravity biased into its storage position, whereby said stand is pivoted from its erected position back into its storage position in response to operation of said latching mechanism into its trip position, a head carried by said stand and movable therewith and disposed at the top thereof when said stand occupies its erected position, said head when said stand occupies its erected position being adapted to support the front end of a road semi-trailer carried by said frame, said head having a forwardly opening slot therein adapted to receive the kingpin carried by the front end of a supported road semi-trailer, and locking mechanism carried by said head and adapted to cooperate with the kingpin received in said slot, said locking mechanism being selectively operative into a locked position connecting and holding a cooperating kingpin and into an unlocked position disconnecting and releasing a cooperating kingpin, whereby an operative connection may be completed between said frame and the kingpin carried by the front end of a supported road semi-trailer carried by said frame via said device and said stand in its erected position and said head and said locking mechanism in its locked position, the vertical projections above said side platforms of said rub rails and of said stand and said head when said stand occupies its storage position being substantially less than the normal road clearance of the underframe of a road semi-trailer carried by said frame so as to prevent interference with longitudinal movements along said frame of the carried road semi-trailer.

21. A railway car for transporting a road semi-trailer of the type including a rear end carrying road wheels and a front end carrying a substantially centrally disposed depending kingpin; said railway car comprising an elongated longitudinally extending frame, structure carried by said frame and defining on the opposite top sides thereof a pair of elongated longitudinally extending and laterally spaced-apart side platforms arranged in a substantially horizontal plane, said side platforms being adapted respectively to support the road wheels respectively carried by the opposite sides of a road semi-trailer carried by said frame so as to accommodate longitudinal movements of the carried road semi-trailer with respect to said frame, a pair of elongated longitudinally extending rub rails mounted on said frame and arranged in substantially parallel laterally spaced-apart relation and respectively positioned adjacent to and above the opposite inner sides of said side platforms, said rub rails being respectively provided with smooth outer rubbing surfaces respectively presented to the adjacent inner sides of the road wheels respectively carried by the opposite sides of a road semi-trailer and respectively supported by said side platforms so as to prevent scuffing damage to the road wheels and to exert outwardly directed thrusts upon the road wheels incident to rubbing engagements therebetween, whereby said rub rails effect inside guiding of a road semi-trailer carried by said frame incident to longitudinal movement of the carried road semi-trailer with respect to said frame, a stand mounted adjacent to the lower end thereof upon the central portion of said frame intermediate said rub rails for pivotal movements about a fixed laterally extending axis, said stand being selectively pivotable longitudinally of said frame between a rearwardly disposed storage position and a forwardly disposed erected position, the top of said stand in its storage position being disposed closely adjacent to the top of said frame and between said rub rails and the top of said stand in its erected position being disposed well above the top of said frame and from between said rub rails, a motion limiting and cushioning device carried by said frame, latching mechanism having a set position connecting said stand in its erected position to said device and a trip position disconnecting said stand in its erected position from said device, means responsive to pivotal movement of said stand into its erected position for operating said latching mechanism into its set position, said stand in its erected position being biased by said connected device into a normal upstanding attitude and being pivotable fore-and-aft with respect thereto and longitudinally of said frame against the bias of said connected device, means including an actuator carried by said stand for operating said latching mechanism into its trip position, said stand being gravity biased into its storage position, whereby said stand is provided from its erected position back into its storage position in response to operation of said latching mechanism into its trip position, a head carried by said stand and movable therewith and disposed at the top thereof when said stand occupies its erected position, said head when said stand occupies its erected position being adapted to support the front end of a road semi-trailer carried by said frame, said head having a forwardly opening slot therein adapted to receive the kingpin carried by the front end of a supported road semi-trailer, and locking mechanism carried by said head and adapted to cooperate with the kingpin received in said slot, said locking mechanism being selectively operative into a locked position connecting and holding a cooperating kingpin and into an unlocked position disconnecting and releasing a cooperating kingpin, whereby an operative connection may be completed between said frame and the kingpin carried by the front end of a supported road semi-trailer carried by said frame via said stand in its erected position and said head and said locking mechanism in its locked position, the vertical projections above said side platforms of said rub rails and of said stand and said head when said stand occupies its storage position being substantially less than the normal road clearance of the underframe of a road semi-trailer carried by said frame so as to prevent interference with longitudinal movements along said frame of the carried road semi-trailer.

22. A multi-purpose railway car for transporting indiscriminately a road semi-trailer and a freight container; said railway car comprising an elongated longitudinally extending frame, a pair of elongated longitudinally extending and laterally spaced-apart treadways respectively carried by the opposite sides of said frame and adapted to support the road wheels of a road semi-trailer mounted on top of said frame and accommodating movements of the mounted road semi-trailer longitudinally of said frame, a first hitch pivotally mounted upon the central portion of said frame and disposed between said treadways, said first hitch being selectively pivotable between a storage position disposed adjacent to the top of said frame and an erected position disposed well above the top of said frame, said first hitch in its storage position being disposed in non-interfering relation with either the underframe of a road semi-trailer mounted upon the top of said frame or the underframe of a freight container mounted upon the top of said frame, said first hitch in its erected position being adapted to support the front end of a road semi-trailer mounted upon the top of said frame, locking mechanism carried by the top of said first hitch and selectively operative between lock and unlock positions with respect to the kingpin carried by the front end of a road semi-trailer mounted upon the top of said frame and supported at the front end thereof by said first hitch, first means cooperating between said frame and said first hitch in its erected position for affording shock protection to a road semi-trailer mounted upon the top of said frame and supported at the front end thereof by said first hitch and locked at the kingpin thereof to the top of said first hitch, a second hitch including a slide mounted upon said frame for longitudinal movements with respect thereto and a plunger mounted upon said slide for movements in the vertical direction with respect thereto, said plunger being selectively operative between a storage position disposed adjacent to the top of said frame and an erected position disposed well above the top of said frame, said plunger in its storage position being disposed in non-interfering relation with either the underframe of a road semi-trailer mounted upon the top of said frame or the underframe of a freight container mounted upon the top of said frame, said plunger in its erected position being disposed adjacent to the underframe of a freight container mounted upon the top of said frame, latching mechanism carried by the top of said plunger and selectively operative when said plunger occupies its erected position between latch and unlatch position with respect to the underframe of a freight container mounted upon the top of said frame, and second means cooperating between said frame and said second hitch for affording shock protection to a freight container mounted upon the top of said frame and latched at the underframe thereof to the top of said plunger.

23. The multi-purpose railway car set forth in claim 22, wherein said second hitch further comprises means for selectively moving said plunger between its erected and storage positions, and means responsive to movement of said plunger into its erected position for operating said latching mechanism into its latch position and responsive to movement of said plunger out of its erected position for operating said latching mechanism into its unlatch position.

24. The multi-purpose railway car set forth in claim 22, and further comprising a shock-absorbing mechanism carried by said frame and common to said first means and to said second means.

References Cited in the file of this patent
UNITED STATES PATENTS
3,016,025    Clejan _____ Jan. 9, 1962